US008458660B1

(12) United States Patent
Massoudi et al.

(10) Patent No.: US 8,458,660 B1
(45) Date of Patent: Jun. 4, 2013

(54) SEMANTIC-BASED, SERVICE-ORIENTED SYSTEM AND METHOD OF DEVELOPING, PROGRAMMING AND MANAGING SOFTWARE MODULES AND SOFTWARE SOLUTIONS

(75) Inventors: Arash Massoudi, San Francisco, CA (US); Sandra Irene Zylka, Granite Bay, CA (US)

(73) Assignee: NextAxiom Technology, Inc., San Francisco, CA (US)

( * ) Notice: Subject to any disclaimer, the term of this patent is extended or adjusted under 35 U.S.C. 154(b) by 0 days.

(21) Appl. No.: 13/347,651

(22) Filed: Jan. 10, 2012

Related U.S. Application Data

(62) Division of application No. 10/904,744, filed on Nov. 24, 2004, now Pat. No. 8,225,282.

(51) Int. Cl.
*G06F 9/44* (2006.01)

(52) U.S. Cl.
USPC ............................. 717/121; 717/104; 717/105

(58) Field of Classification Search
None
See application file for complete search history.

(56) References Cited

U.S. PATENT DOCUMENTS

| | | | |
|---|---|---|---|
| 5,758,062 A | 5/1998 | McMahon et al. |
| 5,768,588 A | 6/1998 | Endicott et al. |
| 5,774,583 A | 6/1998 | Sasaki et al. |
| 5,805,785 A | 9/1998 | Dias et al. |
| 6,115,040 A | 9/2000 | Bladow et al. |
| 6,253,366 B1 | 6/2001 | Mutschler, III |
| 6,434,598 B1 | 8/2002 | Gish |
| 6,457,064 B1 | 9/2002 | Huff et al. |
| 6,563,441 B1 | 5/2003 | Gold |
| 6,665,677 B1 | 12/2003 | Wotring et al. |
| 6,684,222 B1 | 1/2004 | Cornelius et al. |
| 6,691,302 B1 | 2/2004 | Skrzynski et al. |
| 6,697,363 B1 | 2/2004 | Carr |
| 6,775,822 B1 | 8/2004 | Apte et al. |
| 6,804,773 B1 | 10/2004 | Grigsby et al. |
| 6,832,219 B2 | 12/2004 | Lal |
| 6,917,620 B1 | 7/2005 | Sindhu et al. |
| 6,925,631 B2 | 8/2005 | Golden |
| 6,934,712 B2 | 8/2005 | Kiernan et al. |
| 6,985,939 B2 | 1/2006 | Fletcher et al. |
| 6,996,589 B1 | 2/2006 | Jayaram et al. |

(Continued)

OTHER PUBLICATIONS

Sivashanmugam et al. "Framework for Semantic Web Process Composition", Jun. 2003, The University of Georgia, Athens, Georgia, Technical Report 03-008, LSDIS Lab, Dept. of Computer Science, UGA, pp. 1-42; <http://lsdis.cs.uga.edu/library/download/TR03-008.pdf>.*

(Continued)

*Primary Examiner* — Thuy Dao
*Assistant Examiner* — Ben C Wang
(74) *Attorney, Agent, or Firm* — Carr & Ferrell LLP

(57) ABSTRACT

Methods, systems, frameworks, and software products are disclosed for building well-defined software modules through the optionally nested, aggregation of other similar modules at any depth. The invention provides visual methods of aggregation and nesting of software interfaces within composite software services with an automated runtime platform. Other aspects of the invention include, but are not limited to, innovative methods for routing the flow of invocation, inter-service communication, and exception handling. Industry standards are leveraged to integrate the methods discussed in this invention to any computer system, programming language or software platform. The semantic-based and visual nature of the inventions discussed can significantly reduce the complexity of building, maintaining and deploying computer systems and software products.

6 Claims, 55 Drawing Sheets

Composite Model Implementation

U.S. PATENT DOCUMENTS

| Patent | Date | Inventor | Class |
|---|---|---|---|
| 7,035,944 B2 | 4/2006 | Fletcher et al. | |
| 7,047,243 B2 | 5/2006 | Cabrera et al. | |
| 7,111,197 B2 | 9/2006 | Kingsbury et al. | |
| 7,159,185 B1 | 1/2007 | Vedula et al. | |
| 7,171,672 B2 | 1/2007 | Just | |
| 7,178,050 B2 | 2/2007 | Fung et al. | |
| 7,188,155 B2 | 3/2007 | Flurry et al. | |
| 7,194,485 B2 | 3/2007 | Kaipa et al. | |
| 7,340,735 B2 | 3/2008 | Laura | |
| 7,451,434 B1 | 11/2008 | Blumenthal et al. | |
| 7,483,901 B1 * | 1/2009 | Massoudi et al. | 717/104 |
| 7,533,387 B1 * | 5/2009 | Massoudi | 719/328 |
| 7,581,205 B1 * | 8/2009 | Massoudi | 717/106 |
| 7,584,454 B1 * | 9/2009 | Massoudi | 717/121 |
| 7,634,726 B2 * | 12/2009 | Ims et al. | 715/249 |
| 7,926,031 B2 | 4/2011 | Faihe et al. | |
| 7,979,840 B2 * | 7/2011 | Zhang et al. | 717/121 |
| 8,069,437 B2 * | 11/2011 | Aigner et al. | 717/121 |
| 8,112,738 B2 | 2/2012 | Pohl et al. | |
| 8,225,282 B1 * | 7/2012 | Massoudi et al. | 717/121 |
| 2001/0052108 A1 | 12/2001 | Bowman-Amuah | |
| 2002/0052939 A1 | 5/2002 | Lee | |
| 2002/0143819 A1 * | 10/2002 | Han et al. | 707/513 |
| 2002/0169889 A1 | 11/2002 | Yang et al. | |
| 2002/0194244 A1 | 12/2002 | Raventos | |
| 2003/0014500 A1 | 1/2003 | Schleiss et al. | |
| 2003/0055868 A1 | 3/2003 | Fletcher et al. | |
| 2003/0120782 A1 | 6/2003 | Bortoloso et al. | |
| 2003/0188039 A1 | 10/2003 | Liu et al. | |
| 2003/0191803 A1 | 10/2003 | Chinnici et al. | |
| 2003/0217033 A1 | 11/2003 | Sandler et al. | |
| 2003/0233602 A1 | 12/2003 | Lindquist et al. | |
| 2004/0003029 A1 | 1/2004 | Islam et al. | |
| 2004/0015564 A1 | 1/2004 | Williams | |
| 2004/0015578 A1 | 1/2004 | Karakashian et al. | |
| 2004/0064503 A1 | 4/2004 | Karakashian et al. | |
| 2004/0143836 A1 | 7/2004 | McCormack et al. | |
| 2004/0162741 A1 | 8/2004 | Flaxer et al. | |
| 2004/0177335 A1 | 9/2004 | Beisiegel et al. | |
| 2004/0183838 A1 | 9/2004 | Lahiri | |
| 2004/0230572 A1 | 11/2004 | Omoigui | |
| 2004/0239674 A1 | 12/2004 | Ewald et al. | |
| 2004/0243915 A1 | 12/2004 | Doyle et al. | |
| 2004/0249645 A1 * | 12/2004 | Hauser et al. | 705/1 |
| 2005/0015491 A1 | 1/2005 | Koeppel | |
| 2005/0015643 A1 | 1/2005 | Davis et al. | |
| 2005/0044197 A1 | 2/2005 | Lai | |
| 2005/0050526 A1 | 3/2005 | Dahne-Steuber et al. | |
| 2005/0071243 A1 | 3/2005 | Somasekaran et al. | |
| 2005/0108024 A1 | 5/2005 | Fawcett et al. | |
| 2005/0166180 A1 * | 7/2005 | Lemon et al. | 717/106 |
| 2005/0182779 A1 | 8/2005 | Perry et al. | |
| 2006/0053407 A1 | 3/2006 | Kodosky et al. | |
| 2007/0199002 A1 | 8/2007 | Marvin et al. | |
| 2007/0204279 A1 | 8/2007 | Warshavsky et al. | |
| 2009/0222536 A1 | 9/2009 | Junghuber et al. | |
| 2011/0154379 A1 | 6/2011 | Gamanho | |
| 2011/0219354 A1 * | 9/2011 | Zhang et al. | 717/104 |
| 2011/0270868 A1 * | 11/2011 | Dettinger et al. | 707/769 |
| 2012/0047483 A1 * | 2/2012 | Amit et al. | 717/104 |
| 2012/0124554 A1 * | 5/2012 | Tam | 717/121 |
| 2012/0210292 A1 * | 8/2012 | Zhang et al. | 717/104 |
| 2012/0246613 A1 * | 9/2012 | Shukla et al. | 717/105 |
| 2012/0266129 A1 * | 10/2012 | Massoudi et al. | 717/105 |

OTHER PUBLICATIONS

Hu et al., "SWSCF: A Semantic-based Web Service Composition Framework", 2009 Academy Publisher, Journal of Networks, vol. 4, No. 4, Jun. 2009, pp. 290-297; <http://www.academypublisher.com/jnw/vol04/no04/jnw0404290297.pdf>.*

NextAxiom, "NextAxiom Hyperservice Studio", 2005 NextAxiom Technology Corporation, pp. 1-11; <nextaxiom.com/downloads/pdf/NextAxiomStudio.doc>.*

Brogi et al., "Semantics-Based Composition-Oriented Discovery of Web Services", 2008 ACM, ACM Transactions on Internet Technology, vol. 8, No. 4, Article 19, Sep. 2008, pp. 1-39; <http://dl.acm.org/citation.cfm?id=1391953>.*

Weise et al., "Semantic Web Service Composition for Service-Oriented Architectures", 2008 IEEE, pp. 355-358; <http://ieeexplore.ieee.org/stamp/stamp.jsp?tp=&arnumber=4785089>.*

Fallside, David C., XLM Schema Part 0: Primer, W3C Recommendations, May 2, 2001, Published by W3C, 2001, pp. 1-74. (NPL0001).

Biron, Paul V., XLM Schema Part 2: Datatypes, W3C Recommendations, May 2, 2001, Published by W3C, 2001, pp. 1-146. (NPL0002).

Yang et al., "Realizing Fault Resilience in Web-Server Cluster," Nov. 2000, IEEE, pp. 1-15. (NPL0003).

Ahumada et al., "Specifying Fractal and GCM Components with UML," Chilean Society of Computer Science, 2008, SCCC 07, XX, Nov. 8-9, 2007, pp. 53-63. (NPL0004).

Sun Microsystems, "Web Service Made Easier—The Java APIs and Architectures for XML," A Technical Paper White Paper, Published by Sun Microsystems, Inc., Jun. 2002, Revision 3, pp. 1-33. (NPL0005).

Wikipedia, "Service Oriented Programming," 8 pages, retrieved from the Internet Jan. 22, 2009, http://en.wikipedia.org/wiki/Service_Oriented_Programming. (NPL0006).

Lei et al., "The Design and Applications of a Context Service, " Oct. 2002, ACM, pp. 45-55. (NPL0007).

Zeng et al., "Quality Driven Web Services Composition," May 2003, ACM, pp. 411-421. (NPL0008).

Pautasso et al., "Visual Composition of Web Services," Human Centric Computing Languages and Environments, Proceedings, Oct. 28, 2003 IEEE Symposium, pp. 92-99. <http://Ieeexplore.Ieee.org/search/searchresult.jsp?visual+composition+of+web+service> (NPL0009).

Martinez et al., "ZenFlow: A Visual Web Service Composition Tool for BPEL4WS," 2005 IEEE, pp. 1-8. (NPL0010).

Schubiger-Banz, Simon, "Automatic Software Configuration—A Model for Service Provisioning in Dynamic and Heterogeneous Environments," Dec. 12, 2002, University of Fribourg, Switzerland, pp. 1-152. (NPL0011).

Ferndriger et al., "Enhancing Semantic Web Services with Inheritance," ISWC 2008, LNCS 5318, Springer-Verlag Berlin Heidelberg, pp. 162-177, <http://it.uq.edu.au/~liyf/papers/5318062.pdf> (NPL0012).

Marconi et al., "Synthesis and Composition of Web Services," SEM 2009, LNCS 5569, Springer-Verlag Berlin Heidelberg, pp. 89-157, <http://www.springerlink.com/content/2103561g34k145n7/> (NPL0013).

Pfadenhauer et al., "Challenges and Solutions for Model Driven Web Service Composition," 2005 IEEE, pp. 1-6 <http://Ieeexplore.Ieee.org/search/searchresult.jsp?challenges+and+solutions+for+model+driven+web+service+composition> (NPL0014).

Fernandez et al., "Towards a User-Centered Composition System for Service-Based Composite Applications," iiWAS2009, 2009 ACM, pp. 321-330, <http://dl.acm.org/results.cfm?h=1&cfid=85401185&cftoken=58806272> (NPL0015).

* cited by examiner

FIG. 1 Contract Inputs, Outputs, & Settings

FIG. 2   Composite Model Implementation

FIG. 3  Composite/Nested Service

FIG. 4  Nested Encapsulation of Services

Flattened View of Service Composition

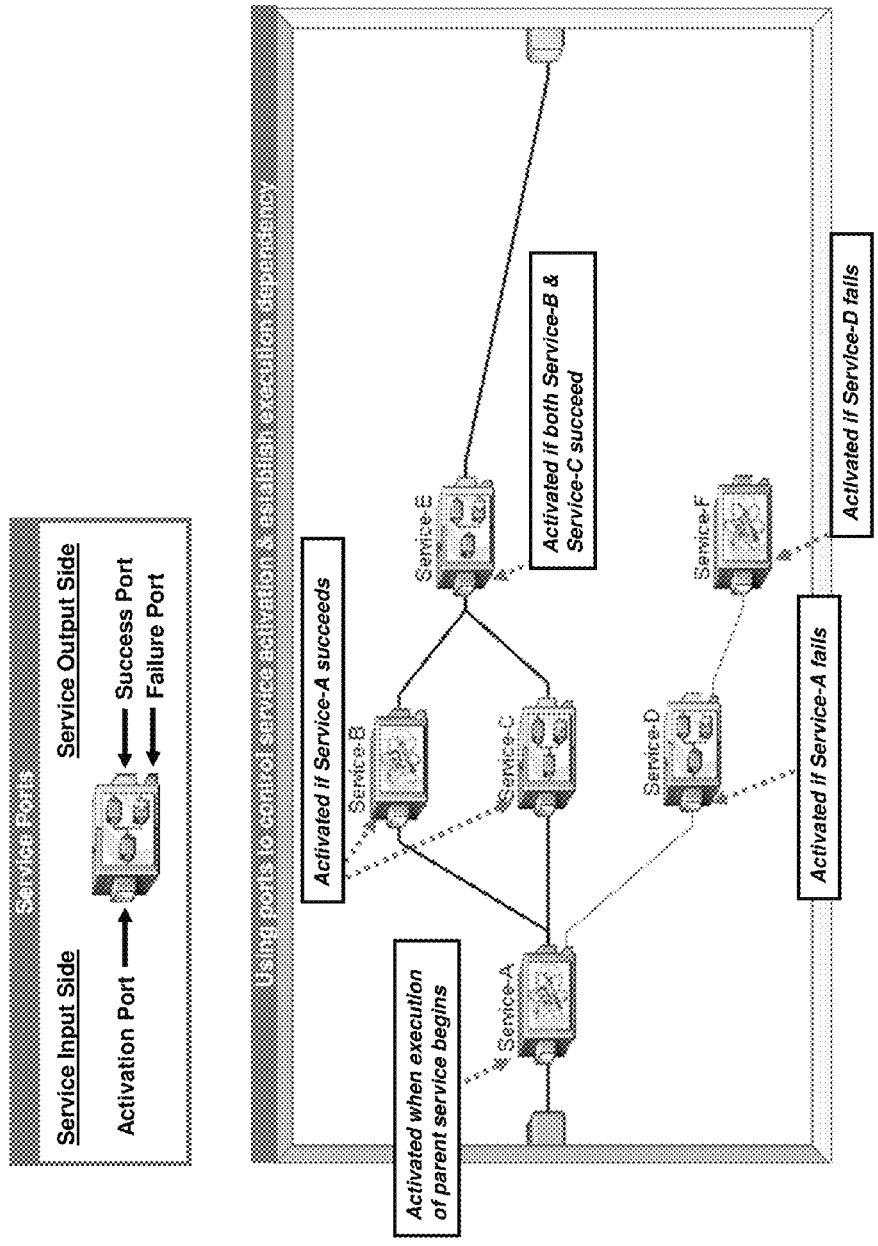
FIG. 6A Controlling Execution Flow – Activation, Success, & Failure Ports

```
<?xml version="1.0" ?>
<HSCompositeDefn debugBatchIndexBreakPoints="0" debugIterNumberBreakPoint="0" id="3_763_2769161968
maxIterations="2" nxaversionString="version 2.8.2.0" pauseBetweenIterations="0" revision="3_1">
  <HSContractNode customLabel="" id="3_755_2768622772" invalidRequestExceptionConnected="true"
logicalExceptionConnected="true" occurrence="1" remoteExceptionConnected="true"
timeoutExceptionConnected="true">
    <IncomingNode activateUponFailure="false" incomingKey="3_763_2769161968.1" />
    <![CDATA[ x=100, y=280, ]]>
  </HSContractNode>
  <HSContractNode customLabel="" id="3_760_2768771661" occurrence="1">
    <IncomingNode activateUponFailure="true" incomingKey="3_758_2768761469.1" />
    <![CDATA[ x=460, y=440, ]]>
  </HSContractNode>
  <HSContractNode customLabel="" id="3_756_2768632594" occurrence="1">
    <IncomingNode activateUponFailure="false" incomingKey="3_755_2768622772.1" />
    <![CDATA[ x=260, y=160, ]]>
  </HSContractNode>
  <HSContractNode customLabel="" id="3_759_2768764106" occurrence="1">
    <IncomingNode activateUponFailure="false" incomingKey="3_756_2768632594.1" />
    <IncomingNode activateUponFailure="false" incomingKey="3_757_2768632649.1" />
    <![CDATA[ x=460, y=220, ]]>
  </HSContractNode>
  <HSContractNode customLabel="" id="3_757_2768632649" occurrence="1">
    <IncomingNode activateUponFailure="false" incomingKey="3_755_2768622772.1" />
    <![CDATA[ x=260, y=280, ]]>
  </HSContractNode>
  <HSContractNode customLabel="" id="3_758_2768761469" invalidRequestExceptionConnected="true"
logicalExceptionConnected="true" occurrence="1" remoteExceptionConnected="true"
timeoutExceptionConnected="true">
    <IncomingNode activateUponFailure="true" incomingKey="3_755_2768622772.1" />
    <![CDATA[ x=260, y=400, ]]>
  </HSContractNode>
```

FIG. 6B(i)   Example Metadata Representation of Controlling Execution Flow

FIG. 6B(ii)    Example Metadata Representation of Controlling Execution Flow

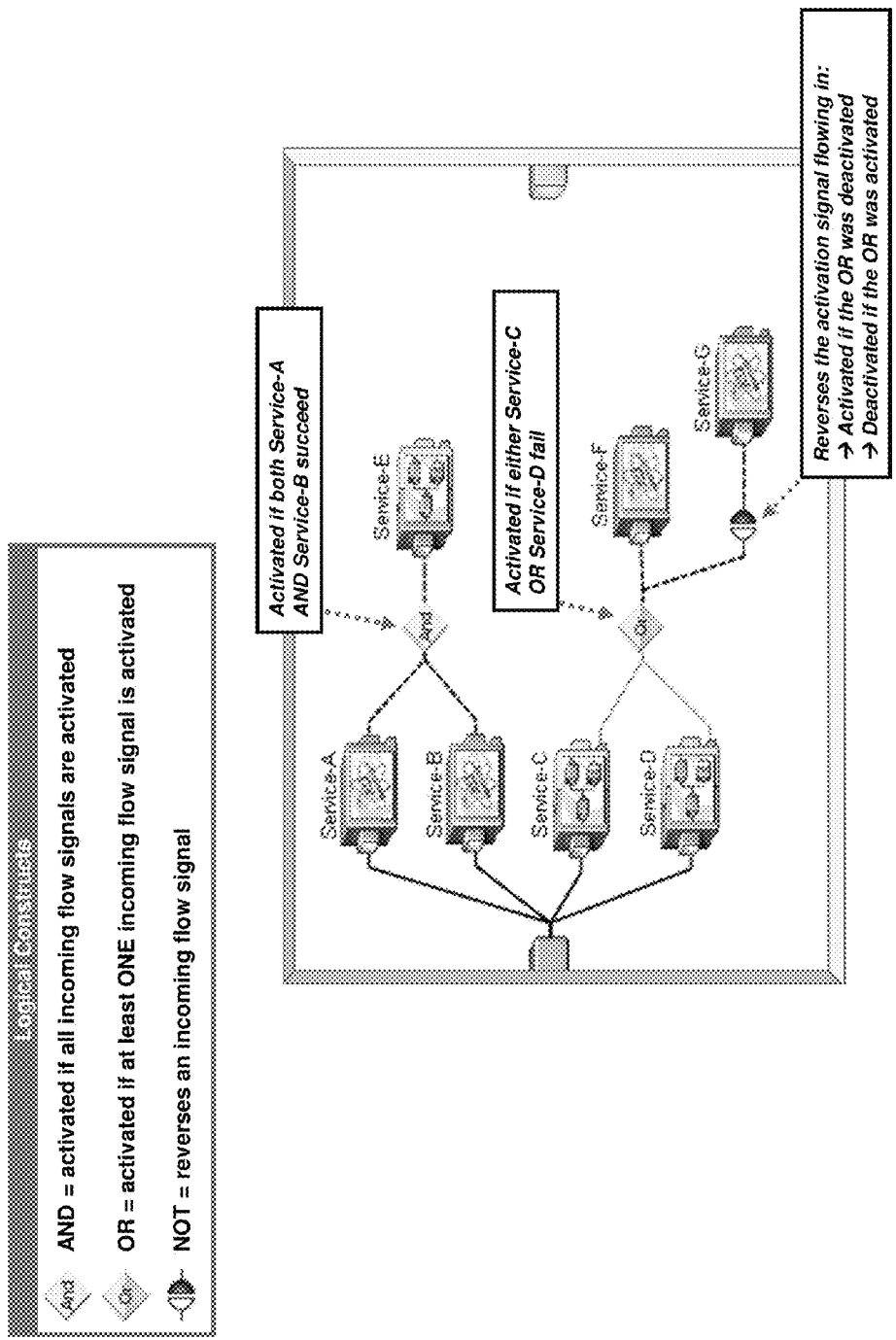
FIG. 7A    Logical Constructs

FIG. 7B(i)   Example Metadata Representation: Logical Constructs

FIG. 7B(ii)    Example Metadata Representation: Logical Constructs

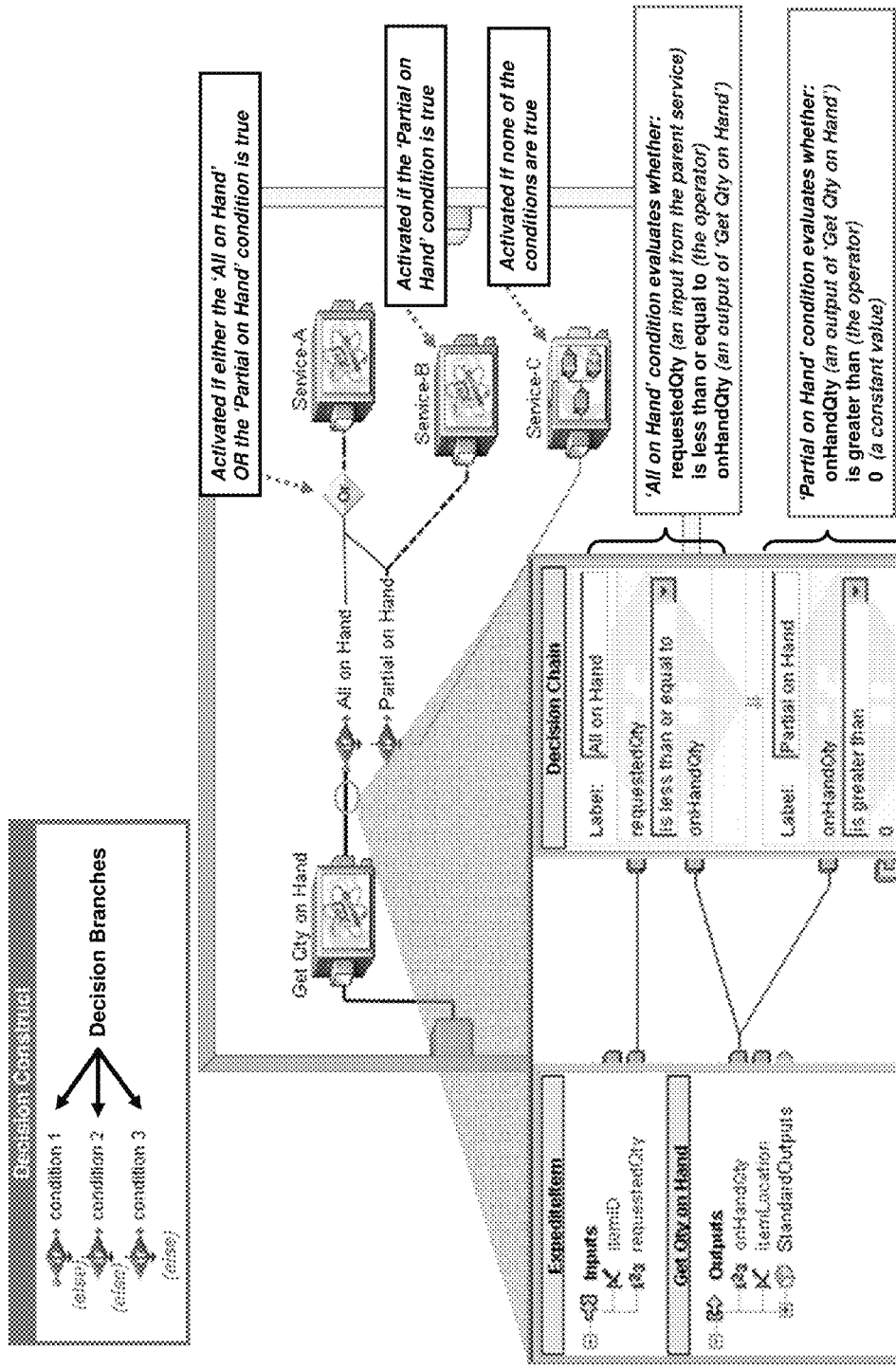
FIG. 8A  Decision Construct

```
<?xml version="1.0" ?>
<HSCompositeDefn debugBatchIndexBreakPoint="0" debugIterationNumberBreakPoint="0" id="3_768_2769553184O"
maxIterations="2" mxaversionString="version 2.0.2.0" pauseBetweenIterations="0" revision="3_2">
  <HSContractNode customLabel="" id="3_755_2768622772i" occurrence="1">
    <IncomingNode activateUponFailure="false" decisionBranchIndex="0" incomingKey="3.1" />
    <![CDATA[ x=440, y=100, ]]>
  </HSContractNode>
  <DecisionConstruct id="3" occurrence="1">
    <IncomingNode activateUponFailure="false" incomingKey="3_767_2769546521 4.1" />
    <IncomingNode activateUponFailure="false" incomingKey="3_768_2769553184O.1" />
    <![CDATA[ x=280, y=240, ]]>
    <DecisionBranch branchType="if" customLabel="All on Hand" IhsIncomingKey="3_768_2769553184O.1"
operator="is less than or equal to" rhsIncomingKey="3_767_2769546521 4.1" useCustomLabel="true">
      <LHS_OR_Common>
        <CPFromGroup groupAbsPath="Inputs" groupDataPath="">
          <ConnectedPair fromAbsPath="Inputs/requestedQty" fromDataPath="requestedQty" toDataIndex="0" />
            <groupDataPathSegments numSegments="0" postDotConversion="true" />
        </CPFromGroup>
      </LHS_OR_Common>
      <RHS>
        <CPFromGroup groupAbsPath="Outputs" groupDataPath="">
          <ConnectedPair fromAbsPath="Outputs/onHandQty" fromDataPath="onHandQty" toDataIndex="1" />
            <groupDataPathSegments numSegments="0" postDotConversion="true" />
        </CPFromGroup>
      </RHS>
    </DecisionBranch>
    <DecisionBranch branchType="elseif" customLabel="Partial on Hand" IhsIncomingKey="3_767_2769546521 4.1"
operator="is greater than" rhsConstant="ZERO" useCustomLabel="true">
      <LHS_OR_Common>
        <CPFromGroup groupAbsPath="Outputs" groupDataPath="">
          <ConnectedPair fromAbsPath="Outputs/onHandQty" fromDataPath="onHandQty" toDataIndex="0" />
            <groupDataPathSegments numSegments="0" postDotConversion="true" />
        </CPFromGroup>
      </LHS_OR_Common>
    </DecisionBranch>
    <DecisionBranch branchType="else" customLabel="My Label" operator="equals" />
  </DecisionConstruct>
</HSCompositeDefn>
```

FIG. 8B(i)     Example Metadata Representation: Decision Constructs

```
<HSContractNode customLabel=" " id="3_756_276863259443" occurrence="1"/>
  <IncomingNode activateUponFailure="false" decisionBranchIndex="1" incomingKey="3.1"/>
  <![CDATA[ x=480,y=280, ]]>
</HSContractNode>
<HSContractNode customLabel=" " id="3_767_276954652214" occurrence="1"/>
  <IncomingNode activateUponFailure="false" incomingKey="3_768_276955531840.1"/>
  <![CDATA[ x=100,y=80, ]]>
  <HSDocumentation>
    <descriptionSection title="Section 1"/>
  </HSDocumentation>
</HSContractNode>
<HSContractNode customLabel=" " id="3_757_276863226493" occurrence="2"/>
  <IncomingNode activateUponFailure="false" decisionBranchIndex="2" incomingKey="3.1"/>
  <![CDATA[ x=480,y=400, ]]>
</HSContractNode>
<CompIONode id="3_768_276955531840" occurrence="1">
  <![CDATA[ x=27,y=304, ]]>                           Test Font Size
</CompIONode>
</ExecutionGraph>
<HyperCycle>
  <HSDefNode key="3_767_276954652214.1"/>
</HyperCycle>
<HyperCycle>
  <HSDefNode key="3.1"/>
</HyperCycle>
<HyperCycle>
  <HSDefNode key="3_755_276862227721.1"/>
  <HSDefNode key="3_756_276863259443.1"/>
  <HSDefNode key="3_757_276863226493.1"/>
</HyperCycle>
<EndLifeCycle>
  <EndLifeCycle>
    <HSDefNode endAfterCyclePreparation="true" key="3_767_276954652214.1"/>
  </EndLifeCycle>
</EndLifeCycle>
<HSDefNode endAfterCyclePreparation="true" key="3_755_276862227721.1"/>
<HSDefNode key="3_756_276863259443.1"/>
<HSDefNode key="3_757_276863226493.1"/>
</EndLifeCycle>
</ExecutionGraph>
</HSCompositeDefn>
```

FIG. 8B(ii)    Example Metadata Representation: Decision Constructs

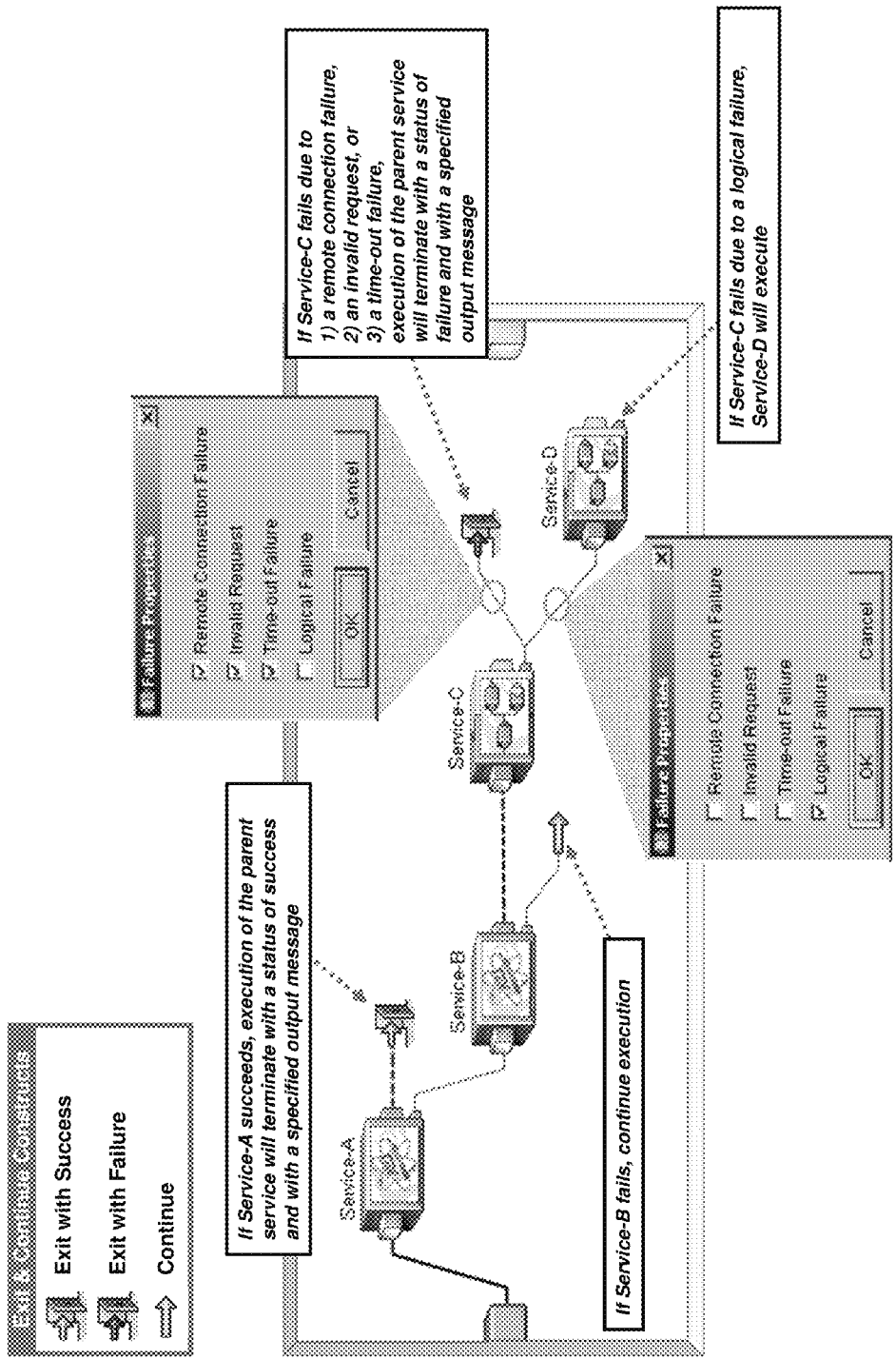
FIG. 9A   Exit & Continue Constructs

FIG. 9B(i)   Example Metadata Representation: Exit & Continue Constructs

```
<ExecutionGraph>
  <HyperCycle>
    <HSDefnNode key="3_755_2768622772I.1" />
  </HyperCycle>
  <HyperCycle>
    <HSDefnNode key="3_756_2768632594.3.1" />
    <HSDefnNode key="2.1" />
  </HyperCycle>
  <HyperCycle>
    <HSDefnNode key="3_757_2768632649.3.1" />
  </HyperCycle>
  <HyperCycle>
    <HSDefnNode key="2.2" />
    <HSDefnNode key="3_758_27687614696.1" />
  </HyperCycle>
  <EndLifeCycle />
  <EndLifeCycle>
    <HSDefnNode endAfterCyclePreparation="true" key="3_755_2768622772I.1" />
    <HSDefnNode key="2.1" />
  </EndLifeCycle>
  <EndLifeCycle>
    <HSDefnNode endAfterCyclePreparation="true" key="3_756_2768632594.3.1" />
  </EndLifeCycle>
  <EndLifeCycle>
    <HSDefnNode endAfterCyclePreparation="true" key="3_757_2768632649.3.1" />
    <HSDefnNode key="2.2" />
    <HSDefnNode key="3_758_27687614696.1" />
  </EndLifeCycle>
</ExecutionGraph>
</HSCompositeDefn>
```

FIG. 9B(ii)    Example Metadata Representation: Exit & Continue Constructs

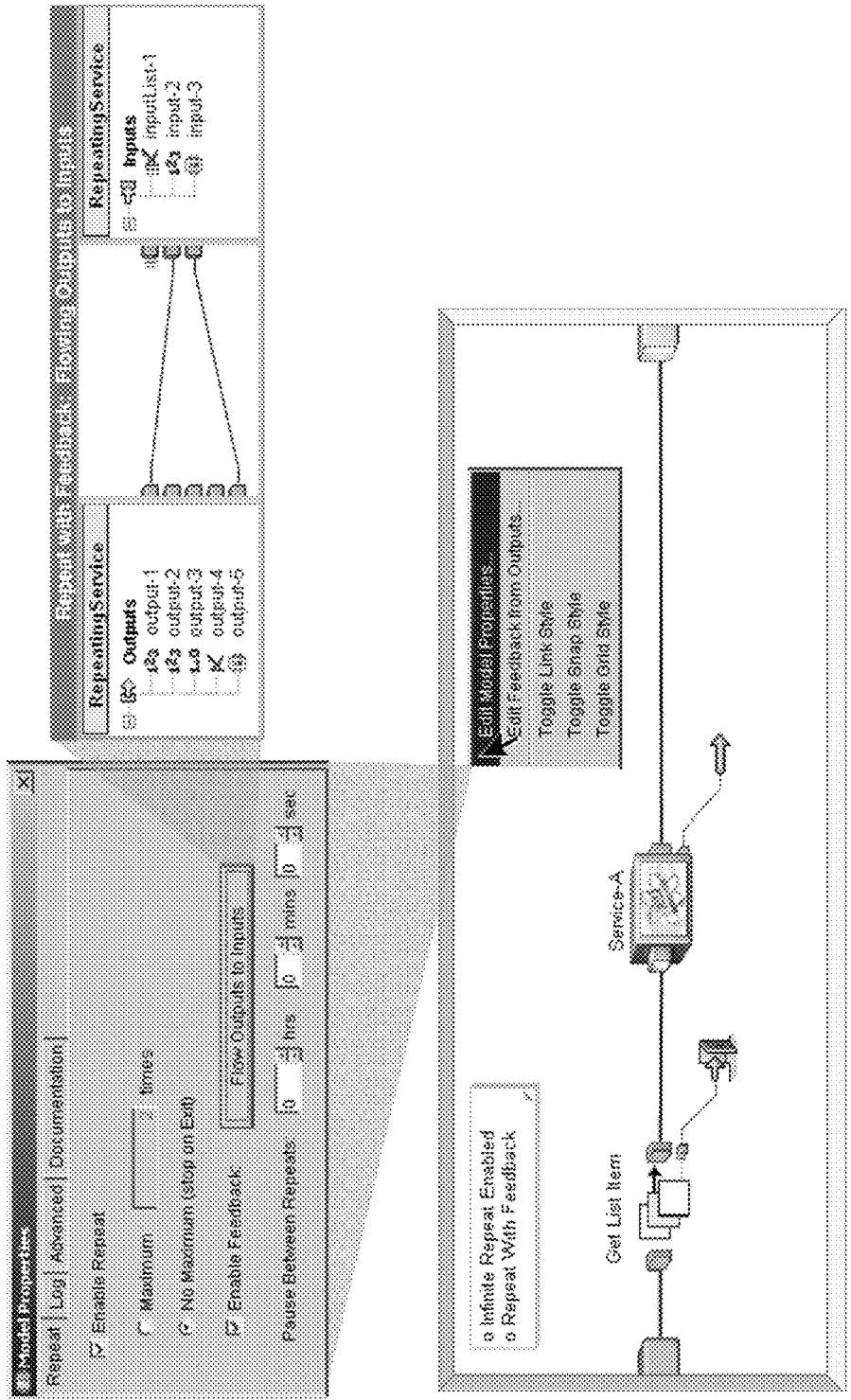
FIG. 10A   Repeat Model Properties

```xml
<?xml version="1.0" ?>
<HSCompositeDefn debugBatchIndexBreakPoint="0" debugIterNumberBreakPoint="0" enableLooping="true"
  id="1005_3_2770089203" maxIterations="0" maxVersionString="Version 2.8.2.0"
  pauseBetweenIterations="0" revisions="1005_5">
  <HSContractNode customLabels="" id="3_755_2766227721" invalidRequestExceptionConnected="true"
    logicalExceptionConnected="true" occurrence="1" remoteExceptionConnected="true"
    timeoutExceptionConnected="true">
    <IncomingNode activateUponFailure="false" incomingKey="-2.1">
      <ToListGroup cfgLevelForParentTg="-1" groupAbsPath="Inputs" relativeDataPath="">
      ...<CPFromGroup groupAbsPath="Outputs" groupDataPath="">
        <ConnectedPair fromAbsPath="Outputs/inputList1" fromDataPath="inputList1"
          toAbsPath="Inputs/serviceA-Input" toDataPath="serviceA-Input" />
        <groupDataPathSegments numSegments="0" postDataConversion="true" />
      </CPFromGroup>
    </ToListGroup>
    </IncomingNode>
    <[CDATA( x=380,y=280, )]>
    <HSDocumentation>
      <descriptionSection title="Section 1" />
    </HSDocumentation>
    </HSContractNode>
  <ContinueNode id="4" occurrence="1">
    <IncomingNode activateUponFailure="true" incomingKey="3_755_2766227721.1" />
    <[CDATA( x=520,y=380, )]>
  </ContinueNode>
  <BreakNode breakWithSuccess="true" id="2" occurrence="1">
    <IncomingNode activateUponFailure="true" incomingKey="-2.1" />
    <[CDATA( x=320,y=380, )]>
  </BreakNode>
```

FIG. 10B(i)   Example Metadata Representation: Repeat Model Properties

FIG. 10B(ii)     Example Metadata Representation: Repeat Model Properties

FIG. 10B(iii)   Example Metadata Representation: Repeat Model Properties

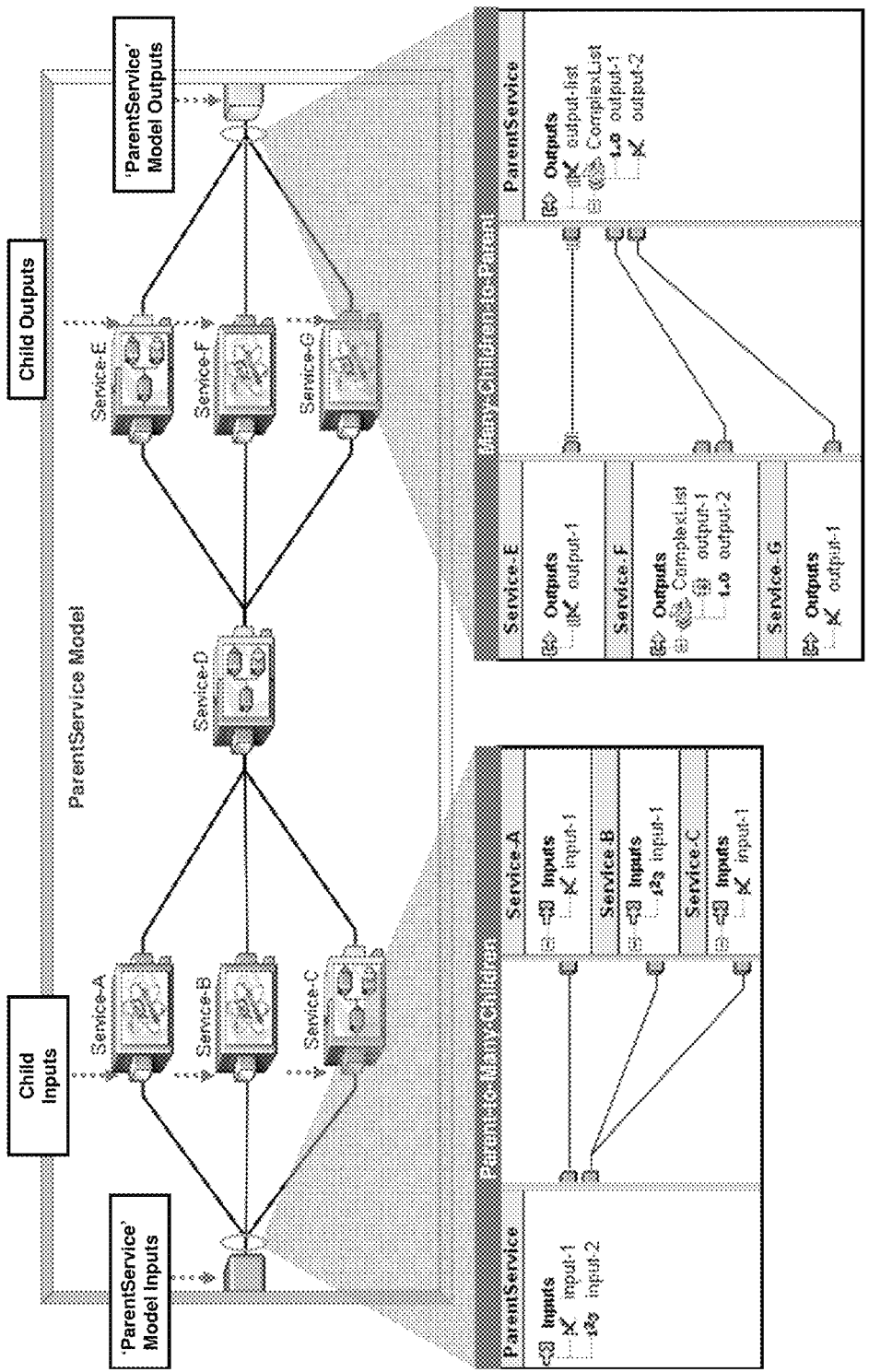
FIG. 11A  Defining Data Flow: from Parent-to-Children & Children-to-Parent FIG. 11B(i)    Example Metadata Mapping: from Parent-to-Children

FIG. 11B(ii) Example Metadata Mapping: from Parent-to-Children

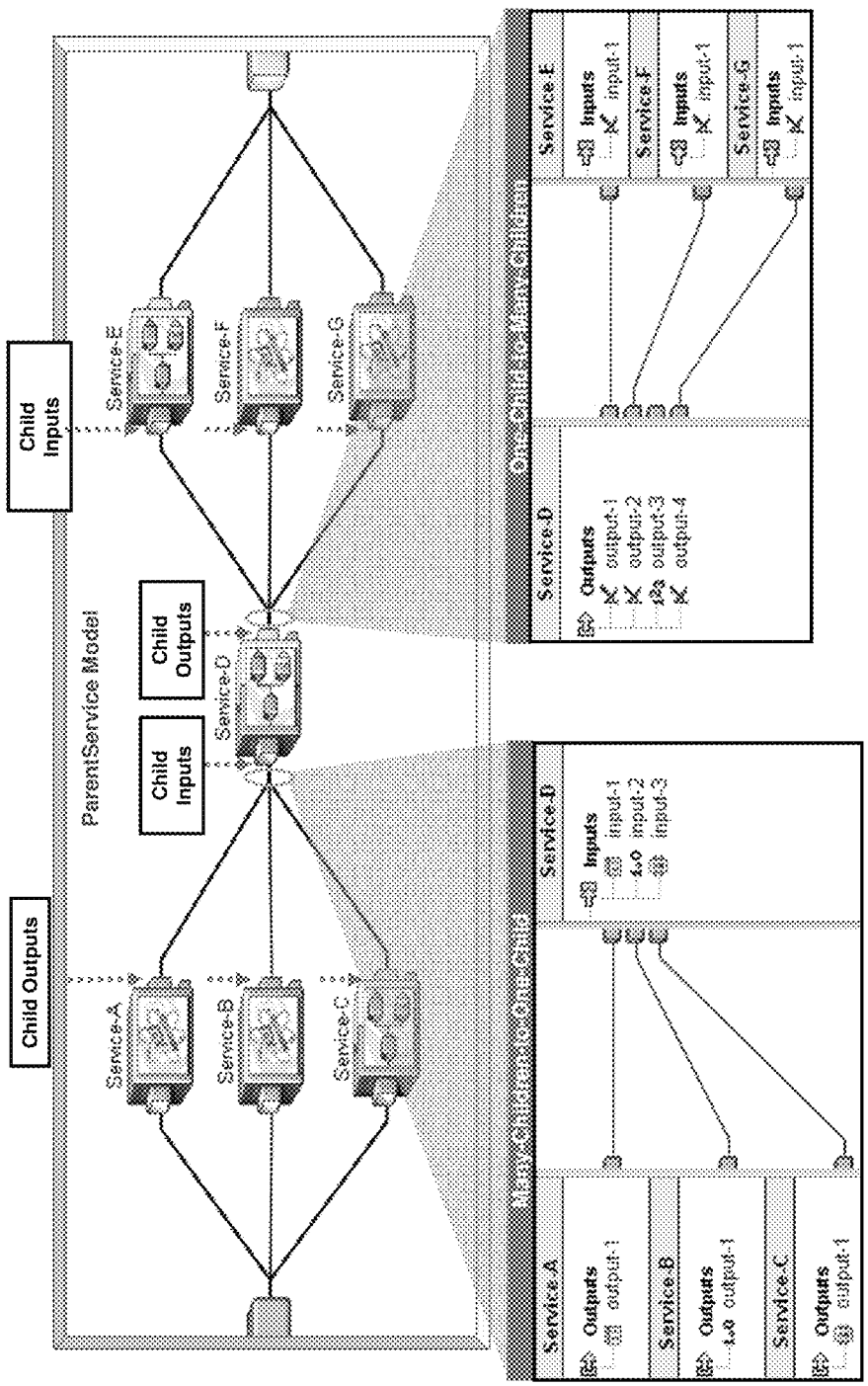
FIG. 11C  Defining Data Flow: between children

FIG. 11D(i)   Example Metadata mapping between Children

FIG. 11D(ii)    Example Metadata mapping between Children

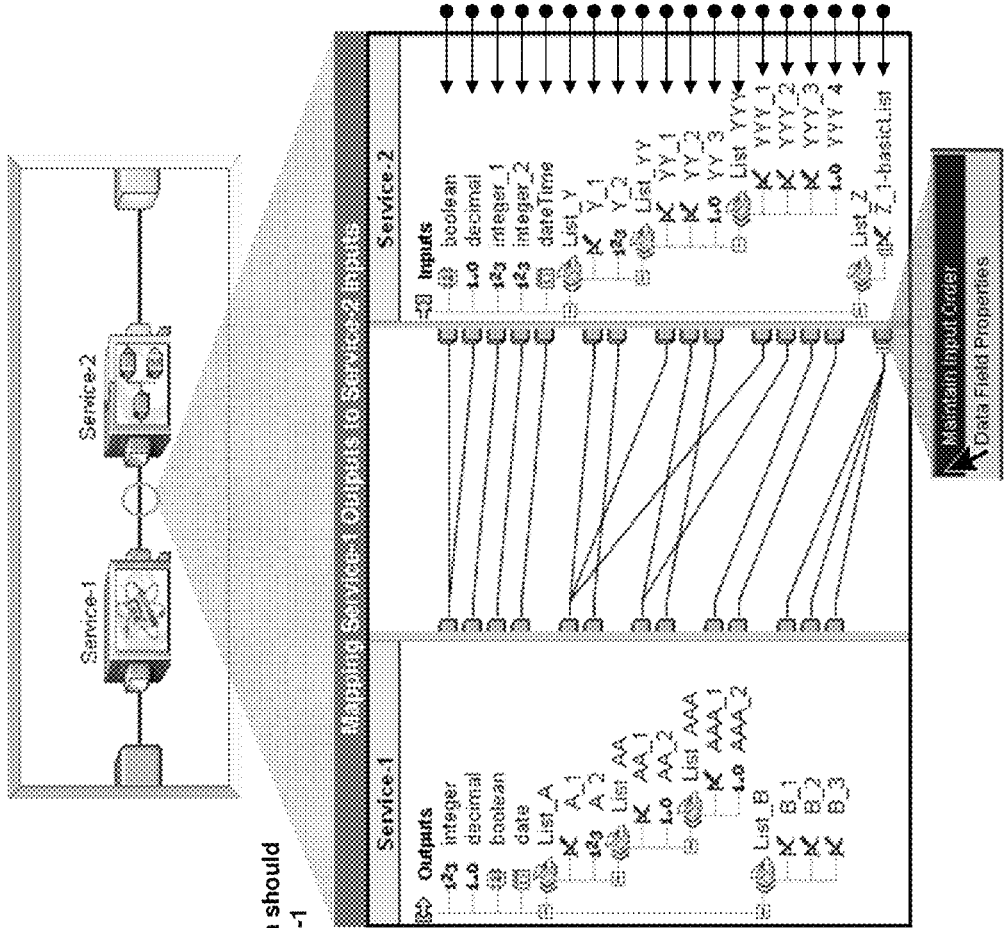
FIG. 12A  Design-time – Defining Complex Data Mapping

FIG. 12B(i)    Example Metadata: Defining Complex Data Mapping

```
<ConnectedPair fromAbsPath="Outputs/List_A/List_AA/AA_2" fromDataPath="AA_2"
   toAbsPath="Inputs/List_Y/List_YY/YY_3" toDataPath="YY_3" postOpConversion="true" />
 <groupDataPathSegments numSegments="2" postOpConversion="true">
  <Segment dataPath="List_A" index="0" />
  <Segment dataPath="List_AA" index="1" />
 </groupDataPathSegments>
</CPFromGroup>
<ToListGroup opLevelForParentOp="1" groupAbsPath="Inputs/List_Y/List_YY/List_YYY" relativeDataPath="List_YYY">
 <CPFromGroup groupAbsPath="Outputs/List_A" groupDataPath="List_A">
  <ConnectedPair fromAbsPath="Outputs/List_A/A_1" fromDataPath="A_1"
   toAbsPath="Inputs/List_Y/List_YY/List_YYY/YYY_1" toDataPath="YYY_1" postOpConversion="true" />
  <groupDataPathSegments numSegments="1" postOpConversion="true">
   <Segment dataPath="List_A" index="0" />
  </groupDataPathSegments>
 </CPFromGroup>
 <ConnectedPair fromAbsPath="Outputs/List_A/List_AA" groupDataPath="List_AA">
  <ConnectedPair fromAbsPath="Outputs/List_A/List_AA/AA_1" fromDataPath="AA_1"
   toAbsPath="Inputs/List_Y/List_YY/List_YYY/YYY_2" toDataPath="YYY_2" postOpConversion="true" />
  <groupDataPathSegments numSegments="2" postOpConversion="true">
   <Segment dataPath="List_A" index="0" />
   <Segment dataPath="List_AA" index="1" />
  </groupDataPathSegments>
 </CPFromGroup>
 <CPFromGroup groupAbsPath="Outputs/List_A/List_AA/List_AAA" groupDataPath="List_AAA">
  <ConnectedPair fromAbsPath="Outputs/List_A/List_AA/AAA/AAA_1" fromDataPath="AAA_1"
   toAbsPath="Inputs/List_Y/List_YY/YYY_3" toDataPath="YYY_3" />
  <ConnectedPair fromAbsPath="Outputs/List_A/List_AA/List_AAA/AAA_2" fromDataPath="AAA_2"
   toAbsPath="Inputs/List_Y/List_YY/List_YYY/YYY_4" toDataPath="YYY_4" />
  <groupDataPathSegments numSegments="3" postOpConversion="true">
   <Segment dataPath="List_A" index="0" />
   <Segment dataPath="List_AA" index="1" />
   <Segment dataPath="List_AAA" index="2" />
  </groupDataPathSegments>
 </CPFromGroup>
</ToListGroup>
</ToListGroup>
</ToListGroup>
```

FIG. 12B(ii)    Example Metadata: Defining Complex Data Mapping

```
<ToListGroup optquLevelForParent="1" groupAbsPath="Inputs/List_Z" relativeDataPath="List_Z" />
  <CPFromGroup groupAbsPath="Outputs/List_B" groupDataPath="List_B">
    <ConnectedPair fromAbsPath="Outputs/List_B/B_1" fromDataPath="B_1" isToDataList="true"
      toAbsPath="Inputs/List_Z/Z_1-BasicList" toDataPath="Z_1-BasicList" />
    <ConnectedPair fromAbsPath="Outputs/List_B/B_2" fromDataPath="B_2" isToDataList="true"
      toAbsPath="Inputs/List_Z/Z_1-BasicList" toDataPath="Z_1-BasicList" />
    <ConnectedPair fromAbsPath="Outputs/List_B/B_3" fromDataPath="B_3" isToDataList="true"
      toAbsPath="Inputs/List_Z/Z_1-BasicList" toDataPath="Z_1-BasicList" postDataConversion="true" />
    <groupDataPathSegments numSegments="1">
      <Segment dataPath="List_B" index="0" />
    </groupDataPathSegments>
  </CPFromGroup>
</ToListGroup>
        </IncomingNode>
      </HSContractNode>
      <CompIONode id="10005_6_277025754418" occurrence="1">
        <[CDATA[ x=420, y=280, ]]>
      </CompIONode>
      <CompIONode>
        <[CDATA[ x=827, y=304, ]]>
      </CompIONode>
    </ExecutionGraph>
    <HyperCycle>
      <HSOdefnNode key="10005_5_277023044429.1" />
    </HyperCycle>
    <EndLifeCycle />
    <HyperCycle>
      <HSOdefnNode endAfterCyclePreparation="true" key="10005_5_277023044429.1" />
      <HSOdefnNode key="10005_4_277021453320.1" />
    </HyperCycle>
    <EndLifeCycle>
      <HSOdefnNode key="10005_4_277021453320.1" />
    </EndLifeCycle>
  </ExecutionGraph>
</HSCompositeOefn>
```

FIG. 12B(iii)  Example Metadata: Defining Complex Data Mapping

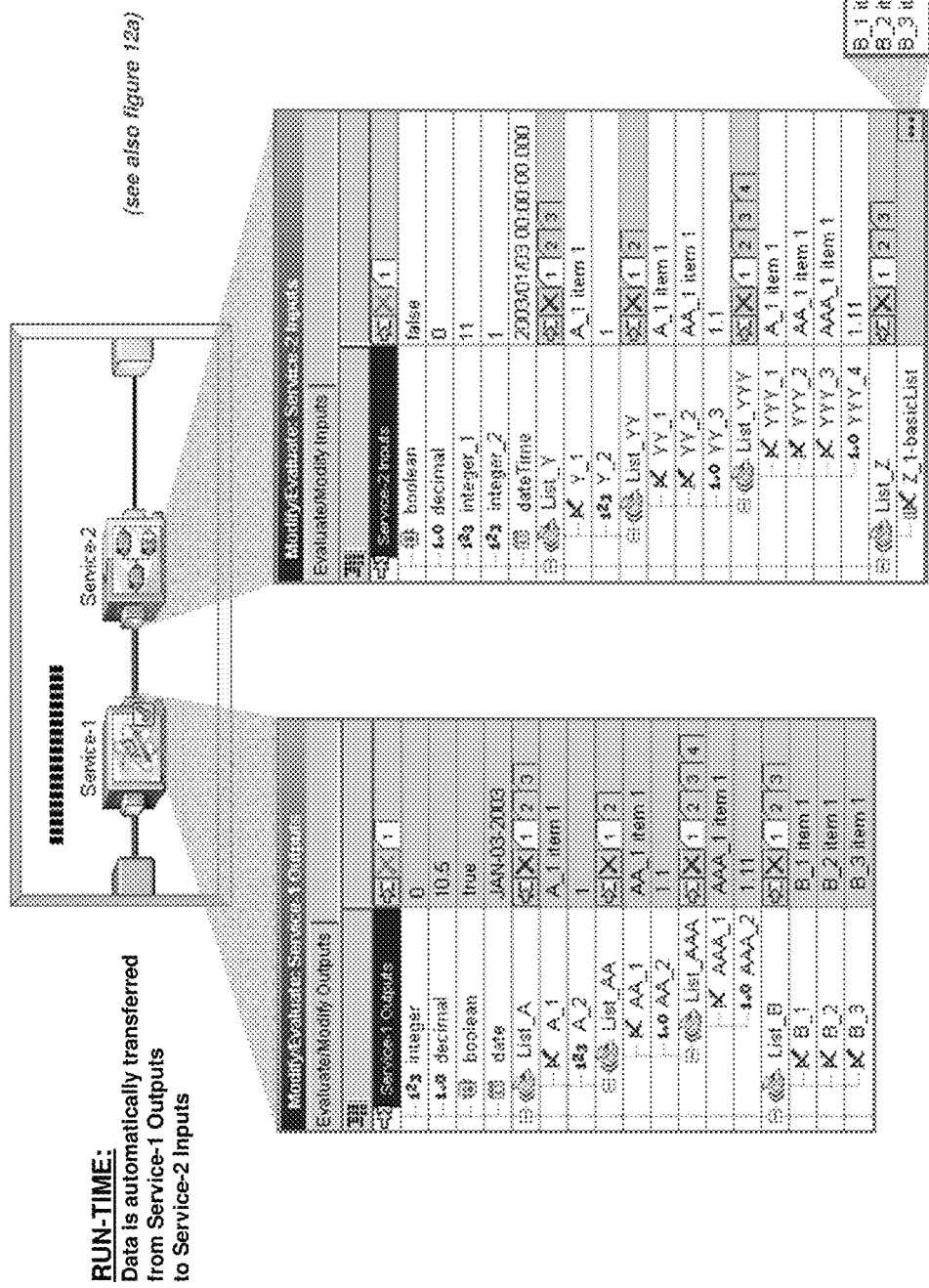
FIG. 12C  Run-time – Automatic Data Transfer

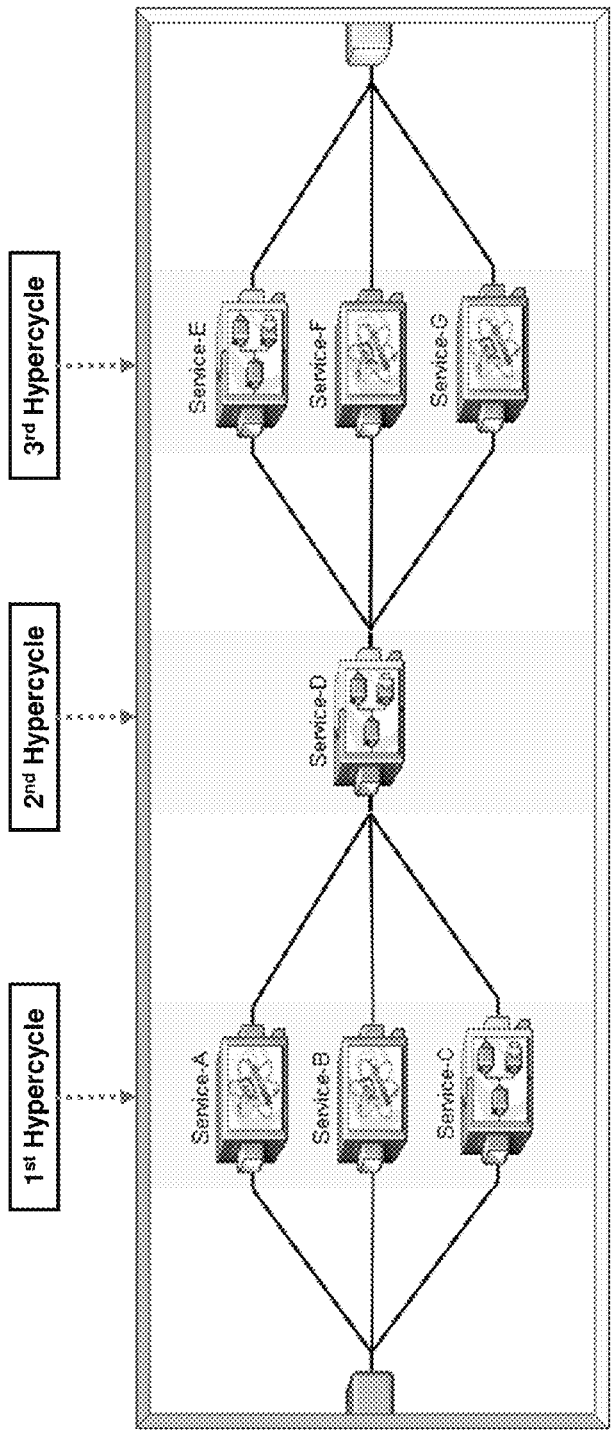
FIG. 13A  Automatic, Multi-threaded Invocation

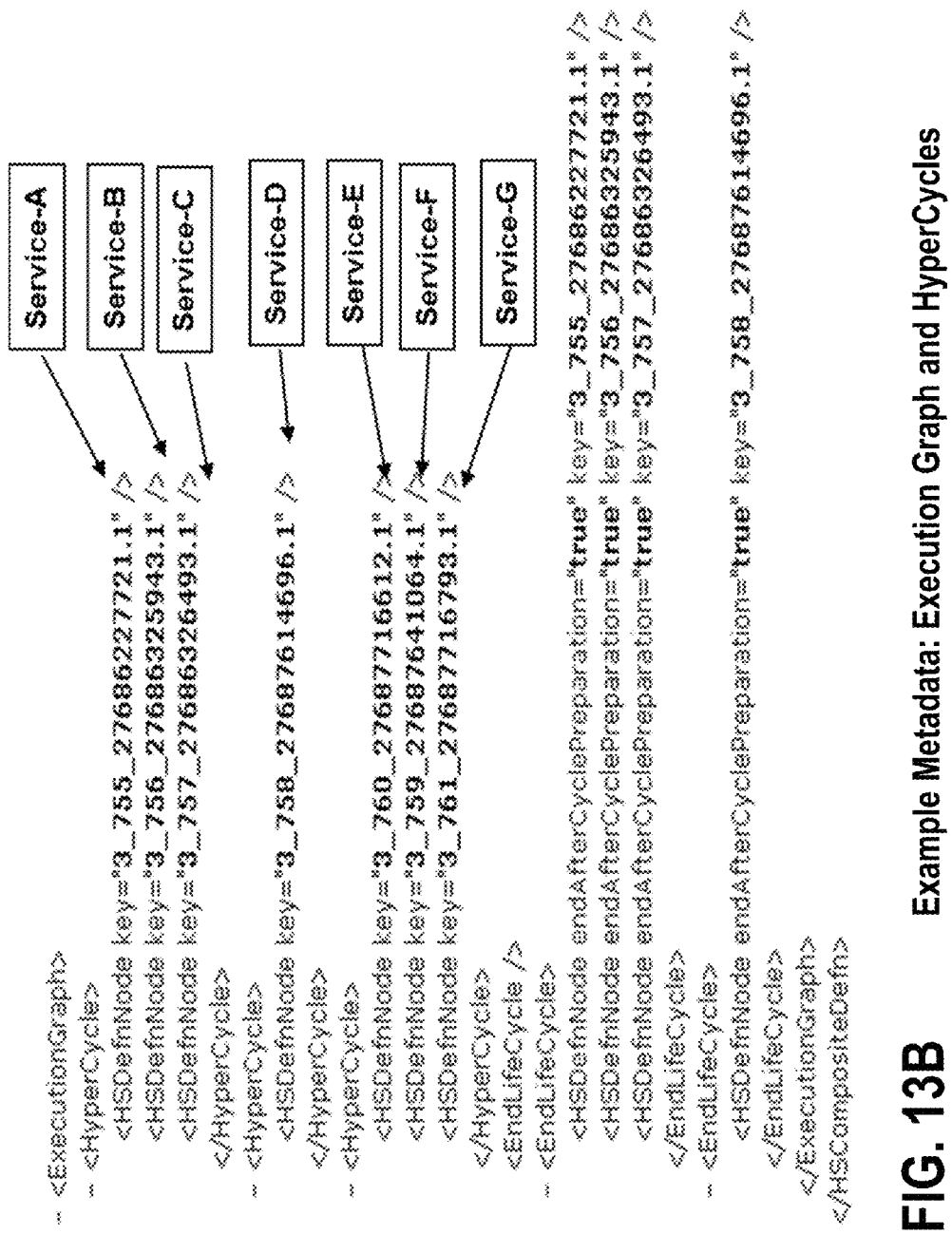
FIG. 13B  Example Metadata: Execution Graph and HyperCycles

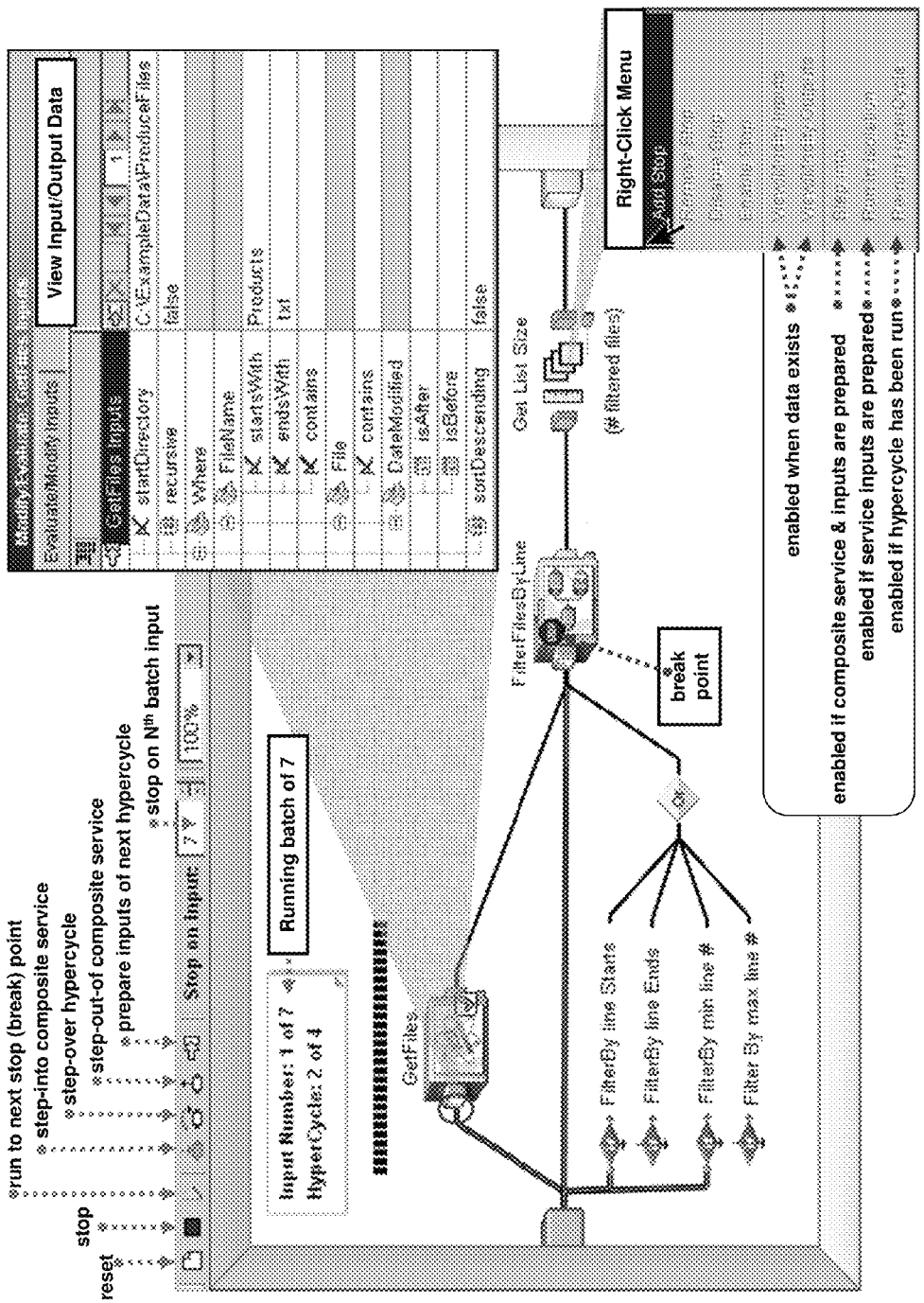
FIG. 14  Semantic-Based Debugger

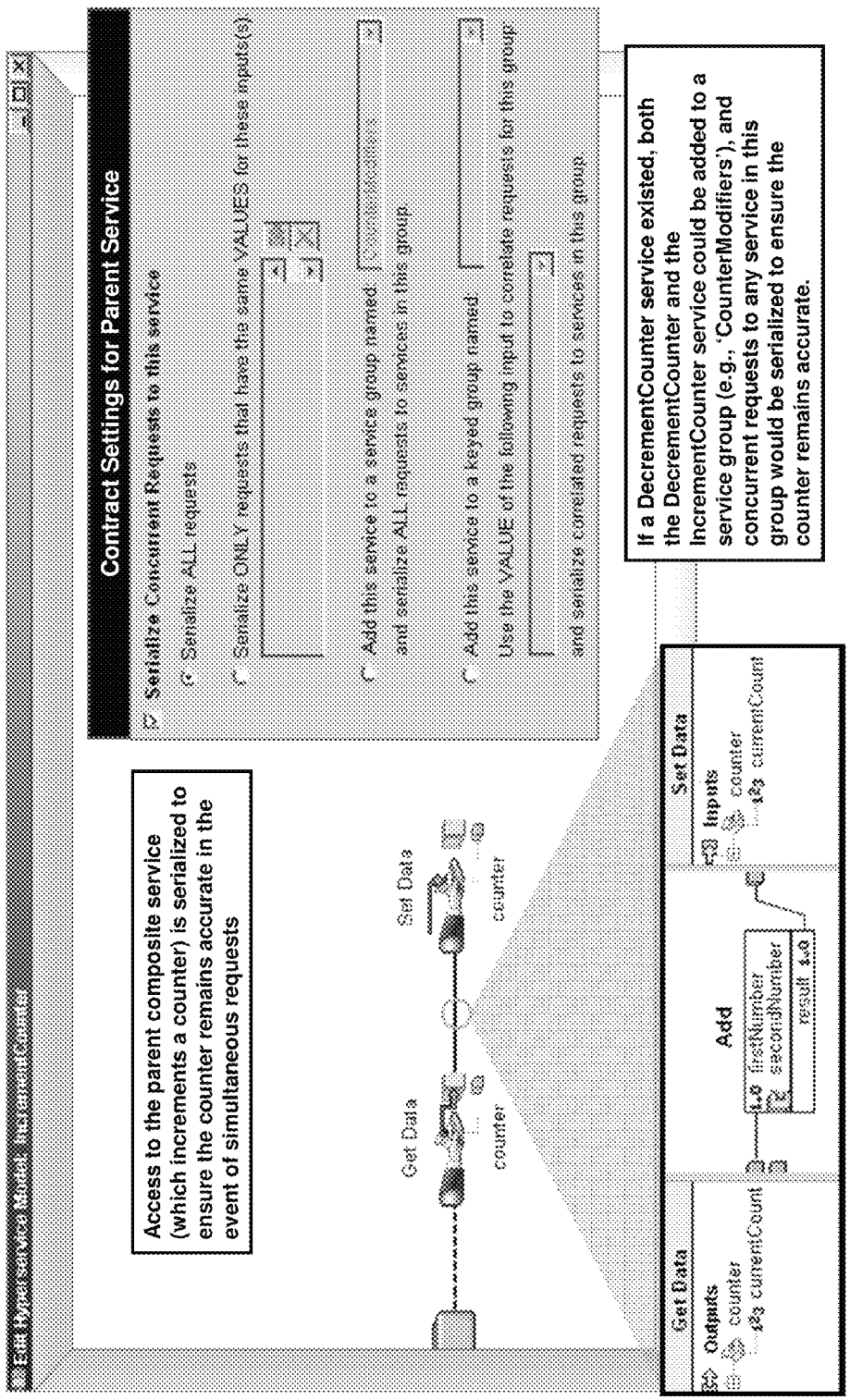
FIG. 15    Synchronization – serializing simultaneous requests to a composite service

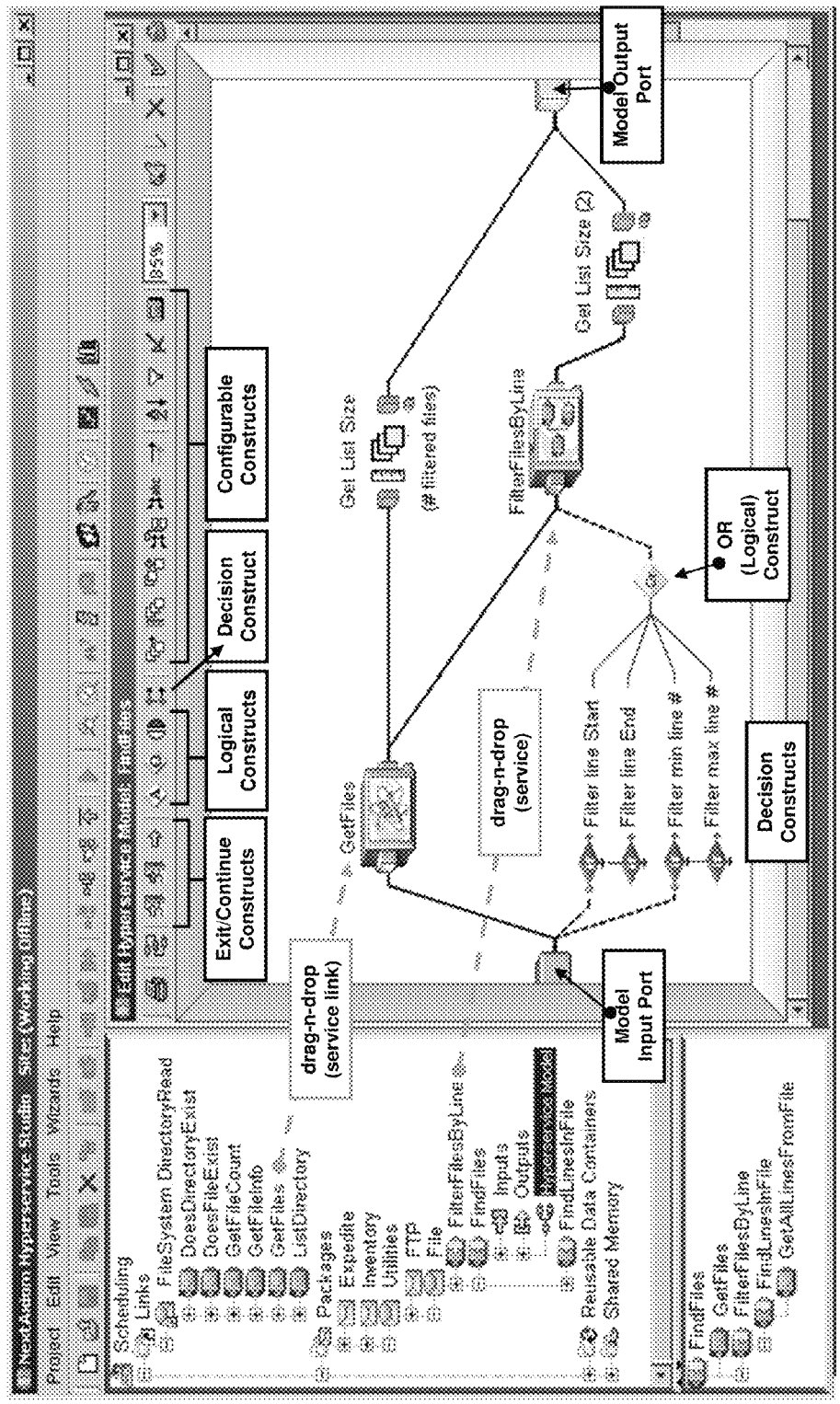
FIG. 16  Visual Definition of Composite Service

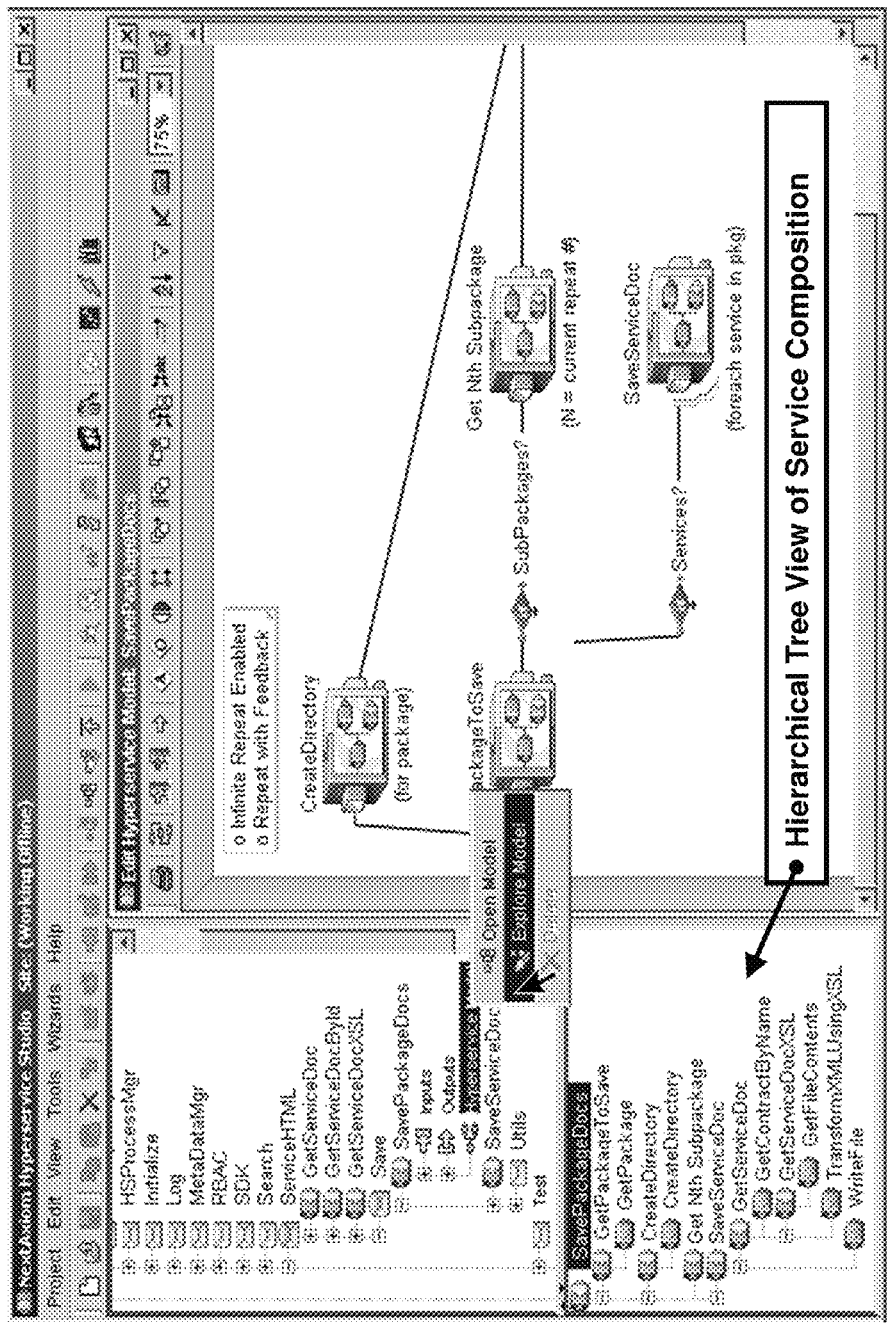
FIG. 17  Hierarchical TreeView of Service Composition

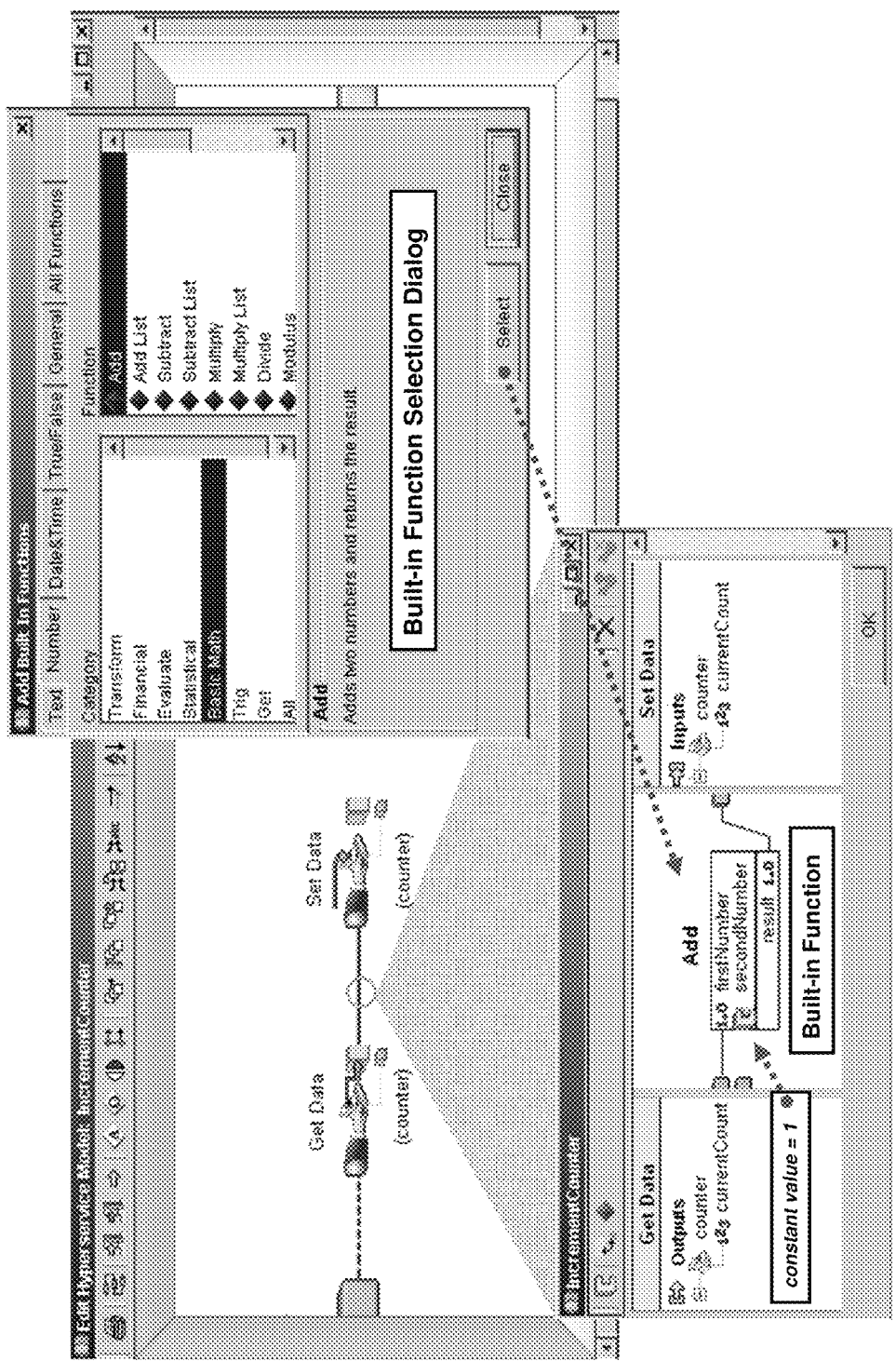
FIG. 18 Built-In Functions – 'Add' Example

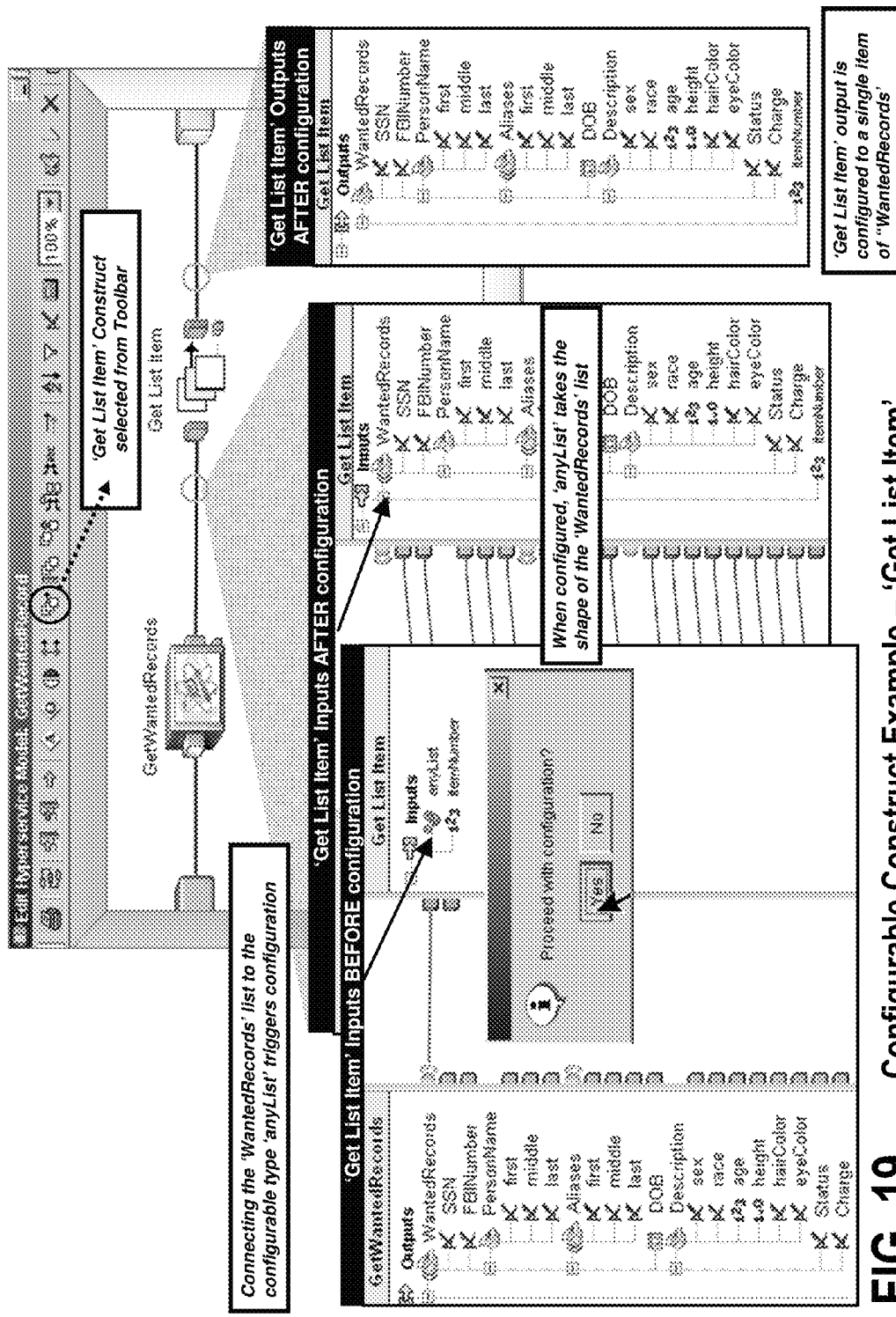
FIG. 19    Configurable Construct Example – 'Get List Item'

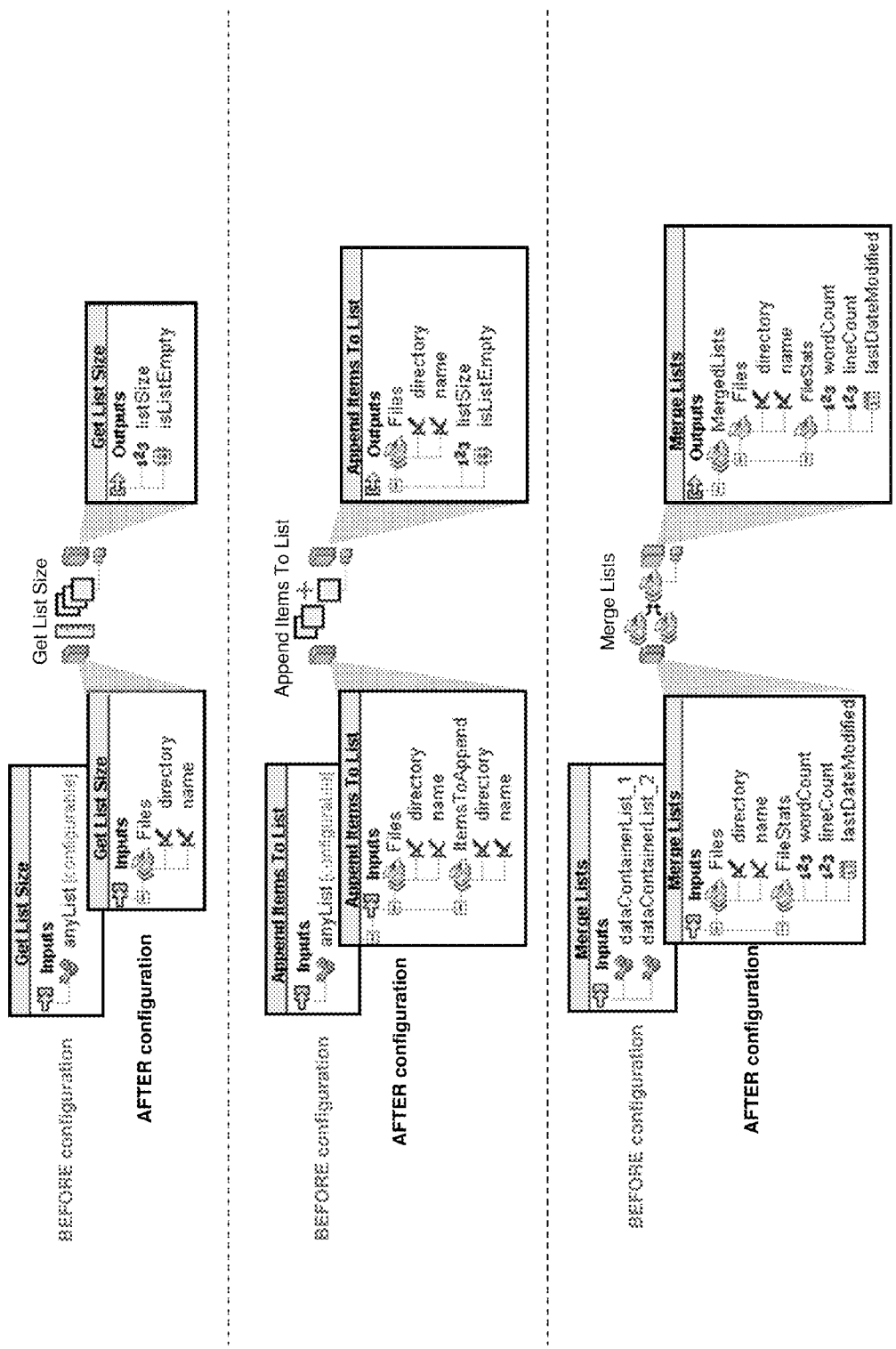
FIG. 20  Configurable Constructs – example constructs that manipulate lists

```xml
<NXAGetListSizeConstruct isConfigured="true">
    <HSContract contractCategory="0" contractName="Get List Size" contractType="0" id="-7"
limitMaxConcurrentThreads="false" logEnabled="false" maxConcurrentThreads="2" revisions="" runBatchInParallel="false"
startDate="Nov-17-2003">
        <imagePath>Images/getListSize.gif</imagePath>
        <contractConfiguratorName>com.nextaxiom.composite.configconstructs.NXAGetListSizeConstruct</contractConfiguratorName>
    </HSContract>
  + <HSDataContainer Type list="true" name="Inputs" required="true" revision="" systype="true">
        <HSDataContainer Type list="true" name="List" required="true" revision="">
            <HSString name="nonListTextfield2" required="true" xmlNodeType="1"/>
        </HSDataContainer Type>
    </HSDataContainer Type>
  + <HSDataContainer Type list="true" name="Outputs" required="true" revision="" systype="true">
        <HSInteger name="listSize" xmlNodeType="1"/>
        <HSBoolean name="isListEmpty" xmlNodeType="1"/>
    </HSDataContainer Type>
</HSContract>
  + <HSContractNode customLabel="" id="-3" occurrences="1"/>
</NXAGetListSizeConstruct>
```

FIG. 21A    Configurable Constructs: example constructs that manipulate lists

```xml
<NXAAppendListConstruct isConfigured="true">
  <HSContract contractCategory="0" contractName="Append Items To List" contractType="0"
    id="-7" limitMaxConcurrentThreads="false" logEnabled="true" maxConcurrentThreads="2" revision=""
    runBatchInParallel="false" startDate="Nov-17-2003">
    <imagePath>Images/appendlist.gif</imagePath>
    <contractConfiguratorName>com.nextaxiom.composite.configconstructs.NXAAppendListConstruct
    </contractConfiguratorName>
    <HSDataContainerType list="true" name="Inputs" required="true" revision="" systype="true">
      <HSDataContainerType list="true" name="List3" required="true" revision="">
        <HSString name="nonListTextField3" required="true" xmlNodeType="1" />
      </HSDataContainerType>
      <HSDataContainerType list="true" name="ItemsToAppend" required="true" revision="">
        <HSDataContainerType list="true" name="List3" required="true" revision="">
          <HSString name="nonListTextField3" required="true" xmlNodeType="1" />
        </HSDataContainerType>
      </HSDataContainerType>
    </HSDataContainerType>
    <HSDataContainerType list="true" name="Outputs" required="true" revision="" systype="true">
      <HSDataContainerType list="true" name="List3" required="true" revision="">
        <HSString name="nonListTextField3" required="true" xmlNodeType="1" />
      </HSDataContainerType>
      <HSInteger name="listSize" xmlNodeType="1" />
      <HSBoolean name="isListEmpty" xmlNodeType="1" />
    </HSDataContainerType>
  </HSContract>
  <HSContractNode customLabels="" id="-7" occurrences="1" >
</NXAAppendListConstruct>
```

FIG. 21B  Configurable Constructs: example constructs that manipulate lists

FIG. 21C  Configurable Constructs: example constructs that manipulate lists

Configurable Constructs
- Calculator

Configurable Constructs
- Text generator

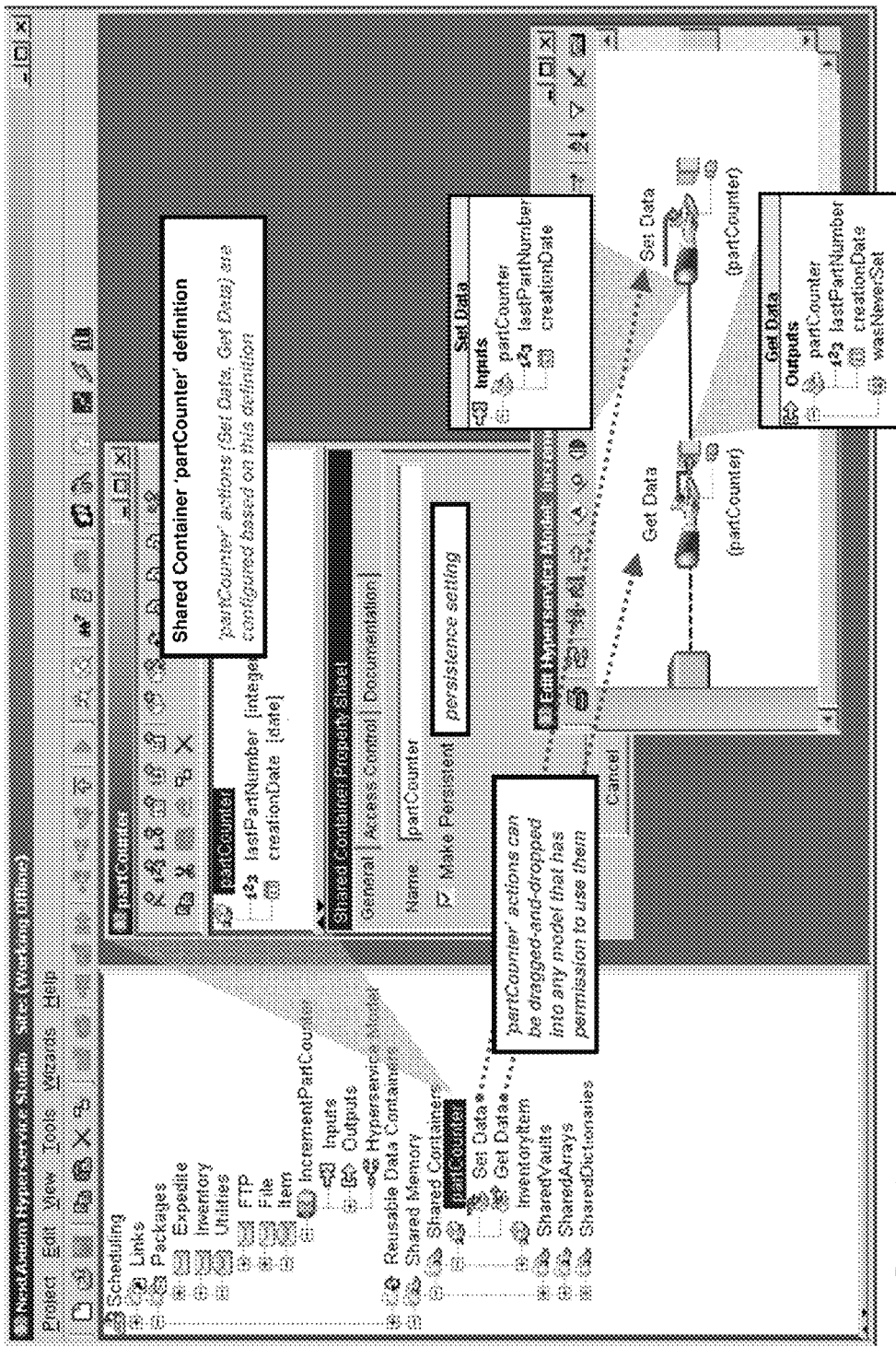
FIG. 24   Shared Memory – Shared Data Container

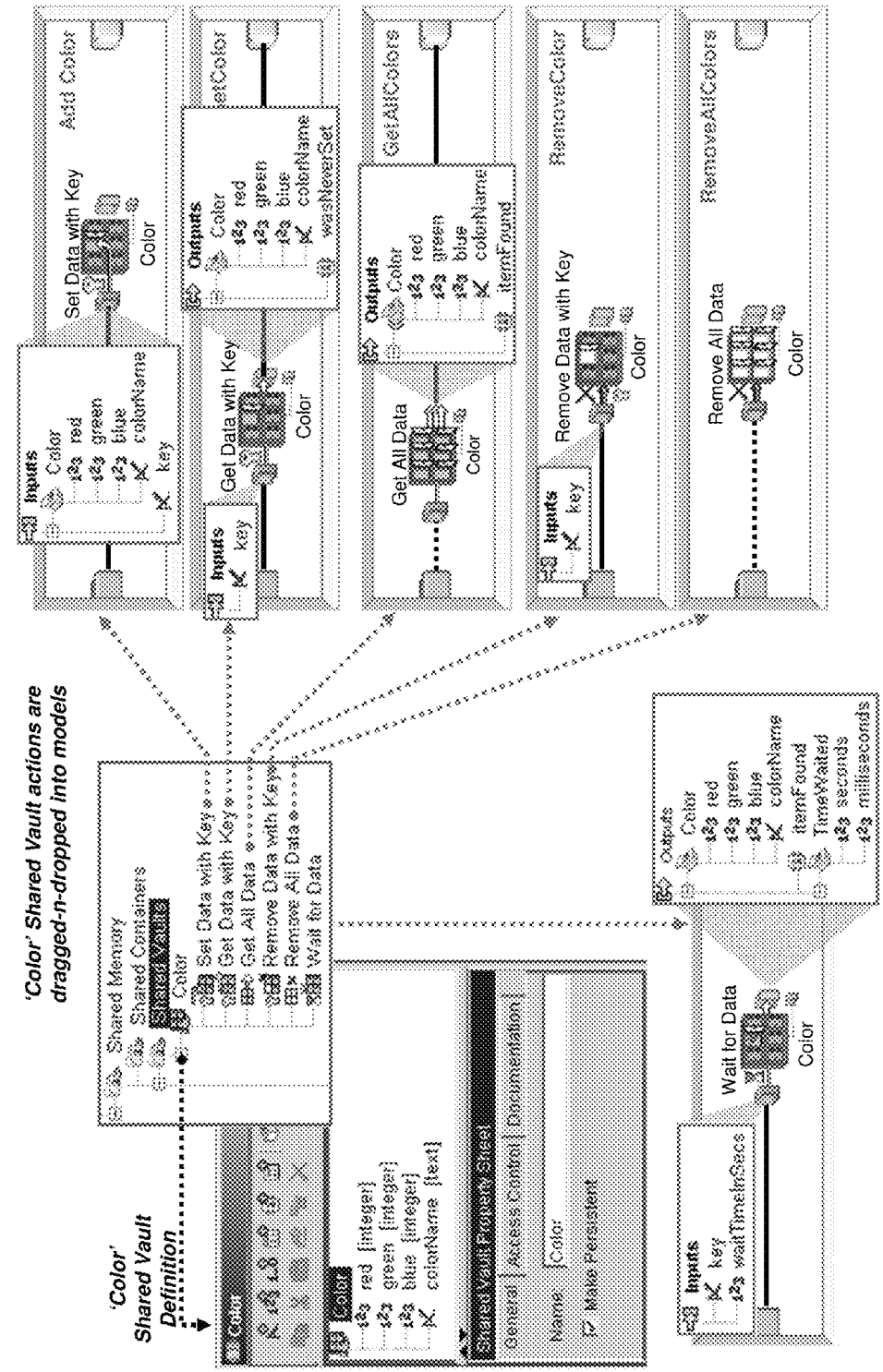
FIG. 25  Shared Memory – Shared Vault

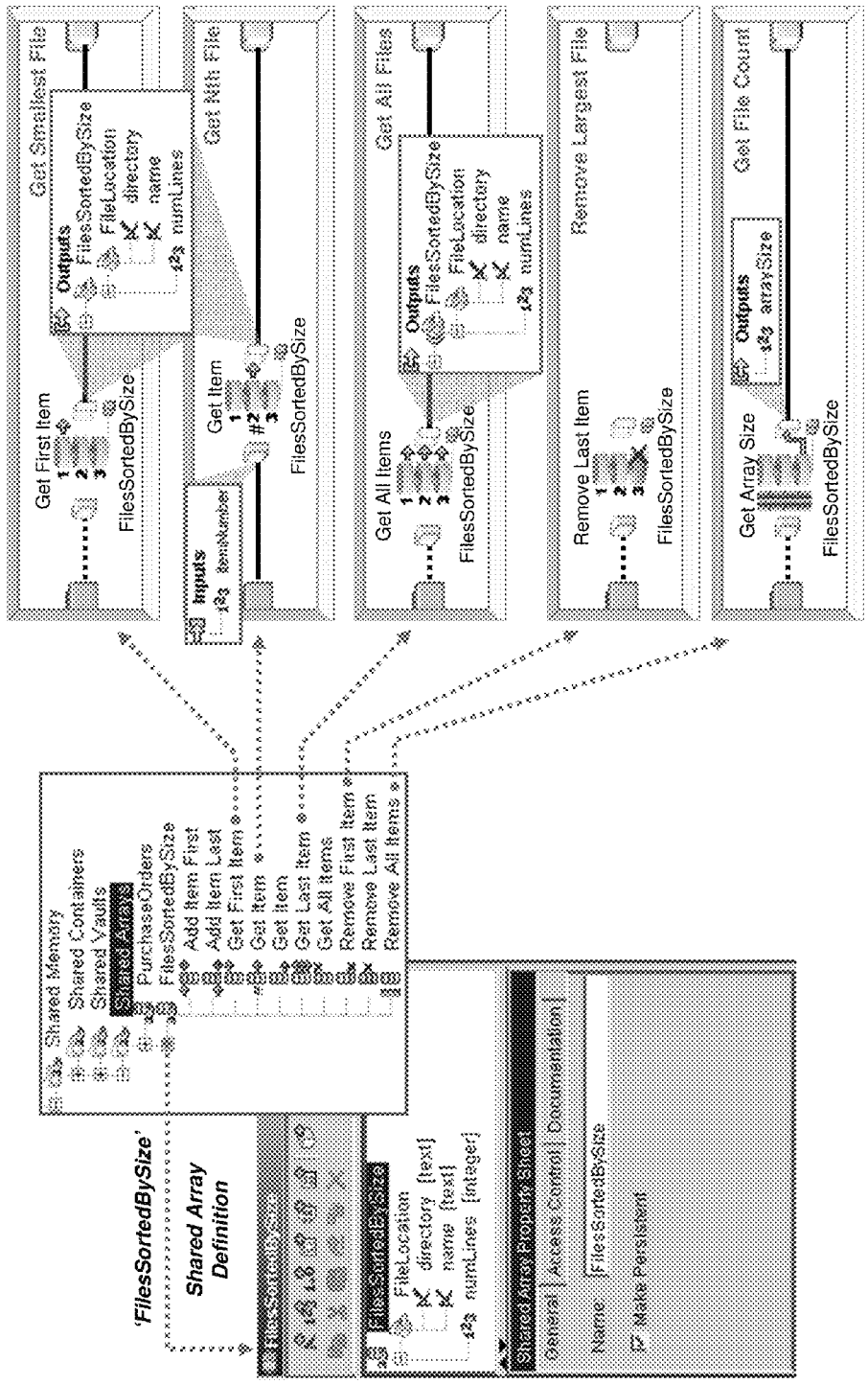
FIG. 26  Shared Memory – Shared Array

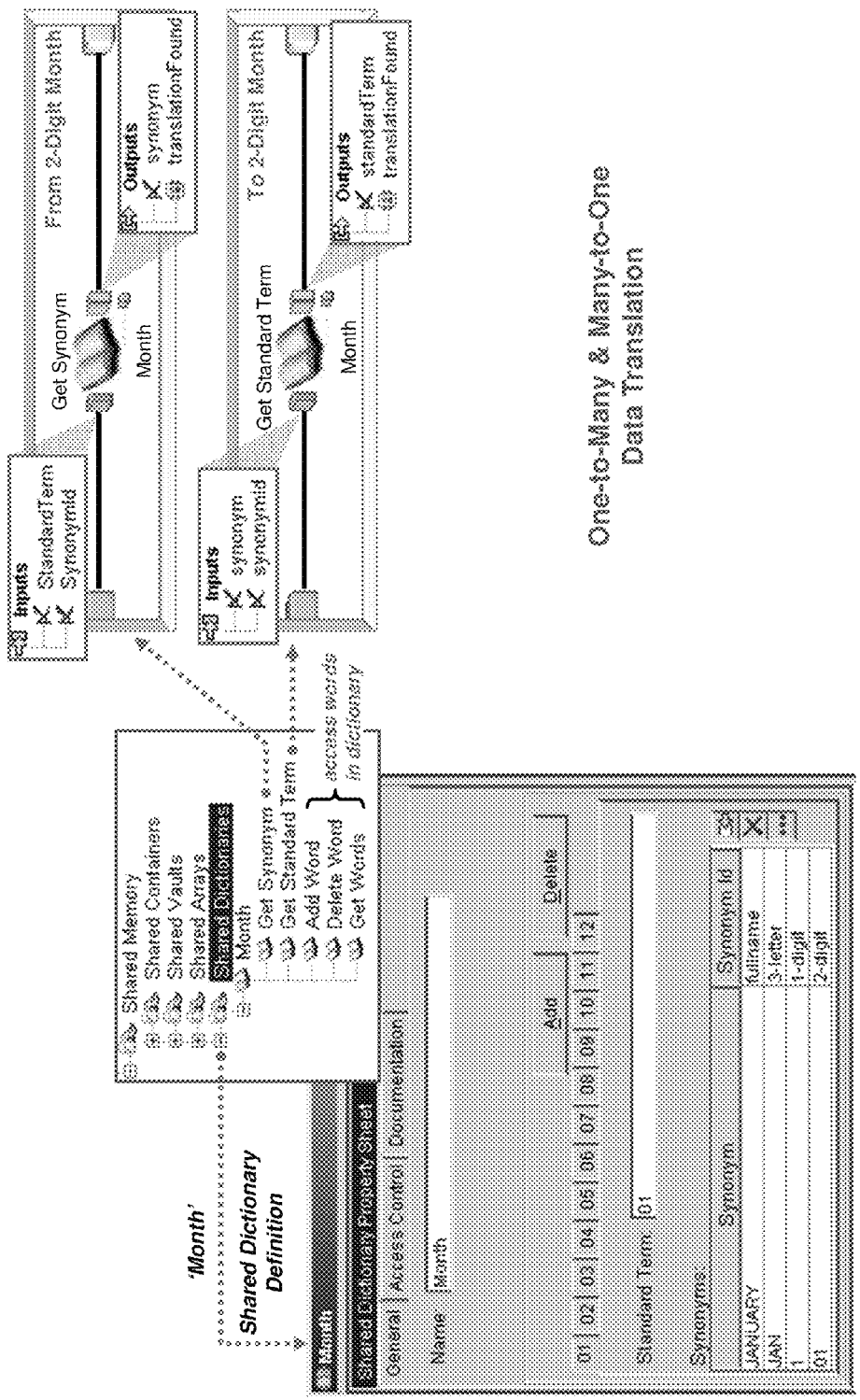
FIG. 27    Shared Memory – Shared Dictionary

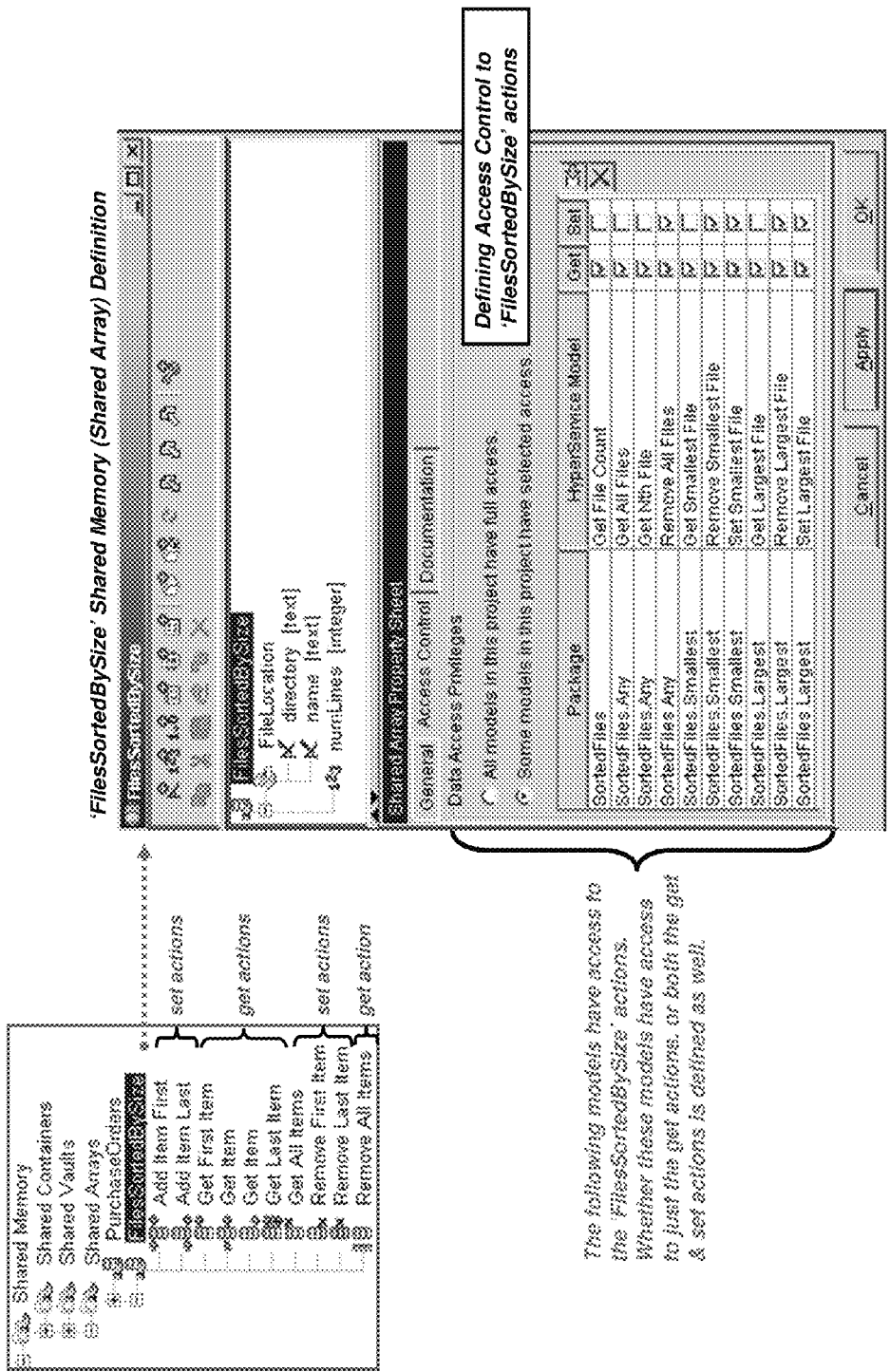
FIG. 28  Shared Memory – Access Control

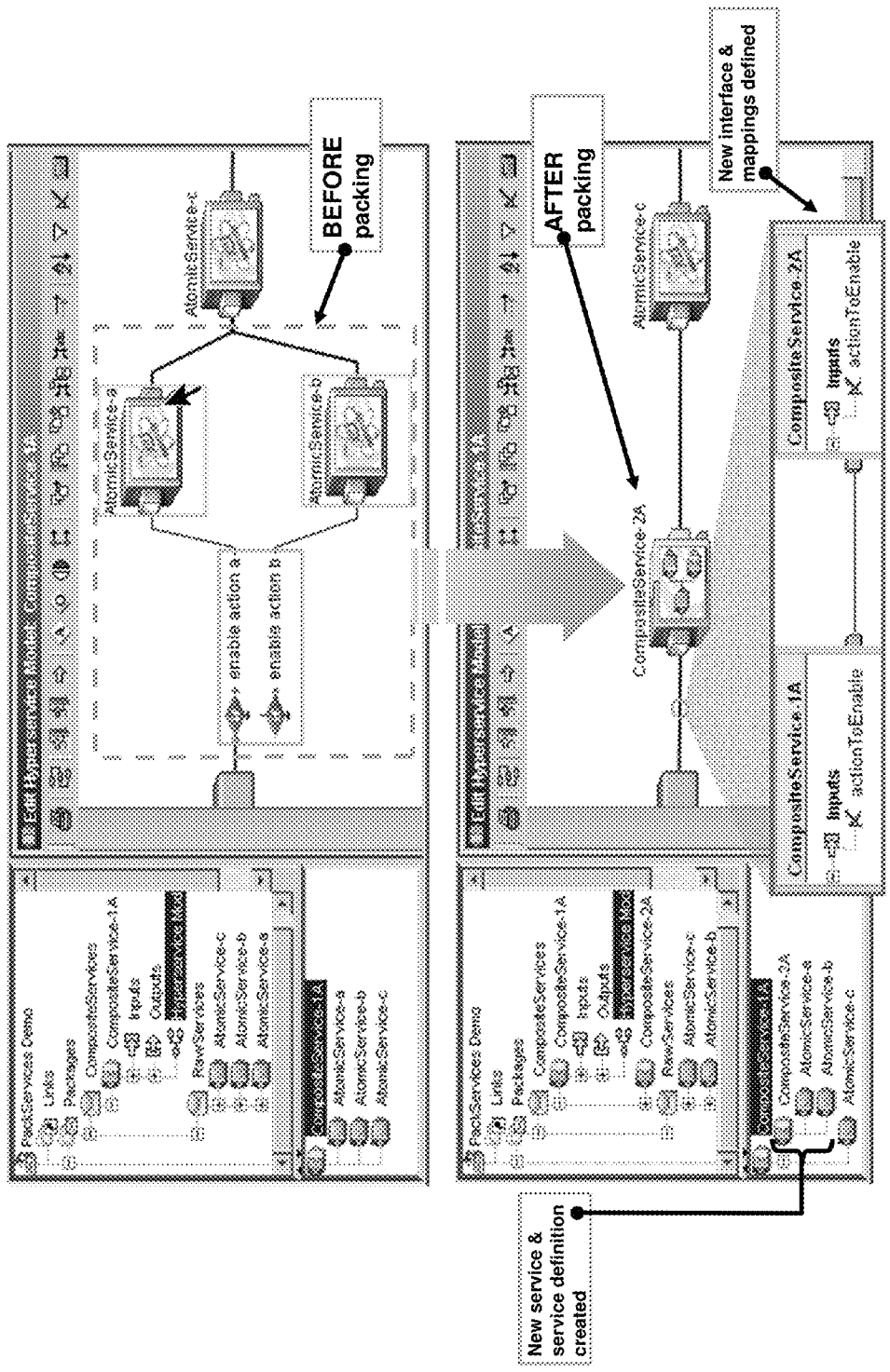
FIG. 29  Automated Composite Service Creation

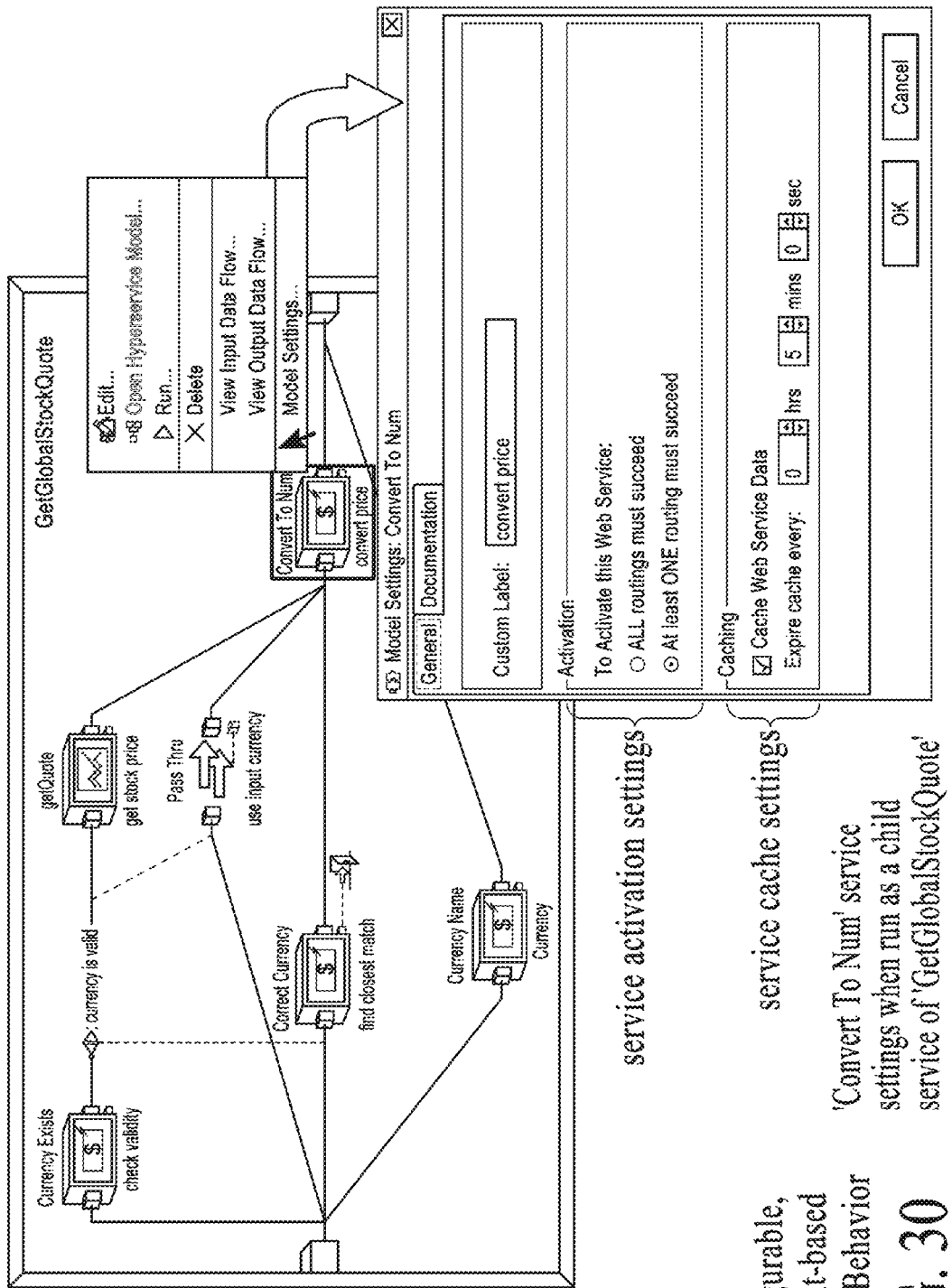

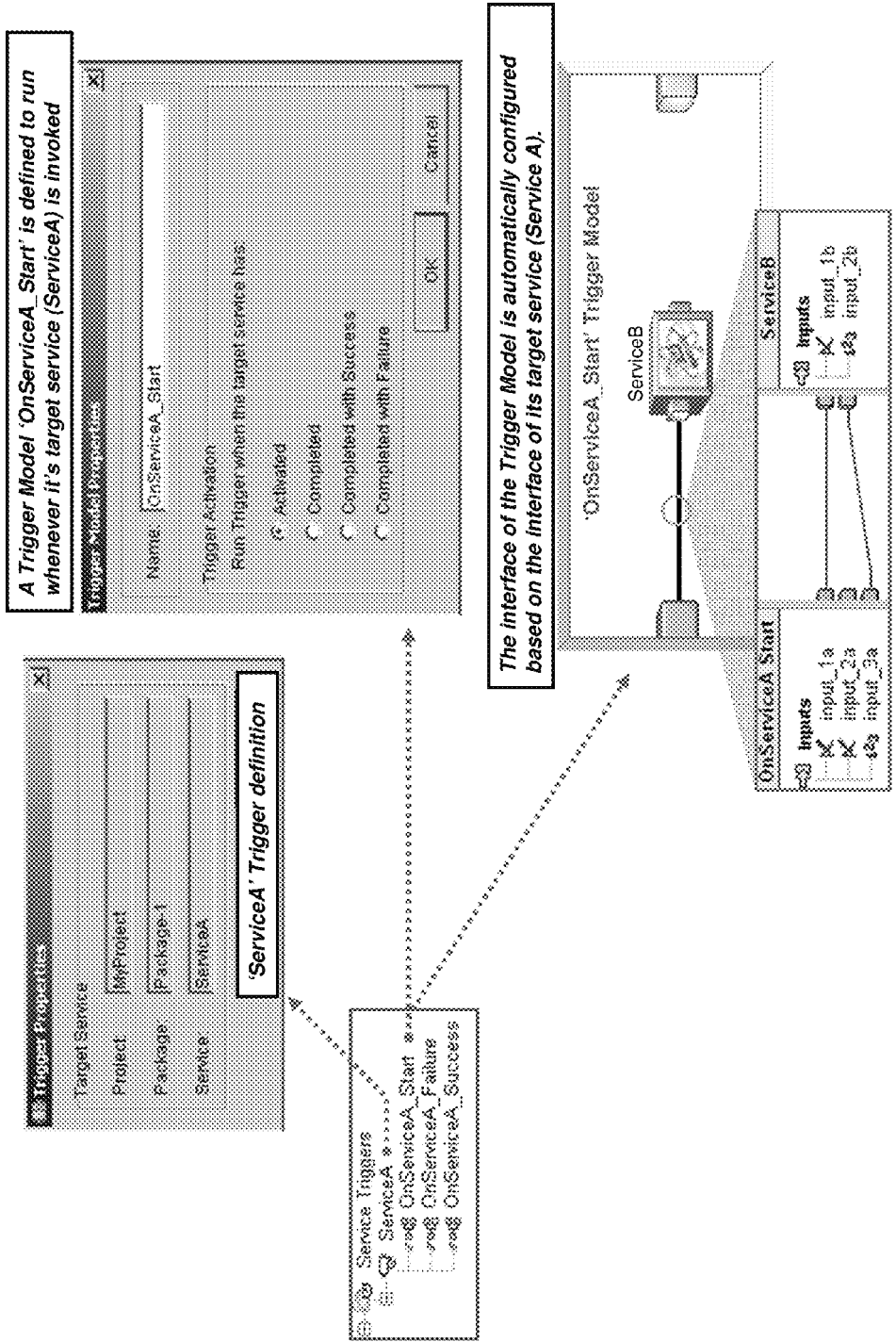
FIG. 31    Service Triggers & Trigger Models

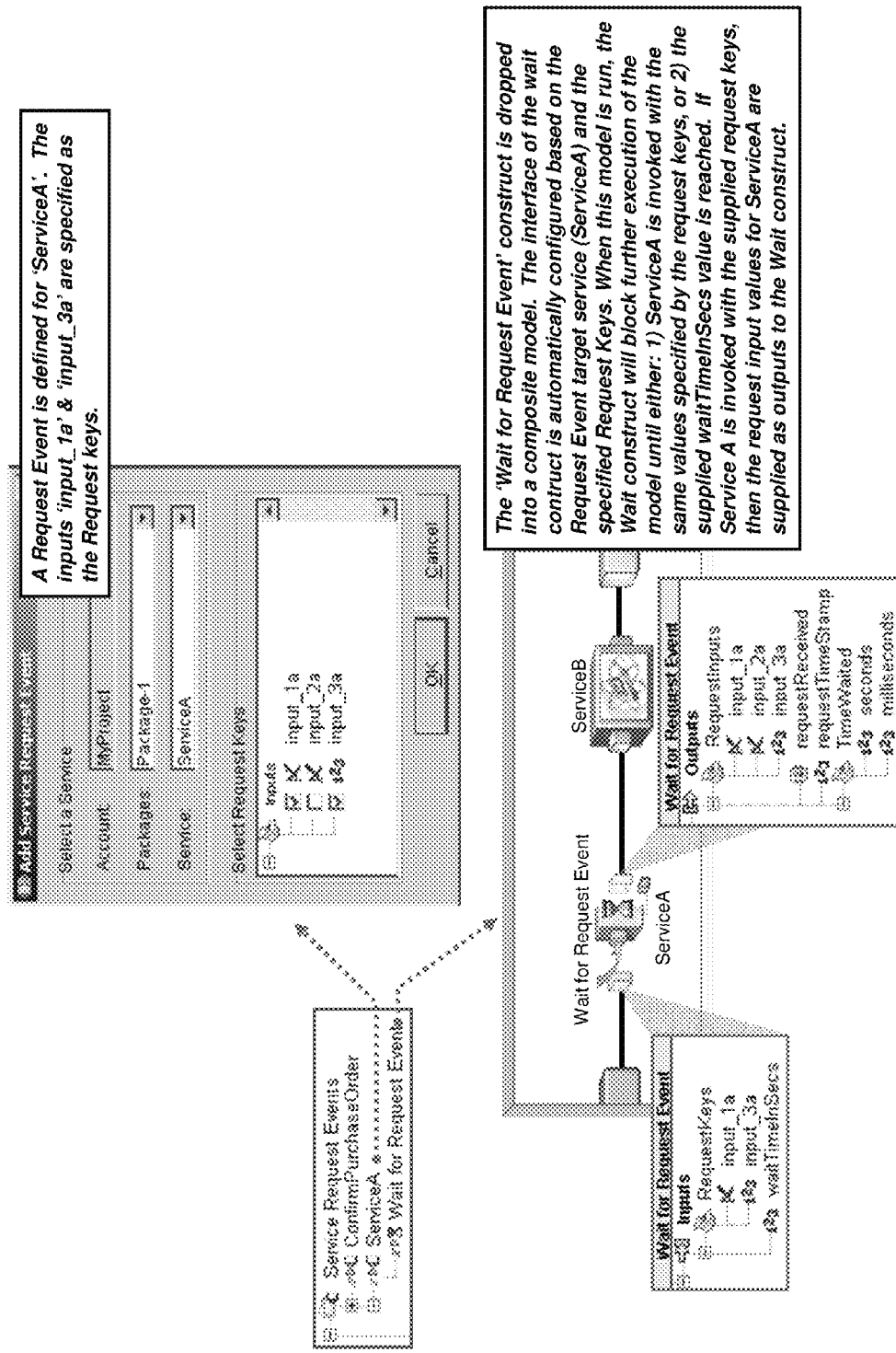
FIG. 32 Service Request Events – asynchronous notification of service invocation

SEMANTIC-BASED, SERVICE-ORIENTED SYSTEM AND METHOD OF DEVELOPING, PROGRAMMING AND MANAGING SOFTWARE MODULES AND SOFTWARE SOLUTIONS

CROSS-REFERENCES TO RELATED APPLICATIONS

This application is a divisional of and claims the priority benefit of U.S. patent application Ser. No. 10/904,744, entitled "Semantic-Based, Service-Oriented System and Method of Developing, Programming and Managing Software Modules and Software Solutions," filed on Nov. 24, 2004, which claims the benefit of Provisional patent application Ser. No. 60/481,702, filed on Nov. 25, 2003, entitled "A Semantic-Based Method of Building Distributed Software Modules from other Distributed Software Modules", all of which are incorporated herein by reference.

BACKGROUND OF THE INVENTION

1. Field of the Invention

The present invention relates to the field of computer programming, software development and management and, in particular, to the design, service-oriented programming, implementation, integration, deployment, control and maintenance of software modules/services and software applications.

2. Description of the Related Art

There are many computer programming languages, software design and development, and integration tools in existence today.

The current state for programming languages and software design tools is based on the well-known object-oriented development paradigm. Object-oriented programming languages inherit the complexity of the object-oriented paradigm. The current programming languages require an unnatural syntax-based coding or scripting approach that does not directly correspond to the way that non-technical people, functional experts and business analysts think. Furthermore, these languages often pivot around class definitions, class inheritance and polymorphism. These complex concepts require steep learning curves and can be only understood and utilized by highly technical programmers or computer scientists. Most people with functional know-how and understanding of business and application requirements are not technical enough to directly utilize the current programming languages and software development tools. As a result of this complexity, software development projects take too long to complete and are too expensive and non-flexible when it comes to the inevitable need for enhancements and maintenance.

Furthermore, the current integration tools are based on a message oriented paradigm and only accommodate the communication and translation between different software layers. These tools are also too complex and are either not sufficient for general purpose programming, or utilize the complex object-oriented paradigm to accommodate programming capabilities.

It takes too long to develop, customize and integrate enterprise software solutions and the end result is too rigid. Today's approach to building software is very much like pouring concrete. Like developing software solutions, pouring concrete requires heavy lifting while the concrete is fluid. After the concrete sets, it is inflexible as is the case with the current approach to developing and delivering software solutions. A significantly less complex approach to software development can dramatically decrease the time to deliver software solutions. A dramatic decrease in the time to deliver will often correlate to a proportional decrease in cost. Time and cost are two main components of agility. Therefore, a significantly less complex approach to developing and delivering software solutions will increase the agility of an organization. If it took three weeks, instead of nine months to deliver or modify a software solution to support a business activity, organizations could optimize their operations in response to change and become significantly more agile. They could undertake less costly projects that would not be possible to undertake with an otherwise larger timescale.

SUMMARY OF THE INVENTION

Service-Oriented Architecture has been gaining popularity among software vendors and Information Technology users in the recent years. In a Service-Oriented Architecture (SOA), a service interface is used as a logical unit of communication between different software layers. SOA addresses the interoperability issue between different software systems through industry standards. Most software vendors have incorporated standards-based software services as the means of interfacing with other software applications and tools. Web services standards, such as Web Service Definition Language (WSDL) and Universal Description, Discovery and Integration (UDDI), make the traditional three-tier architecture interoperable. Each tier can provide or consume easily deployable "black-boxes" of software functionality through standard-based service interfaces. However, service-oriented, standards based communication does not make the application logic in the middle-tier more adaptable or easier to program.

A software service has a well-defined interface and performs a well-defined software task. The interface represents the inputs and outputs of a black-boxed software service as well as the properties of that service, such as service name and location. The interface acts as a contract between the consumer of the software service and the producer of the service.

The main object of the present invention is to introduce a general-purpose, service-oriented programming method that takes the idea of service-orientation beyond standards-based communication. The method of the present invention aims to provide a pure service-oriented approach for programming software logic and organizing the program into software modules (as services) that eliminates the need for coding or scripting while operating within a service-oriented paradigm. This makes the application, business and integration logic in the middle-tier of software architecture ten times faster to develop, maintain, and customize. Due to unique innovations, all application logic that utilizes this approach is adaptable, and can be created and modified on the fly.

The programming method of the present invention enforces a new means of decoupling and organizing a computer program that is fundamentally simpler than object-oriented programming, and significantly more flexible than any of its predecessors. This simple, yet powerful approach provides the base required to truly enable a one-hundred percent code-free, script-free, metadata-driven software development platform.

An object of Service-Oriented Programming (SOP), as defined by the method of the present invention, is to provide a revolutionary technique for developing software that uses a service interface as the pivot-point for developing computer program modules as services, and furthermore to natively support services as its fundamental unit of work at both development and execution time. Unlike a function or object-oriented method interface, a service interface supports rich integrity rules and allows for multiple, order-independent, complex types on both the inputs and outputs of a software task. The runtime kernel called for by the method of the present invention provides native support for this rich service interface—it enforces integrity rules (in real-time), handles complex inputs and outputs, and uses flexible specifications to direct runtime behavior and to dispatch internal as well as remote software tasks. Here, the interface of the service accommodates private properties, not exposed to the consumer, used as a contract between the service and the runtime environment. These properties address technical properties such as service 'timeout' all the way to sophisticated behavior such as synchronization of service instances, cache keys, logging, and metering behavior.

A software service can be either implemented by coding in an object-oriented or functional environment bridged to the method of the present invention, or it can be implemented in a semantic-based programming environment based on the method of the present invention.

The present invention aims to provide a collection of methods to accomplish its objectives. An object of the present invention is to provide a method for building well-defined software modules (as software services), including, but not limited to "Web services", through the optionally nested aggregation of other likewise modules at any depth.

A further object of the present invention is to provide visual methods and systems of aggregation and nesting of software interfaces within composite service definitions with an automated runtime.

A further object of the present invention is to provide visualization methods for nested composite services.

A further object of this invention is to provide mechanisms for organizing, and discovering software services.

A further object of the present invention is to provide a method to correctly refactor a set of contained services, within a composite service, as a new composite service encapsulating those contained services.

A further object of the present invention is to provide a method to correctly unfactor services inside a parent composite service within another parent composite service.

A further object of the present invention is to allow context-sensitive configuration of the behavior for software services contained in a composite service.

A further object of the present invention is to provide programming capabilities in a graphical environment (that requires no coding) where those capabilities are based on service interfaces and a set of innovative constructs.

Another object of the present invention is to provide a method and mechanism for defining and controlling the flow of execution within a composite service.

A further object of the present invention is to provide a technique for configuring a software interface and providing automatic implementation for the configured interface.

Another object of the present invention is to provide means for mapping data and data transformations between connected services contained in a composite service.

A further object of the present invention is to provide a context-based mechanism for inter-service communication through shared memory.

A further object of the present invention is to provide a mechanism for exception handling within a composite service definition.

Another object of the present invention is to provide visual means for inspection and debugging of nested composite services.

Yet another object of the present invention is to provide a method of provisioning for software services based on their interfaces.

Other objects and advantages of this invention will be set in part in the description and in the drawings, which follow and, in part, will be obvious from the description, or may be learned by practice of the invention. Accordingly, the drawings and description are to be regarded as illustrative in nature, and not as restrictive.

To achieve the forgoing objectives, and in accordance with the purpose of the invention as broadly described herein, the present invention provides methods, frameworks, and systems for building a software system for the management, implementation and assembly of service-oriented, software modules. In preferred embodiments, this technique comprises: a visualization technique for assembling nested composite services with a semantic-based ability to add programming logic without syntax-based coding. Built-in service flow behavior, and semantic-based branching and looping constructs are provided to enable the systematic and programmatic control over the flow of service invocation. Semantic-based constructs are provided to accommodate service-oriented exception handling. Means for mapping data and data transformations are integrated in the visual assembly environment with automated runtime. Methods for organizing software services and composite definitions and discovery of services are integrated in the visual environment. Techniques for context-based configuration of services within the context of a parent composite service are provided. Furthermore, account-based provisioning of services is accommodated by creating a reference mechanism to software interfaces corresponding to the services under provisioning.

The method further comprises a mechanism for inner process communication through a variety of shared memory structures. An innovative framework together with a set of access and modification methods are used to enable composite services to share data within different instances of the same composite service definition or across the instances of different composite service definitions. The shared memory mechanisms and methods leverage the configurable construct invention together with data synchronization and persistent mechanisms to accommodate inner service communication through shared data storage.

The present invention will now be described with reference to the following drawings, in which like reference numbers denote the same element throughout. It is intended that any other advantages and objects of the present invention that become apparent or obvious from the detailed description or illustrations contained herein are within the scope of the present invention.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6a is an exemplary illustration of controlling service execution flow, through activation, success, and failure ports according to one embodiment of the invention.

FIG. 6b(i) illustrates an example Extensive Markup Language (XML) metadata document representation of controlling the flow of service execution that was generated for the exemplary illustration of FIG. 6a according to one embodiment of the invention.

FIG. 6b(ii) illustrates an example Extensive Markup Language (XML) metadata document representation of controlling the flow of service execution that was generated for the exemplary illustration of FIG. 6a according to one embodiment of the invention.

FIG. 7a is an exemplary illustration of controlling the flow of service execution through logical constructs according to one embodiment of the invention.

FIG. 7b(i) illustrates an example XML metadata document representation of controlling the flow of service execution through logical constructs that was generated for the exemplary illustration of FIG. 7a according to one embodiment of the invention.

FIG. 7b(ii) illustrates an example XML metadata document representation of controlling the flow of service execution through logical constructs that was generated for the exemplary illustration of FIG. 7a according to one embodiment of the invention.

FIG. 8a is an exemplary illustration of controlling the flow of service execution, through conditional branching of decision constructs, based on the data carried by service input/outputs at runtime according to one embodiment of the invention.

FIG. 8b(i) illustrates an example XML metadata document representation for the exemplary illustration of FIG. 8a according to one embodiment of the invention.

FIG. 8b(ii) illustrates an example XML metadata document representation for the exemplary illustration of FIG. 8a according to one embodiment of the invention.

FIG. 9a is an exemplary illustration of the use of exit and continue constructs according to one embodiment of the invention.

FIG. 9b(i) illustrates an example XML metadata document representation of the use of exit and continue constructs of the exemplary illustration of FIG. 9a according to one embodiment of the invention.

FIG. 9b(ii) illustrates an example XML metadata document representation of the use of exit and continue constructs of the exemplary illustration of FIG. 9a according to one embodiment of the invention.

FIG. 10a is an exemplary illustration for repeating the execution of a composite service and configuring other associated properties according to one embodiment of the invention.

FIG. 10b(i) illustrates an example XML metadata document representation for expressing repeat properties of the exemplary illustration of FIG. 10a according to one embodiment of the invention.

FIG. 10b(ii) illustrates an example XML metadata document representation for expressing repeat properties of the exemplary illustration of FIG. 10a according to one embodiment of the invention.

FIG. 10b(iii) illustrates an example XML metadata document representation for expressing repeat properties of the exemplary illustration of FIG. 10a according to one embodiment of the invention.

FIG. 11a is an exemplary illustration for defining data mapping between parent and child services according to one embodiment of the invention.

FIG. 11b(i) illustrates an example XML metadata document representation for expressing data mapping between the parent (containing) service and the child contained service of the exemplary illustration of FIG. 11a according to one embodiment of the invention.

FIG. 11b(ii) illustrates an example XML metadata document representation for expressing data mapping between the parent (containing) service and the child contained service of the exemplary illustration of FIG. 11a according to one embodiment of the invention.

FIG. 11c is an exemplary illustration for defining data mapping between child services according to one embodiment of the invention.

FIG. 11d(i) illustrates an example XML metadata document representation for expressing data mapping between the child services of the exemplary illustration of FIG. 11c according to one embodiment of the invention.

FIG. 11d(ii) illustrates an example XML metadata document representation for expressing data mapping between the child services of the exemplary illustration of FIG. 11c according to one embodiment of the invention.

FIG. 12a is an exemplary illustration for the definition of complex data mapping according to one embodiment of the invention.

FIG. 12b(i) illustrates an example XML metadata document representation for expressing complex data mapping of the exemplary illustration of FIG. 12a according to one embodiment of the invention.

FIG. 12b(ii) illustrates an example XML metadata document representation for expressing complex data mapping of the exemplary illustration of FIG. 12a according to one embodiment of the invention.

FIG. 12b(iii) illustrates an example XML metadata document representation for expressing complex data mapping of the exemplary illustration of FIG. 12a according to one embodiment of the invention.

FIG. 12c is an exemplary illustration for the automatic transfer of data, at runtime, based on the mapping expressions according to one embodiment of the invention.

FIG. 13a is an exemplary illustration of automated multi-threading of the execution of child services within a composite service according to one embodiment of the invention.

FIG. 13b illustrates an example XML metadata document representation for expressing the Execution Graph and HyperCycles for the exemplary illustration of FIG. 13a according to one embodiment of the invention.

FIG. 14 is an exemplary illustration of visual semantic-based debugger for interactive and step-by step execution of a composite service according to one embodiment of the invention.

FIG. 15 is an exemplary illustration of serializing simultaneous requests to a composite service according to one embodiment of the invention.

FIG. 16 is an exemplary illustration of visual programming of a composite service according to one embodiment of the invention.

FIG. 17 is an exemplary illustration of a Hierarchical Tree View of a composite service according to one embodiment of the invention.

FIG. 18 is an exemplary illustration of using a built-in function while defining data mappings between services according to one embodiment of the invention.

FIG. 19 is an exemplary illustration of the configuring an input/output definition of a configurable construct based on input/output of other software services according to one embodiment of the invention.

FIG. 20 is an exemplary illustration of configurable constructs used for data list manipulation according to one embodiment of the invention.

FIG. 21*a* illustrates an example XML metadata document representation for configured constructs that manipulate lists according to one embodiment of the invention.

FIG. 21*b* illustrates an example XML metadata document representation for configured constructs that manipulate lists according to one embodiment of the invention.

FIG. 21*c* illustrates an example XML metadata document representation for configured constructs that manipulate lists according to one embodiment of the invention.

FIG. 24 is an exemplary illustration of an extensible method for defining shared memory containers according to one embodiment of the invention.

FIG. 25 is an exemplary illustration of shared vault according to one embodiment of the invention.

FIG. 26 is an exemplary illustration of shared array according to one embodiment of the invention.

FIG. 27 is an exemplary illustration of shared dictionary according to one embodiment of the invention.

FIG. 28 is an exemplary illustration of an access control mechanism for granting access of shared memory methods to some composite services and restricting access from the others according to one embodiment of the invention.

FIG. 29 is an exemplary illustration for the automated creation of a composite service given a selected subset of services to be encapsulated, within a higher-level composite service according to one embodiment of the invention.

FIG. 30 is an exemplary illustration of the configurable, context-sensitive behavior for software services contained in a composite service according to one embodiment of the invention.

FIG. 31 is an exemplary illustration for the Service Trigger and Trigger Model mechanisms according to one embodiment of the invention.

FIG. 32 is an exemplary illustration for the service request events and the asynchronous notification of service invocation according to one embodiment of the invention.

DESCRIPTION OF THE PREFERRED EMBODIMENTS

The present invention is a collection of many related innovative techniques, methods and systems for building well-defined software modules, including, but not limited to "Web services", through the optionally nested aggregation of other likewise modules at any depth. There are two distinct aspects of a software module (i.e. software service). The first is the interface of the service. The interface of the service defines the inputs, outputs and the properties of the service. The second aspect of a software service is the implementation of the service. The method of the present invention defines a pure service-oriented approach in implementing software modules by strictly separating these two aspects, and providing an implementation paradigm based on the interface of software services. The reader may refer to www.nextaxiom.com for obtaining a downloadable version of the Hyperservice® Business Platform that is an example implementation of the methods, techniques and the systems discussed in the present invention while identifying her/his request for download in the context of this patent application.

Figure 4:
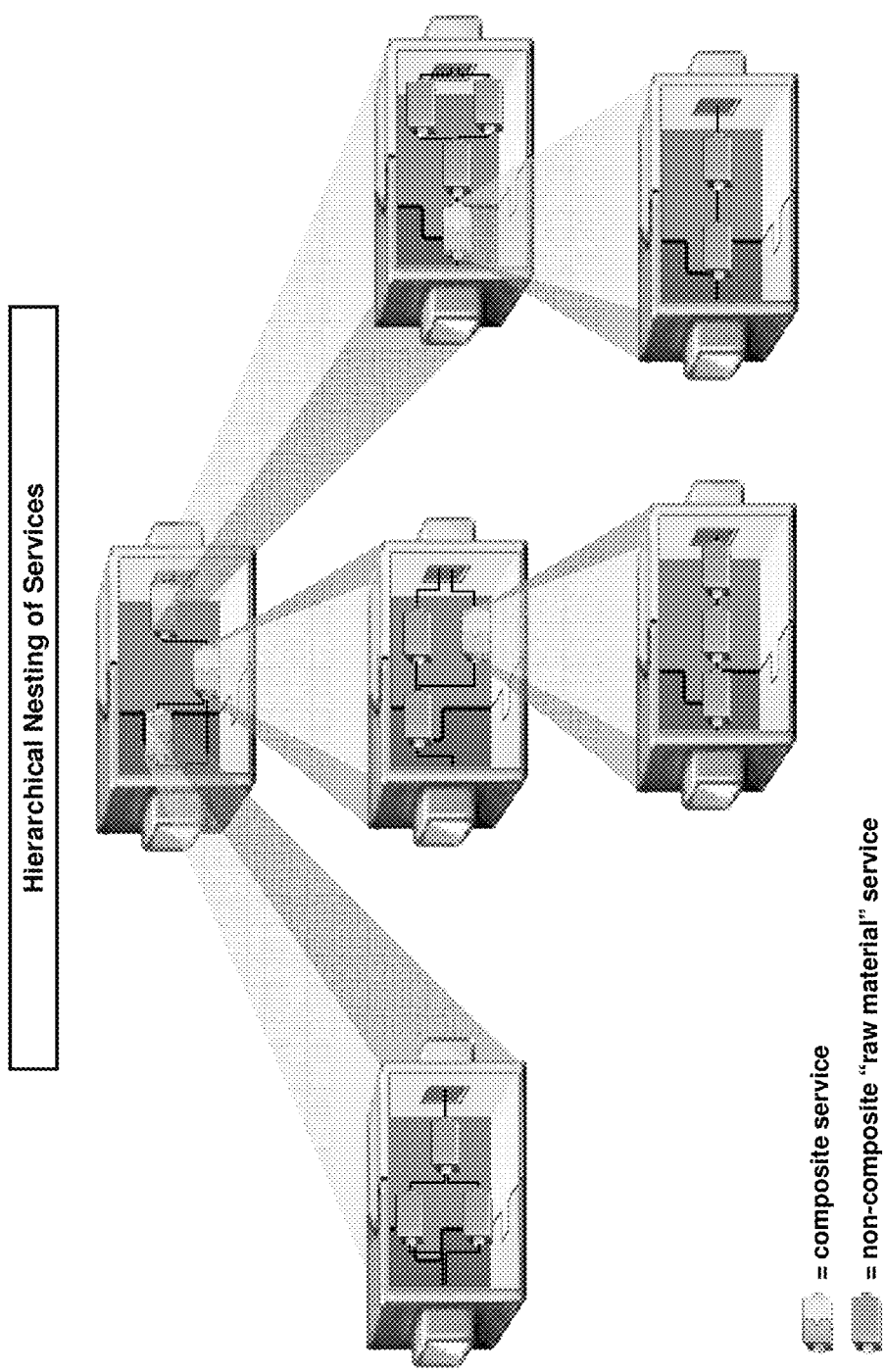
FIG. 4 is an illustration of a nested encapsulation/containment of one composite software service by another according to one embodiment of the invention.

One aspect of the present service-oriented invention is in its hierarchical, nested approach to the organization of a software module (i.e. software services). Based on this approach, as depicted in FIG. 4, a software service can be composed of other services, which in turn may be composed of other services, and so on, without a preset limit on the depth of composition. Each level of composition (i.e. implementation) is encapsulated from the containing parent level through its interface definition. The platform for the service-oriented paradigm of the present invention further distinguishes a software service implemented through this composition paradigm, herein referred to as a composite service or a Hyperservice®, from one implemented through any other programming paradigm, or with a distributed implementation (i.e. computer address space other than the instance of the executing platform) as an atomic (or raw material) service.

Another aspect of the present invention is in the method of composition used in assembling software services for the purpose of defining the implementation of a composite service. A set of semantic-based programming constructs control the flow of execution of child services that exist within the definition of a composite service; wherein, connecting either the success or the failure port of a contained service to the activation port of another service establishes a dependence between the invocation of the two services whereby the latter service is automatically invoked after the former service. If the failure port was connected, the latter service is only invoked if the former service fails as a result of its execution. But, if the success port was connected, the latter service is only invoked if the former service succeeds as the result of its execution. Either the simultaneous connection of both failure and success ports can be disallowed, or it can be interpreted as a positive activation signal for executing the latter service. Referring to an example depicted in FIG. 6*a*, an activation port is associated with the input side, and a success and a failure port is associated with the output side of each presentation of a contained service. The automatic runtime system implementing the methods of the present invention provides the built-in behavior with respect to these ports. Again, referring to FIG. 6*a*, Service-A begins execution when the execution of the parent/containing service begins. Service-B and Service-C are only executed if Service-A's invocation was successful since they are attached to the success port of Service-A. Otherwise, if Service-A fails upon execution, Service-D is invoked by the automatic runtime platform since it is connected to the failure port of Service-A.

Among other benefits, the failure port provides a built-in flow mechanism for exception handling that is service-oriented (i.e. implemented through services). For example, Service-F is only activated when Service-D fails to handle the failure (i.e. exception handling). Again, referring to FIG. 6a, Service-E is activated upon the success of Service-B AND service Service-C since its activation port is connected to the success ports of Service-B and Service-C. A set of logical activation constructs are introduced, based on the method of the present invention, to give those implementing a composite service control to change the default AND logic such as that mentioned in the case of Service-E from FIG. 6a. FIG. 6b is an example metadata representation of FIG. 6a.

The method of the present invention provides the ability to connect the failure or success port of any service as well as any of the other constructs to any of a set of logical flow constructs, including but not limited to AND, OR and NOT constructs. Each of the logical constructs can operate on the flow signals of failure and success ports as well as signals generated by other constructs. Flow signals from many services can be connected to an AND construct, and the output signal generated by the AND construct is only an activation signal if all signals flowing into it indicate activation. The OR construct generates an activation signal if at least one signal flowing into it indicates activation. The NOT construct takes a flow signal as input and generates the negation of that signal on the output side. Now, referring to FIG. 7a for an example, the success ports of Service-A and Service-B are connected to an AND construct and an output signal from the AND construct is mapped to the activation port of Service-E whereby Service-E will be only invoked if both Service-A and Service-B execute successfully. Again, referring to FIG. 7a, the failure ports of Service-C and Service-D are connected to an OR construct and the output signal of the OR construct Service-F. Here, Service-F is activated if either Service-C or Service-D fails upon execution. The output signal of the OR construct is also connected to a NOT construct and the NOT construct is connected to the activation port of Service-G. Here, the NOT construct generates an activation signal that results in the activation of Service-G only if the OR construct outputs a deactivation signal (which only happens if either Service-C or Service-D fail to execute successfully). FIG. 7b is an example metadata representation of FIG. 7a.

The method of service composition outlined by the present invention provides a Decision construct for controlling the flow of invocation, through branching, based on the actual data carried by service inputs/outputs at runtime. The method of the present invention provides the graphical ability to associate data elements from the inputs of the parent service or the outputs of any contained service to a branch of a decision construct. This association automatically defines the left-hand-side of a logical operator. The user then selects a logical operator from a list (those available to all databases query languages and higher level programming languages). The user then associates data from the inputs of the parent service or the outputs of any contained service to automatically define the right-hand-side of the logical operator. The method also provides the ability to add as many such branches to a Decision construct to create the logical equivalent of an "IF/ELSE-IF/ELSE-IF/ELSE" statement similar to those of general purpose programming languages. Furthermore, the method of the present invention provides for the association of a True port and False port with each decision branch. These ports are mutually exclusive; during runtime, only one of these ports will generate an activation signal. The True port of a decision branch generates an activation signal if the condition represented by that branch is True. The False port of a decision branch generates an activation signal if the condition represented by that branch is False. Each decision branch is chained to the next through the False port of the previous branch. During runtime, the evaluation of the next decision branch is only activated if the False branch of the previous branch is activated. If the evaluation of all branches result in a False value, the False port of the last decision branch is activated. Referring to FIG. 8a for an example, you can see the composite implementation of an "ExpediteItem" service used in a hypothetical manufacturing environment. Inside the ExpediteItem service (i.e. its composite definition) is a "Get Qty on Hand" service where the success port of the "Get Qty On Hand" service is connected to a Decision construct with two branches. The figure shows a data-mapping tool that is used to express the mapping between data from the outputs of the "Get Qty On Hand" service and the Decision construct as well as data from the inputs of the ExpediteItem composite service and the Decision construct. On the top portion of the left side of the mapper tool, the inputs "itemID" and "requestedQty" are displayed; and, on the bottom portion of the left side of the mapper tool, the outputs "on HandQty" and "item Location" of the "Get Qty On Hand" service are displayed. On the right portion of the mapper tool, the two branches of the Decision construct of this example are displayed. During runtime, the True port of the first branch produces an activation signal if the "requestedQty" of the ExpediteItem service is less than or equal to the "on HandQty" of the "Get Qty On Hand" service. If this condition is not true, the second branch is evaluated. The True port of the second branch produces an activation signal if the "on HandQty" of the "Get Qty On Hand" service is greater than zero (a constant value of zero is attached to the right hand side of the second branch). Based on the logic implemented in the composite "ExpediteItem" service, at runtime, if either the condition in the first branch or the second branch evaluates to true, Service-A is invoked. However, Service-B is invoked only if the condition in the second branch (i.e. "on HandQty" being greater than zero) evaluates to true. If the condition in neither of the branches evaluates to true, the composite Service-C will be invoked since it is connected to the False port at the bottom of the decision construct. This False port is equivalent to an "else" statement of programming languages. FIG. 8b is an example metadata representation of FIG. 8a.

Another method of the present invention that controls the flow of execution within a composite implementation of a software service is introduced through exit and continue graphical flow constructs. These constructs have well-defined, built-in behavior at runtime. Furthermore, these constructs are part of the exception handling mechanisms provided by the method of the present invention. The method of the present invention supports an "Exit with success" and an "Exit with failure" construct that if reached at runtime, based on the flow of invocation rules, results in the termination of the containing parent composite service with success or failure respectively. Furthermore, the method of the present invention supports a "Continue" construct that if reached at runtime, based on the flow of invocation, results in the continuation to the next flow point (HYPERCYCLE). For example, if the failure port of a child service is connected to a "Continue" construct, then during runtime, if that child service fails, the parent service will continue execution. Now, referring to FIG. 9a, an "Exit with success" construct is connected to Service-A's success port. As a result of this connection, at runtime, if Service-A executes successfully, the execution of the composite service containing Service-A will terminate with a status of success. Based on the example in FIG. 9a, if Service-A fails, Service-B is executed; however, if Service-B fails, since a Continue construct is attached to the failure port of Service-B, the runtime instance of the composite model (i.e. graphical implementation) will not terminate and the execution will flow to the next service (Service-C).

Following the model in FIG. 9a, if Service-C fails to execute successfully due to a "Remote Connection Failure" or an "Invalid Request", the runtime instance of the model will exit with a status of failure; however, if it fails due to a "Logical Failure", Service-D will be invoked. Therefore, based on the method of the present invention, the construct or service connected to the failure port of a service can be activated upon specific failure types, based on the application designer's selection. FIG. 9b is an example metadata representation of FIG. 9a.

Figure 10B:
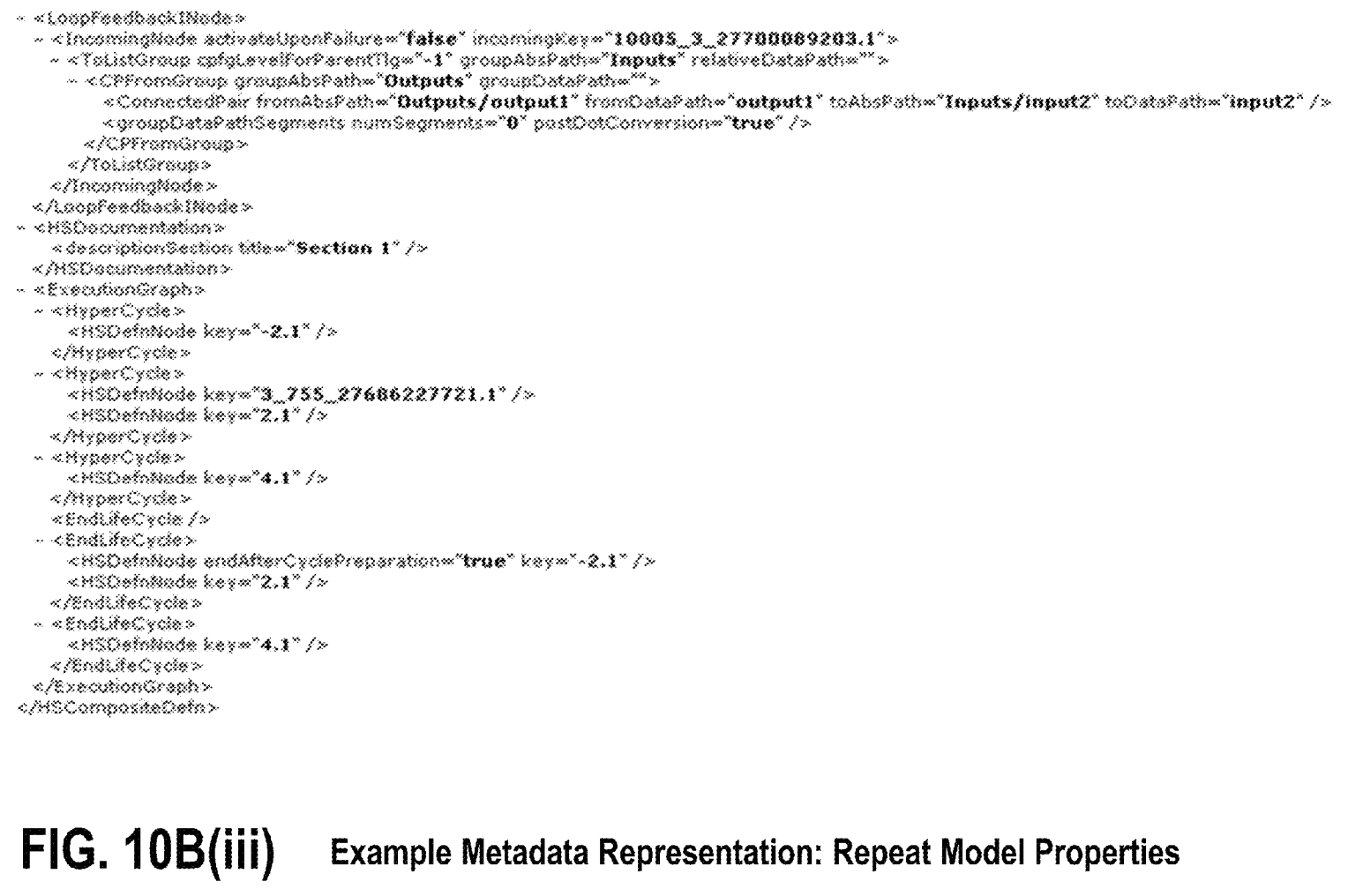

Another aspect of the present invention is the association of an attribute with the composite service implementation that indicates whether to repeat the execution of the implementation. There is a second related attribute that indicates whether to stop repeating once a configurable number of repetitions is reached, or to continue repeating until an Exit construct is reached. A third attribute indicates the amount of time to pause between repeats. This method of repeating, or "looping", further comprises the optional ability to provide data feedback from any data element of the composite service outputs to the inputs of that service. Referring to FIG. 10a for an example, the implementation of the composite service containing a child "Get List item" construct (introduced later in this document) and a service named Service-A is demonstrated. Here, based on the model property, the implementation is marked as a repeating implementation with no preset maximum number of iterations. Additionally, feedback from the outputs to inputs is enabled where a data-mapping tool allows the user to specify feedback data mappings from the outputs of the parent service to its inputs upon each iteration at runtime. FIG. 10b is an example metadata representation of FIG. 10a.

Figure 11B:
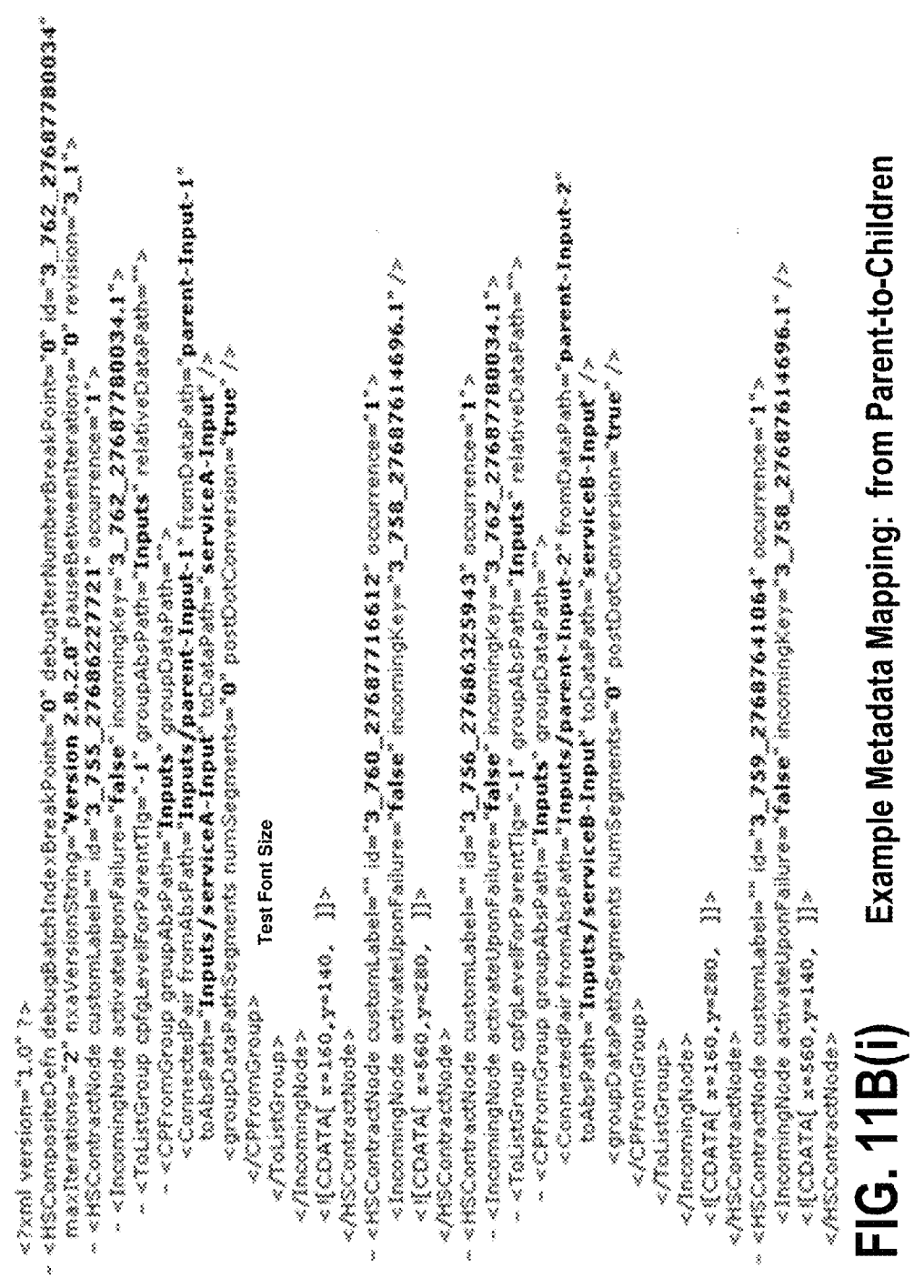
Figure 11D:
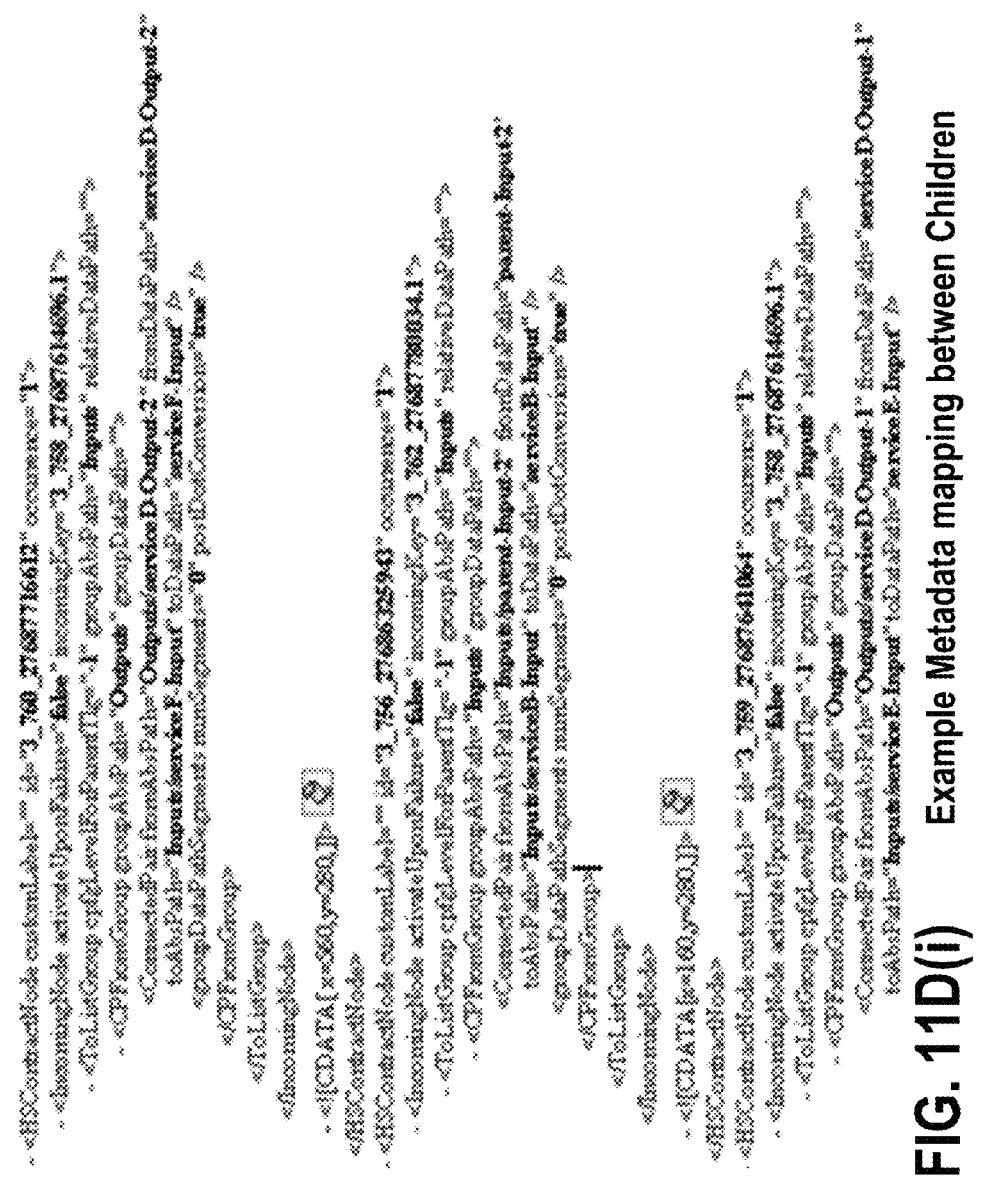
Figure 11D:
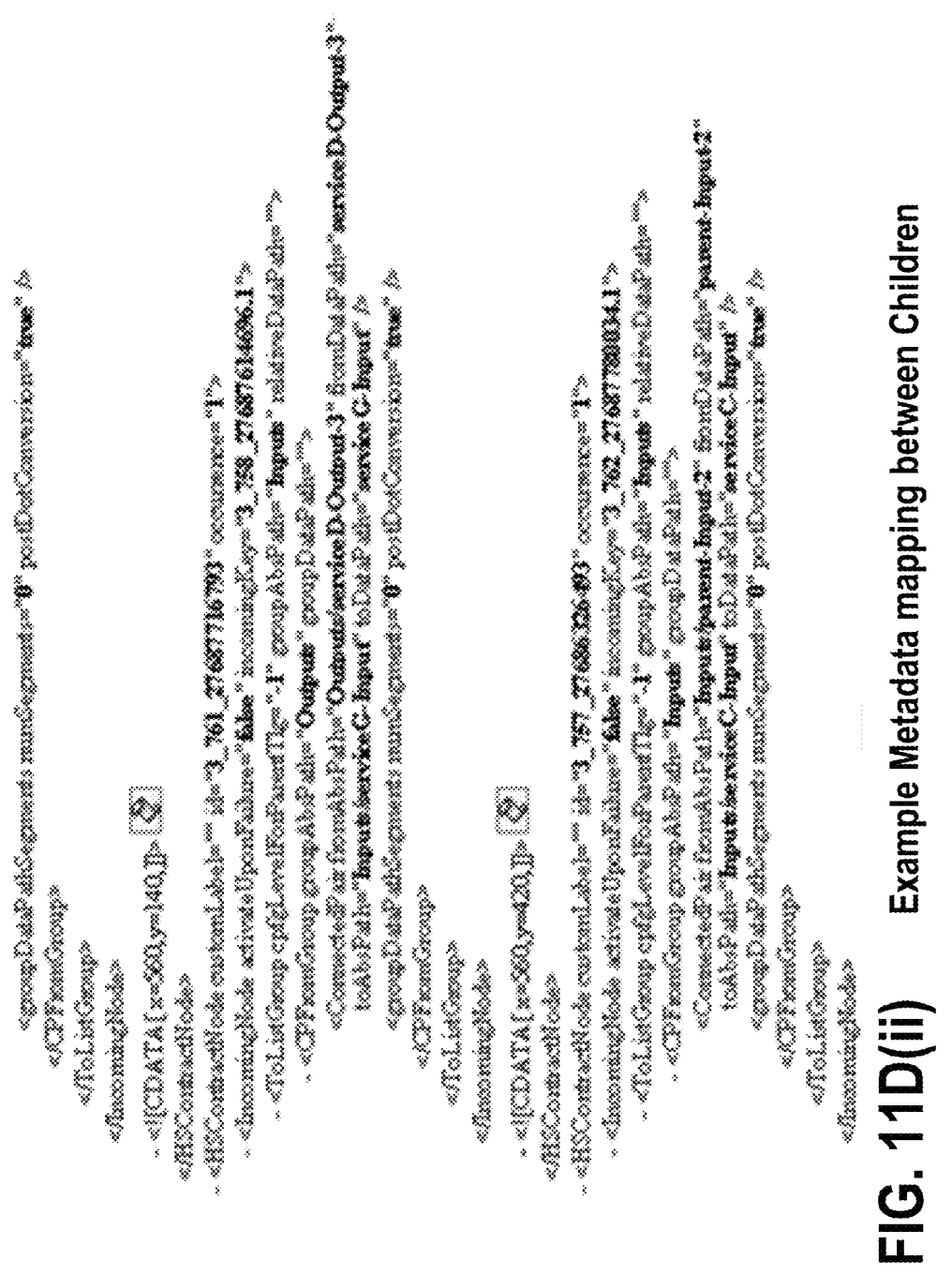

Based on the method of the present invention, graphical means for mapping data between the outputs and inputs of contained child services within a composite service are provided wherein the outputs of one or more child services can be mapped to the inputs of one or more child services. Furthermore, the inputs of the containing (i.e. parent) composite service can be mapped to the inputs of any of its contained services (i.e. its children) and the outputs of many contained services can be mapped to the outputs of the containing (parent) composite service. Referring to FIG. 11a as an example, the data mapping tool on the left side of the figure holds a representation of the inputs of the parent service on the left side of the mapping tool and the inputs of Service-A, Service-B, and Service-C on the right side of the mapping tool. You can see how the user can express the data relation/mapping of "parent-input-1" to "service-A-input", and the mapping of "parent-input-2" to both, "service-B-input" and "service-C-input" elements. The expression of the mapping is stored as part of the implementation of the "ParentService" model based on which actual data are transferred between the instances of the services at runtime. FIG. 11b shows one metadata expression of the mapping relationships of "Parent-Model" to Service-A, Service-B and Service-C described in FIG. 11a. Continuing with the explanation of the example in FIG. 11c, the mapping tool on the right side of the figure shows the expression of data mapping, based on the method of the present invention, between the outputs of three services (E, F, and G) and the outputs of the "ParentService" in a similar fashion. In this way, at runtime, data is transferred to the inside of the composite implementation through its inputs and to the outside the composite implementation through its outputs. Referring to the example of FIG. 11c, you can see the outputs of three services (A,B, and C) being mapped to the inputs of Service-D and the outputs of Service-D being mapped to the inputs of three services (E, F, and G) in a similar fashion. FIG. 11d is an example metadata representation of the visual mapping demonstrated in FIG. 11c.

Figure 12B:
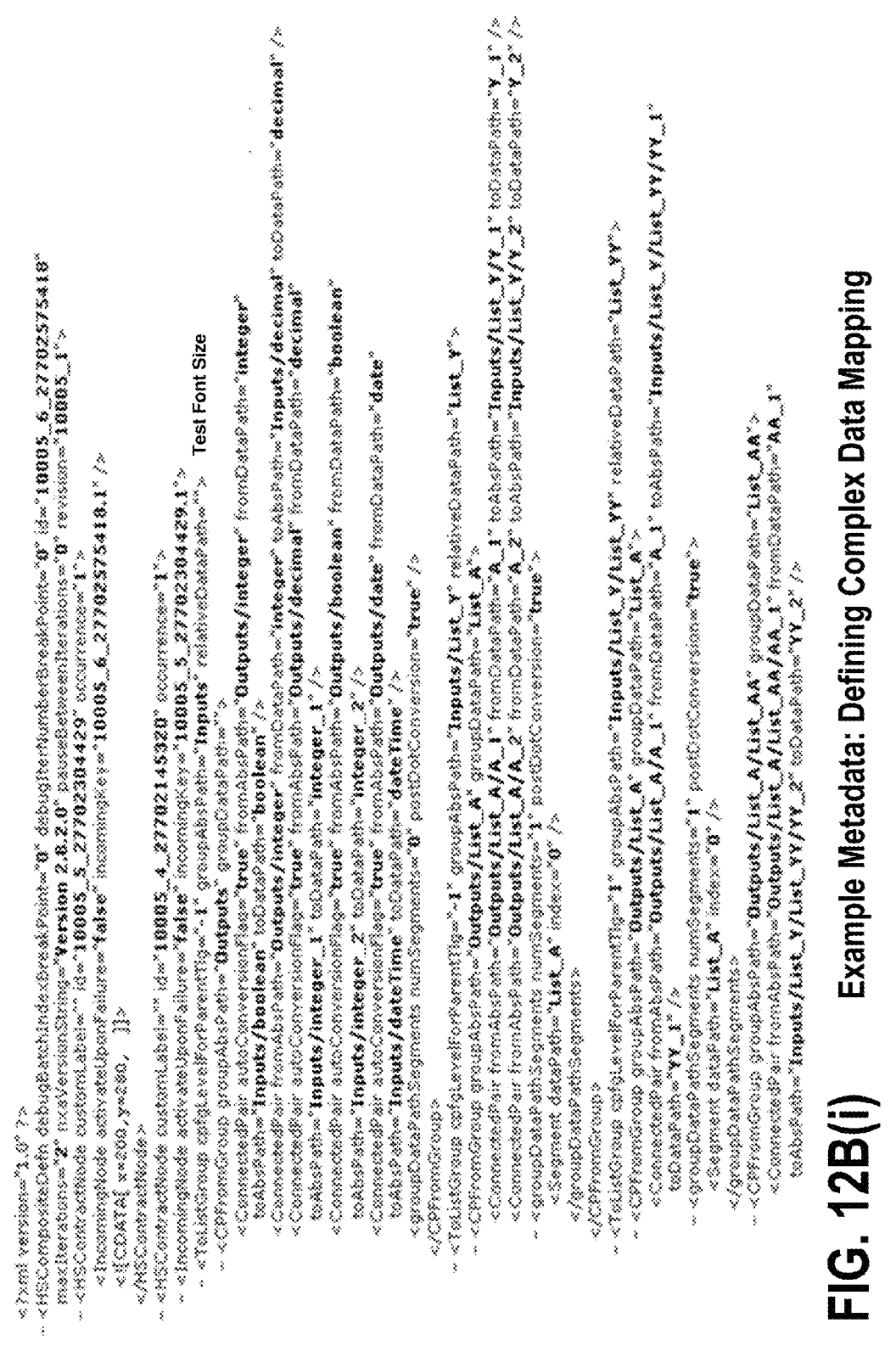

The implementation method of the present invention includes the ability to express the mapping of complex input/output data structures with plurality between the input/output of services. Referring to FIG. 12a as an example, you can see the outputs of Service-A that include a plural data container "List-AAA" within another plural data container, "List-AA" that is itself embedded within another plural data container "List-A". In this example, each plural data container contains some atomic data element. Similarly on the input side of Service-B, data plurality is represented. As the mapping tool in the FIG. 12a suggests, the method of the present invention provides for the expression of the mapping of the data elements within these containers. FIG. 12b provides an example metadata representation of FIG. 12a. FIG. 12c demonstrates an example of automatic data transfer at runtime based on the expression of mapping defined at design-time. Furthermore, based on the method of the present invention, data is automatically converted, if needed, based on the actual data types on the two sides of the mapping. For example, a date of one format will be converted to another, based on the defined format of the date type to which it is connected. As another example, if a Boolean type is connected to an integer type, then during runtime, if the value of Boolean is 'true', it will be converted to an integer value of '1' upon transfer. At runtime, the actual conversion takes place based on the types as indicated as part of the definition of the service interfaces.

Based on the method of the present invention, the flow of execution upon the invocation of a composite service automatically starts by transferring data from the inputs of the parent composite service to those child services directly connected to the input port of that service. These and all connections are based on the expression of mapping defined at design-time and stored as part of the implementation of the composite service. Furthermore, the invocation of a composite service may end with the transfer of data from the outputs of the contained child services that have already been executed and are directly connected to the outputs of the parent service. Certain events may terminate the invocation of a composite service prematurely. For example, the invocation of a composite service may terminate prematurely when a child service fails upon invocation without a routing defined for its failure port or if an Exit construct was activated.

To determine the dependency order of invocation/execution of the contained services, we construct an execution graph (a directed graph) for each composite service. Based on the connectivity of the contained services, we determine the order of invocation and the end life cycle of each child service at runtime. Refer to FIGS. 6b, 7b, 8b, 9b, and 10b, which demonstrate the EXECUTION GRAPH of the models represented by 6a, 7a, 8a, 9a, and 10a, respectively.

The created execution graph captures the dependencies of all the child services and construct nodes, based on their connectivity to the success/failure ports of other child services/constructs or to the parent service's input node. To construct the EXECUTION GRAPH for a composite service, tree nodes are created corresponding to each service and graphical construct (such as a logical construct) within a composite service model. The created nodes are sorted based on the direct and indirect dependency of each node to the inputs node of the parent composite service. The maximum distance that must be traversed from one node, through other incoming nodes, to reach the inputs of the parent composite service is one way to compare two nodes in determining the order of sorting. Note that upon the definition of a composite service, based on the method of the present invention, all graphical nodes inserted within the definition and their immediate dependency (i.e. incoming nodes) are stored as part of the definition of a composite service. Refer to FIGS. 6b, 7b, 8b, 9b, and 10b, which demonstrate this dependency in example metadata form.

At runtime and upon the invocation of a composite service instance, a context, herein referred to as the INVOCATION MAP, is created for a composite service based on the EXECUTION GRAPH accepted with the definition of the composite service. Upon the invocation of a composite service, the automation platform instantiates an INVOCATION MAP corresponding to the EXECUTION GRAPH that is created based on the dependency of contained services. The INVOCATION MAP determines the set of services that can be invoked by traversing the EXECUTION GRAPH in the order of node dependencies. The nodes with no dependencies or only dependencies to the input data of the composite service are the first set of nodes in the EXECUTION GRAPH and the nodes with dependencies to those nodes are the second set of nodes in the EXECUTION GRAPH, and so on. The automation platform of the present invention creates service instances corresponding to the service interfaces inserted in the definition of the composite and identified by the next set of non-dependent nodes of the EXECUTION GRAPH. After preparing the input data for those service instances (based on the expression of mapping stored within the composite service implementations), the automation platform stores the corresponding service instances in the INVOCATION MAP to be used when preparing the inputs of the next set of nodes. The automation platform then invokes the prepared services, using a unique key associated with the invocation of each service, for the purpose of recovery from an unknown state. Herein, we will refer to the invocation of each set of prepared services as a HYPERCYCLE. Referring to FIG. 13a as an example, the method of the present invention accommodates the automatic multi-threaded invocation of contained services that have no unresolved dependencies to each other. As depicted in FIG. 13a, Services-A, B, C have no dependencies to each other and only depend on the inputs of the parent composite service. Therefore, after the transfer of data from the inputs of the parent service, based on the mapping expression stored at the design-time, all three services may be invoked in parallel and in separate threads of execution. However, Service-D, belonging to the next HYPERCYCLE due its dependencies, can only start executing when all three services from the previous HYPERCYCLE have finished execution. Similarly, Services-E, F, G can only start execution, as part of the third HYPERCYCLE, after Service-D has finished execution and the automation platform has transferred data, if any, from Service-D's outputs to the inputs of the Services-E, F, G. FIG. 13b is an example metadata representation of the EXECUTION GRAPH and HYPERCYCLES of FIG. 13a.

After processing each set of services, optionally in parallel, and using separate threads of execution, the inputs of those services can be garbage collected (i.e. eliminated from the memory). Furthermore, each service whose end-life-cycle is reached (determined by the EXECUTION GRAPH based on a state of no remaining dependencies) can be eliminated from the INVOCATION MAP and garbage collected.

To accommodate the transparent distribution of an INVOCATION MAP object, methods are added to the INVOCATION MAP for serialization and de-serialization of its entire state after, or between, each discrete step of execution that involves the invocation of the next set of non-dependent services. The serialized state contains the complete state of each executed service (that has not been garbage collected), including: the state of execution such as the last executed HYPERCYCLE, the last iteration (in case looping was enabled), a cursor to the next set of services, the success and failure of service execution, and other information concerning the exact state of execution. One benefit of transparent distribution of the INVOCATION MAP is in the ability to construct a remote debugger for composite services implemented based on the method of the present invention.

Based on the method of the present invention, a visual semantic-based debugger is provided for the interactive and step-by step invocation of a composite service and the child services within the composite service whereby the semantic equivalent of all functionality usual to debugging tools for programming languages, including, but not limited to, insertion, deletion of break points, inspection of the data values contained in variables, stepping into functions, stepping out of functions, running to the end of a function, and other such functionality is provided. Furthermore, through the nesting of INVOCATION MAPs, related to each contained composite service, the method of the present invention accommodates the ability to step into any nested composite service contained within another composite service from within the semantic-based debugger. Referring to FIG. 14 as an example, a composite service is running within a semantic-based debugger. The first HYPERCYCLE containing the service GetFiles and a Decision construct with four branches has already executed. The visual debugger in FIG. 14 shows that the GetFiles service executed successfully and the inputs passed to the service are being modified/evaluated by the user. FIG. 14 attempts to document some of the functionality provided by the semantic-based debugger that can be constructed based on the method of the present invention. The ability to inspect/view and modify the inputs/outputs of the invoked services, to re-invoke from the point of modification, and to transfer data to the inputs of a child service without invoking that service are other functions that are easily incorporated within the present invention. Furthermore, the ability to set a break-point to stop the execution in a batch execution mode of a composite service, based on the integer position of an input component (the "nth" input component), is incorporated within the visual debugger. For example, if a CreateSalesOrder service is invoked with four Sales Order components as its input, the debugger can be used to set a break-point on the third component, stop at the beginning of that component and then execute the component when the user selects the appropriate debugger method (e.g. step-over, step-into).

The method of the present invention provides a way for synchronizing the execution of multiple instances of a composite service. The method of synchronization involves the association of an attribute to a composite service interface definition indicating whether simultaneous requests for the service should or should not be serialized (i.e., synchronized). At runtime, the system uses the unique object associated with the definition of the composite service, whose instances are to be synchronized, as the basis to serialize the execution of all of the concurrent requests for running the instances of that composite service. Referring to FIG. 15 as an example, an IncrementCounter service is depicted that contains two child services and is declared to serialize simultaneous instances of the parent service. The first service gets the value of the counter and the second service adds one to the output value of the first service and sets the incremented value as the new value of the counter. In this way, the increment counter operation becomes an atomic operation whose correctness is guaranteed through the method of the present invention. Furthermore, a method is provided for the granular synchronization of services in order to preserve the scalability of the applications built using the method of the present invention. According to this method, at design-time the user can graphically select one or more data paths from the inputs of the composite service that needs to be synchronized. Also, the user can specify whether the synchronization should span instances of more than one composite definition by selecting a common resource, such as a shared memory structure, for synchronization. At runtime, the automated runtime platform of this invention creates a string object that is a concatenation of the actual data values stored on the input data paths and either the unique id associated with the composite interface definition (if no shared resource was selected), or a unique id associated with any resource, such as any shared memory structure. This string object is used to synchronize all the service instances that result in the same string object.

One embodiment of the method of the present invention is the visual assembly of software services and the defining/building of a composite service implementation as depicted in FIG. 16. The picture demonstrates a service-oriented integrated development environment, referred to as the Hyperservice Studio, used for building composite software services from other services through a semantic-based graphical/visual environment without requiring the writing of code. The top left pane holds all of the service interfaces and composite definitions organized within packages (folders). Icons in a project pane, optionally organized under nested folders/packages, are each associated with a software service that is identified by a unique identifier as well as a name in the context of the containing folder. The present invention provides a method of linking services across projects and packages through simple references established using service identifiers. Furthermore, the project pane provides a visual mechanism for viewing the inputs, outputs and the definition of a service in a tree like structure and under the containing project/folder nodes of the tree, as depicted in FIG. 17.

Again, referring to FIG. 16, the "FindFiles" service (the parent composite) is explored in the project pane. In the right desktop pane, the definition of a composite implementation, which is generally referred to as a Hyperservice model, is opened. Based on one embodiment of the method of the present invention, the Hyperservice model's input port corresponds to the input interface of the "FindFiles" service and is located on the left side of the visual representation of the composite definition. The execution of an instance of the "FindFiles" composite service starts by flowing data from the input port of the composite definition to the connected service in the first HYPERCYCLE as discussed earlier. The model's output port corresponds to the output interface of the "FindFiles" service and is located at the right side of the visual representation of the composite definition. On the top part of the Hyperservice model editor, a set of toolbar items provide access to modeling constructs such as the Exit/Continue constructs, logical constructs (AND, OR, NOT), the Decision construct, and an extensible set of CONFIGURABLE CONSTRUCTs (inventions discussed later in this document). The "FindFiles" service was defined by dragging and dropping service interfaces (such as "GetFiles") from the project pane into the Hyperservice model editor and by adding decision, logical and CONFIGURABLE CONSTRUCT instances from the toolbar. Lines can be connected between the success/failure/activation ports of services, constructs, and the inputs/outputs of the composite model to indicate dependencies and the order of execution between services/constructs. Through the connecting lines, data mapping tools can be launched to express data mapping relationships between one-to-many and many-to-one services'/constructs' inputs and outputs. Furthermore, the present invention provides for an extensible framework for adding built-in functions to the design tools and the runtime platform with the ability to insert the available built-in functions between the data mappings by connecting the data types on the "from-side" (i.e. source) to the inputs of the built-in function, and the outputs of the built-in function to the "to-side" of the target service. Refer to FIG. 18 for a documented example of inserting a built-in function between the mapping of two data elements within the mapping tool.

The definition of a composite service (i.e. Hyperservice model) may be stored as XML in a persistent repository. Each service within the Studio is assigned a universally unique identifier. A unique identifier is assigned to each service interface. The composite definition refers to each service that is inserted (i.e. dragged and dropped) into it using the unique identifier of its service interface. In this way, if the name or the packaging of a service is changed, its references within any composite definition in which it was placed remains the same.

The present invention provides a method for configuring/defining the input/output data structures used within a software service, referred to as "CONFIGURABLE CONSTRUCTs". Furthermore, an extensible framework for the automatic runtime implementation of a CONFIGURABLE CONSTRUCT is provided. Once a CONFIGURABLE CONSTRUCT is added to the framework, it will automatically appear on the constructs toolbar of the composite service designer (i.e. Hyperservice model designer). Referring to FIG. 19, an instance of "Get List Item" CONFIGURABLE CONSTRUCT is dropped into the implementation of the "GetWantedRecord" model and a dependency line is connected between the child service "GetWantedRecord" and the "Get List Item" CONFIGURABLE CONSTRUCT. At first, when a mapping tool is used to define the data mapping between the outputs of "GetWantedRecord" and the inputs of "Get List Item", in the right pane of the mapping tool, you can see that one of the inputs to "Get List Item", named "anyList", is of configurable type. This means that the input "anyList" can be configured to become any plural data structure. Again, referring to FIG. 19, the mapping tool provides one method of configuring the "anyList" configurable type based on the outputs of the service in the left pane of the mapper which is the "Wanted Records" data container list of the GetWantedRecords" service. The user simply connects the "WantedRecords" data container list to the "anyList" input field of the CONFIGURABLE CONSTRUCT and agrees to proceed with the configuration. As a result, the "anyList" configurable type takes the shape of the "WantedRecords" data container as shown in FIG. 19. Furthermore, the outputs of the "Get List Item" are automatically configured based on the inputs and the specific function of the construct, which in this case is to extract a WantedRecords item from the WantedRecords list with an index identified by the "itemNumber" input of "Get List Item". As you can see in FIG. 19, the output of the "Get List Item" configurable service is a non-plural structure otherwise corresponding to the "WantedRecords" data structure.

In general, the CONFIGURABLE CONSTRUCTs framework of the present invention uses a plug-in architecture, based on an application programming interface, for introducing new CONFIGURABLE CONSTRUCTs and automating the configuration of those constructs' inputs and outputs based on arbitrary connectivity of other data structures that may be optionally restricted by datatype. Furthermore, the plug-in architecture uses programming interfaces for providing the automatic implementation of the configured constructs at runtime. For example, in FIG. 19 the plug-in defining the behavior of "Get List Item" service, at runtime, extracts the wanted record whose index is identified by the "itemNumber" input and adds the identified wanted record to its output data buffers. The design-time portion of a CONFIGURABLE CONSTRUCT service can store context information on the composite definition that can be later referenced by the runtime portion of the construct. Each CONFIGURABLE CONSTRUCT, as part of an extensible toolbar, can be placed in the workspace representing the definition of a composite service and can be connected to the inputs of the parent service or to the outputs of any child service for the purpose of configuration and mapping. Referring to FIG. 20 as an example, other configurable data list manipulation constructs are provided such as, but not limited to: extracting an item by index from a list of items, appending items to a list, consolidating two different data lists into one, as well as getting the number of items in a list, sorting a list of data based on user defined keys, and filtering a list of data based on user defined criteria. FIG. 21 represents example metadata for the three list-constructs depicted in FIG. 20.

Figure 22:
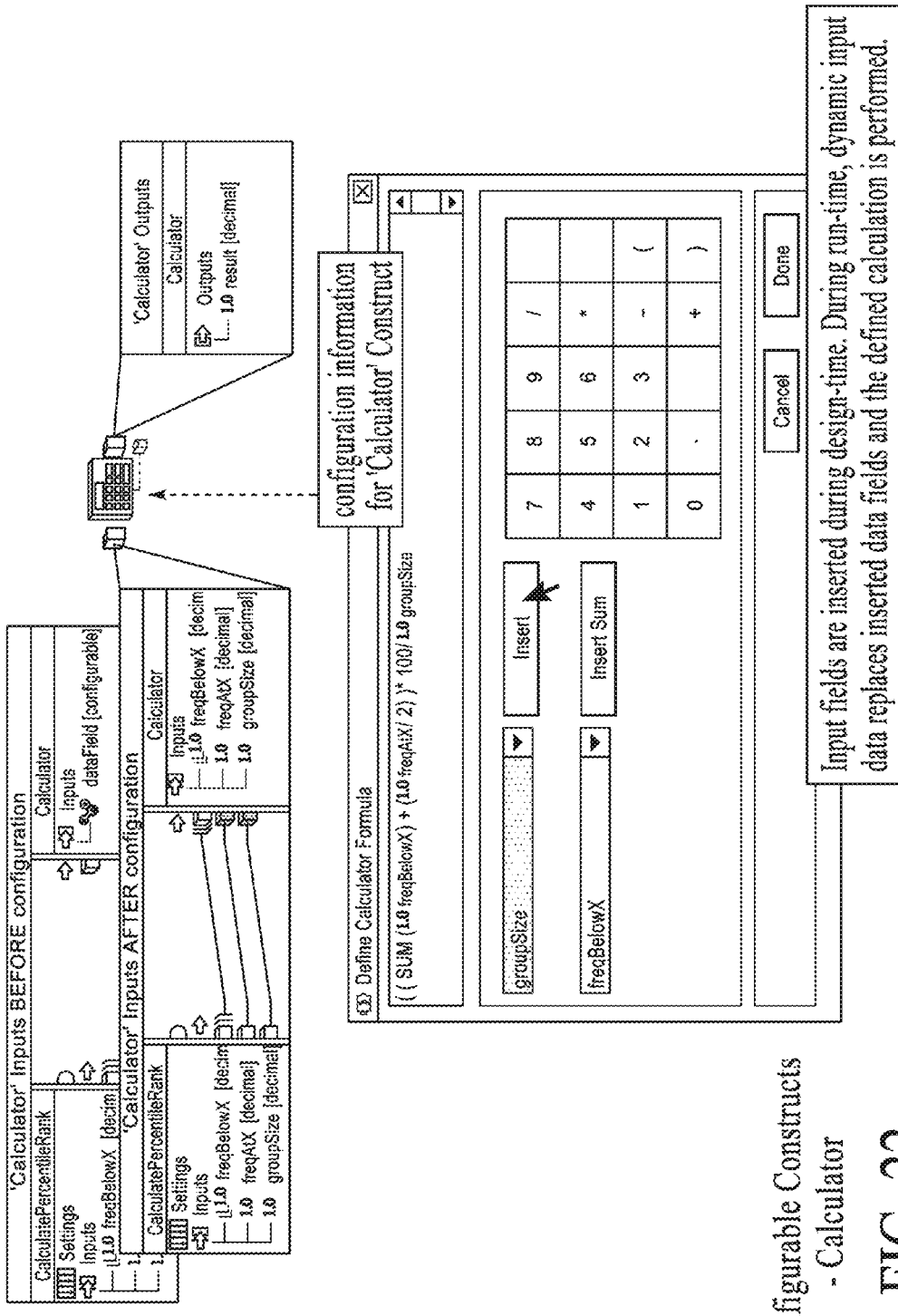
FIG. 22 is an exemplary illustration of a calculator configurable construct that provides the ability to perform mathematical and scientific operations on numerical data elements connected to and flowing from service input/outputs according to one embodiment of the invention.
Figure 23:
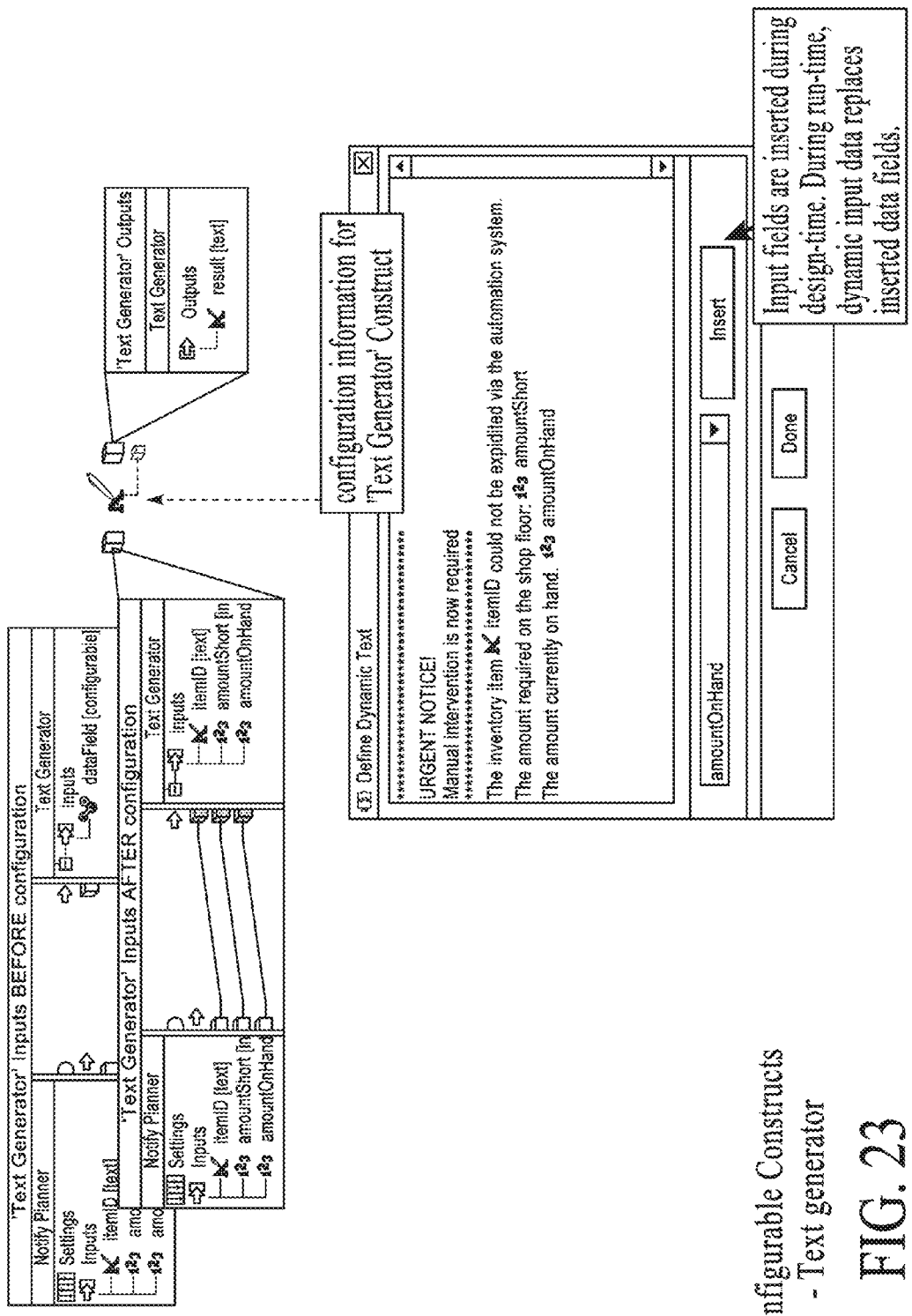
FIG. 23 is an exemplary illustration of a text generator configurable construct according to one embodiment of the invention.

The present invention provides a set of configurable services, as CONFIGURABLE CONSTRUCTs, such as a calculator, data sorting, data list manipulation, text manipulation and filtration constructs. Referring to FIG. 22 as an example, the calculator construct provides the ability to perform mathematical and scientific operations on numerical data elements connected and flowed from parent service inputs or other child service outputs. Referring to FIG. 23 as an example, the text manipulation construct provides the ability to combine static text with the dynamic construction and formatting of text based on its configured service inputs. Similarly, the sort CONFIGURABLE CONSTRUCT provides the ability to sort arbitrary plural data elements transferred from inputs of the parent service or outputs of other child services.

The present invention provides a method of inter-service communication based on shared memory wherein the shared memory storage requirements and structural identity are represented by data structures similar to those used to describe service interface inputs/outputs. An extensible framework through programming interfaces with a plug-in architecture is used in one embodiment of the present invention to define four types of shared memory: Shared Containers, Shared Arrays, Shared Vaults, and Shared Dictionaries. Each shared memory type comes with a set of access services for getting and setting data values within the corresponding shared memory instances. The extensible framework of shared memory for the present invention can be used to introduce new specialized types of shared memory. Referring to FIG. 24 as an example, the application developer defines a shared memory structure of type Shared Container, called the "Part Counter". Part Counter contains an integer field, "lastPartCounter", and a date field, "creationDate". The shared memory mechanism for Shared Containers provides two services for each Shared Container that is defined: "Set Data" and "Get Data". "Set Data" takes a "Part Counter" data structure as input and "Get Data" takes no input and returns a "Part Counter" structure as output. FIG. 24, shows a composite service used for incrementing the "lastPartCounter" field of the "Part Counter" shared memory through its "Get Data" and "Set Data" services. The framework for shared memory services uses a mechanism that is a specialization (i.e. subclass) of the CONFIGURABLE CONSTRUCT framework to create the data access services (such as "Set Data" and "Get Data" services of the Shared Container) for each type of shared memory. When a shared memory structure of any type is added, specialized and predefined configurable services are automatically configured through the framework to take the shape of the shared memory structure on either the inputs or outputs. The shared memory mechanism provides optional persistence for shared memory data. Referring to FIG. 25 as another embodiment of the shared memory mechanism, a "Color" Shared Vault is defined by the user containing fields for RGB values and the corresponding color name. Here, the shared memory mechanism adds predefined data access services of Shared Vault, including "Set Data With Key", "Get Data With Key", "Get All Data", "Remove Data With Key", "Remove All Data", and "Wait for Data" services. The Wait construct notifies the consuming composite service when the data belonging to the specific shared memory structure has been modified (update/set/delete). In this way, the WAIT method provides a means for asynchronous communication across different instances of composite services wherein one service may be blocked until another service sets or modifies the data associated with a shared memory. In this case, these services are all configured automatically by the shared memory mechanism to take the Color structure as input or outputs. FIG. 25 shows some of these services contained in a composite service with their inputs or outputs. In a similar fashion, FIG. 26 depicts an example of another type of shared memory called a Shared Array. A Shared Array structure provides predefined data access services that allow order-dependent list manipulation such as "AddItemFirst", "AddItemLast", "GetFirstItem", "GetNthItem", "GetLastItem", "GetAllItems", "RemoveFirstItem", "RemoveLastItem", "RemoveAllItems", and "GetArraySize". FIG. 27 presents an example of a more specialized shared memory, referred to as Shared Dictionary, that provides methods for one-to-many and many-to-one translation of data in different forms or "locales". In this example, a Shared Dictionary named "Month" is defined. The standard word for each month of the year is added. In this case, the standard word is always the 2-digit representation of the Month. For each standard word, any number of alternate terms can be added, where the alternate term is identified by a unique "locale" for that word. In this example, '01' is a standard word for the Shared Dictionary named 'Month'. Several alternate or "Native" forms for this standard word exist, such as "January", which is identified by the "fullname" locale, and "Jan", which is identified by the "3-letter" locale. Shared Dictionary provides predefined data access services such as "Translate to Standard", which translates a native form of a word, given the locale, to the standard form, and "Translate to Native", which translates a standard form of a word to the native form. Other data access services provide means to add, delete, or get words from the dictionary.

As mentioned earlier, the present invention provides a method of synchronization based on synchronized execution of a composite service instance. This method, as depicted in FIG. 15, can be used to synchronize access to shared memory structures while providing inter-service communication. Furthermore, a built-in context mechanism is provided for the shared memory that allows transactional behavior with respect to the shared memory accommodating rollback, and commit behavior in the context of nested composite services. All modifications to shared memory data through the composite service are accommodated in the context of the composite service. In the case where a composite service contains another service, for each composite service a new context is created that is nested within the parent context. In this way, the modifications to the shared memory can be roll-backed or committed at the end of the execution of each composite service.

An access control mechanism for granting access of a shared memory service to some composite services and restricting access from the others is devised as part of the present invention. Here, the get/set access to shared memory services/methods is granted or restricted based on containment in a project or a package or directly based on a composite service by name. Referring to FIG. 28 for an example, a SharedArray structure named "FilesSortedBySize" is shown and access to the services that act on this Shared Array is granted to only some of the models (i.e. composite service definitions) within the containing project. Some Hyperservice models within some packages are only granted access to services for getting the shared data, some are granted access to services that set the shared data, and some are granted access to all of the "FilesSortedBySize" services.

Based on the method of the present invention, composite services are implemented/defined by connecting interfaces of other software services, that may be composite services, to each other and optionally to a set of constructs. Furthermore, data mapping is defined based on the inputs and outputs of the interfaces. Also, the order of execution and opportunities for concurrent execution of services contained within a composite definition is automatically inferred based on the connectivity (i.e. from a dependency perspective) of services and constructs. The runtime platform of the present invention automatically instantiates actual service objects corresponding to the interfaces used within a composite definition (i.e. Hyperservice model) and as explained earlier, based on the EXECUTION GRAPH and an INVOCATION MAP object, conducts the automatic execution of a composite service. The innovative methods of the present invention provide a new paradigm for building composite software modules.

Figure 5:
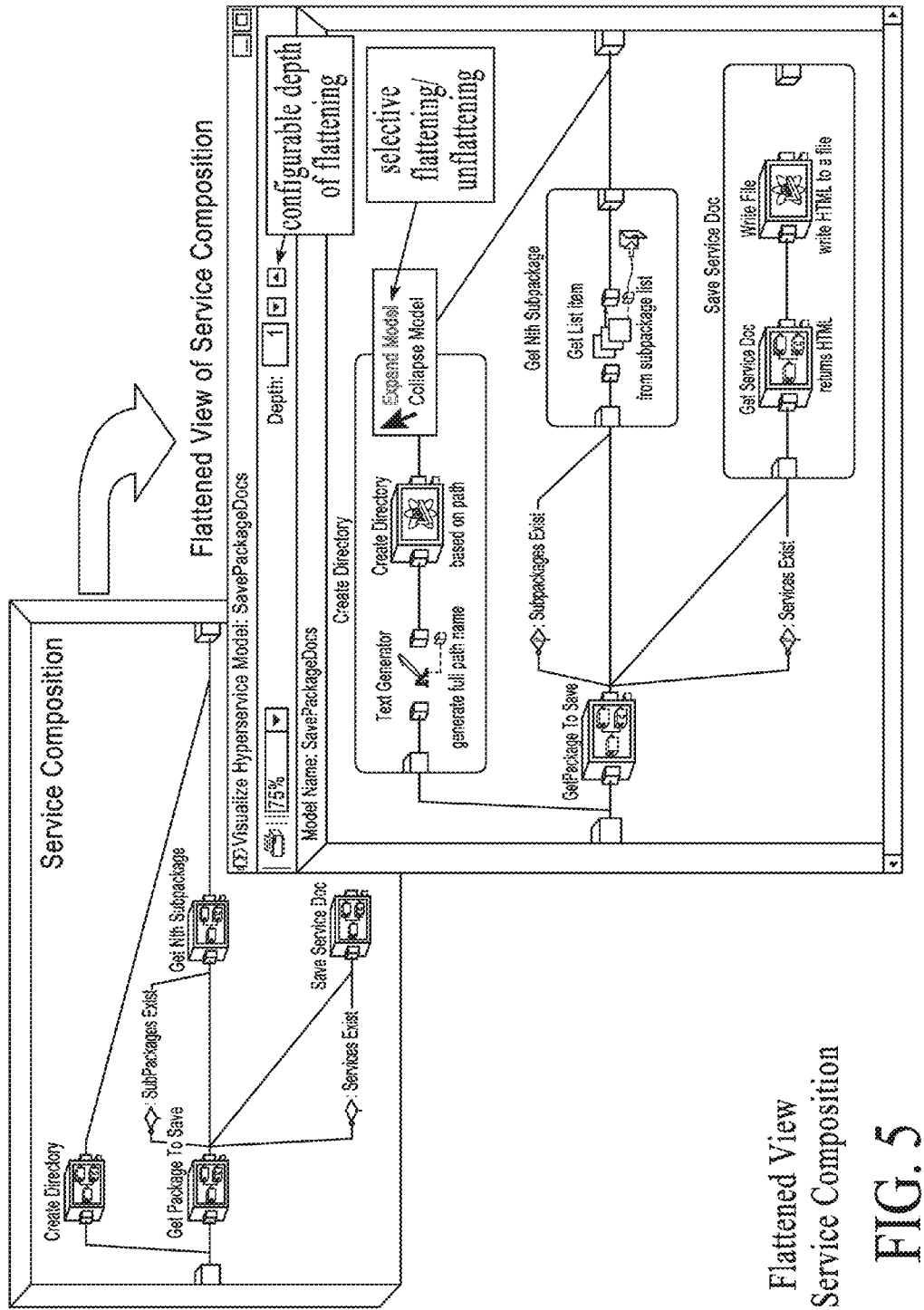
FIG. 5 is an exemplary illustration of a flattened view of the hierarchy of nested services to a single level of depth according to one embodiment of the invention.

Given the hierarchical means of organizing the implementing services, the system of the present invention provides methods for visualizing the hierarchy of service composition. Referring to FIG. 5, on the top left portion of the figure, the implementation of a composite service is depicted. This service is implemented with four other composite services (i.e. it contains four other composite services): CreateDirectory, GetPackageToSave, GetNthSubPackage, and SaveServiceDoc. On the center and bottom right portion of FIG. 5, a flattened version of the composition is depicted. Here, the implementation of CreateDirectory, GetPackageToSave, and GetNthSubpackage composite services are selectively flattened to a single level of depth. Similarly, and based on this "hierarchical-flattening" method of the present invention, the depth of flattening of composite services contained within a parent composite service can be selectively controlled by the application developer. Furthermore, based on the method of the present invention, the flattened view of a composite service's implementation can be abstracted, or "unflattened". Abstracting a flattened view hides the details of the composition by replacing the details (i.e. the implementation) of a composite service with its interface.

A second method for visualizing the hierarchy of service composition is to use a hierarchical tree structure of contained (i.e. child) services, where the leaf nodes of the tree correspond to non-composite child services and the non-leaf nodes correspond to composite child services. One embodiment for this second method of visualizing the hierarchy of the composition of a composite service is depicted in FIG. 17. On the top-left pane of the composition tool for composite services, the user selects to "explore" the implementation of a composite service (i.e. "Hyperservice model") named SavePackage-Docs. This results in a hierarchical visualization of the service shown in the bottom-left pane of the composition tool. The right pane (i.e. the desktop area of the tool) shows the direct implementation of the selected service. The hierarchical visualization of the service depicted in the bottom-left pane demonstrates the composition of the service from the perspective of service containment in a tree structure. This method of visualization demonstrates to the application developer all the services contained within the selected service, as well as all the services contained in those services, and so on all the way to the raw material services (non-composite) services. This concept is analogous to the concept of a bill-of-materials for products in manufacturing applications.

An embodiment of a method of the present invention for encapsulating a portion of the implementation of a composite service is depicted through an example in FIG. 29. As presented in the top portion of the figure, the user selects an area of the implementation of a "CompositeService-1A" that includes two services named "AtomicService-a" and "AtomicService-b" and a chain of conditionals with two branches. After encapsulation, as depicted in the bottom portion of FIG. 29, the above elements in the selected area are contained in an automatically created composite service, "CompositeService-2A" and removed from the implementation of "CompositeService-1A", while the interface of "CompositeService-2A" is inserted inside the implementation of the "CompositeService-1A" instead of the removed elements. Here, an interface for the new composite service, "CompositeService-2A", is automatically created based on the unique aggregation of all the interfaces of the given subset of the services in the selected area that are to be encapsulated. Furthermore, an implementation for "CompositeService-2A" is automatically created containing the selected subset of the contained services. All service interface connectivity and data mapping associated with the subset of selected services is automatically remapped and correctly re-associated based on the insertion of the subset in the new automatically generated composite service (i.e. "CompositeService-2A" in the example).

Based on the composition method of the present invention, some of the behavior of the software services contained within a composite service implementation can be configured in the context of the containing (i.e. parent) composite service. As an example of such a context-sensitive behavior consider FIG. 30. FIG. 30 displays an implementation for the parent service "GetGlobalStockQuote", where the execution results of one of its contained services, "ConvertToNum", is configured to be cached in the context of "GetGlobalStockQuote" and automatically purged every 5 minutes from the cache. The cached behavior of "ConvertToNum" only applies to its usage within the context of "GetGlobalStockQuote". Unless otherwise specified, the results of executing the "ConvertToNum" service outside the context of "GetGlobalStockQuote" will not come from the cache. Other attributes related to the invocation of contained services can be configured in the context of a containing (i.e. parent) composite service. For example, whether to log the service invoked in a context of a composite can be configured in the same context-based fashion. How to automate the methods of context-sensitive configuration at runtime are obvious to a person expert in the art of software implementation.

Another aspect of the present invention is the ability to load-balance the execution of composite services, across a cluster of automation runtime platforms instances, without requiring the metadata associated with the interface and the definition of composition to be available at every server node of the cluster. To accommodate this, all methods for storing and retrieving metadata associated with the definition of interface and implementation of services are themselves implemented as services. Given this, the instance of the platform, which requests the invocation of a service by the other instances within the cluster, provides a callback address to the other instances of the platform within the cluster as part of the request. Other instances use the callback address to dynamically and on-demand gather the required metadata while the invocation of the requested service is in progress.

Another aspect of the present invention provides an automatic trigger mechanism whereby the invocation of one service automatically results in the invocation of one or more other composite services, herein referred to as TRIGGER MODELS. This mechanism provides a non-intrusive way for adding management logic without the need to modify the implementation of the services that define the application logic. In one embodiment of the present invention, referring to FIG. 31, a user can graphically declare a service to trigger the invocation of one or more TRIGGER MODELS. TRIGGER MODELS are specialized forms of composite definitions strictly used in association with the triggering services. The user can declare a TRIGGER MODEL to be automatically invoked: a) at the same time the associated (i.e. triggering) service is invoked, b) after the completion of the associated service, c) only after the successful completion of the associated service, or d) only after the failure of the associated service. An interface for each TRIGGER MODEL is automatically created based on the interface of the associated service wherein the input definition of the TRIGGER MODEL includes all the inputs of the associated service when the trigger is declared to be invoked at the same time as the associated service or upon the failure of the associated service. When the TRIGGER MODEL is invoked upon the completion or successful completion of the associated service, the inputs of the TRIGGER MODEL are automatically configured to include all the inputs and outputs of the associated service. Furthermore, the method of the present invention provides for the automatic instantiation and invocation of instances of the TRIGGER MODELs upon the invocation of the corresponding associated service.

Another aspect of the present invention provides a system for a service-oriented, asynchronous notification of service invocation within a composite service. Referring to FIG. 32, the user can graphically declare a REQUEST EVENT for any software service. Each REQUEST EVENT provides a WAIT construct that is configured to provide as its outputs the input data of the software service associated with the REQUEST EVENT. The WAIT construct also takes a timeout value as an input, and a set of request keys that correlate selected inputs of the software service with a REQUEST EVENT. The WAIT construct can be dropped into any composite definition. At runtime, all instances of the composite service associated with the composite definition that contains a WAIT construct will block as the execution of each instance reaches the WAIT construct. The blocking continues until either the timeout is reached or the software service associated with the event is invoked with the specified key values. This mechanism combines the power of publish/subscribe of the messaging paradigm in a unique service-centric fashion to provide an asynchronous mechanism for service notification. Here, the execution of any service can be viewed as an implicit publication of an event where the invocation of a service is the event itself. The associated WAIT construct acts as a notification/blocking mechanism and the request keys that are the inputs to the event service provide a correlation mechanism. The correlation mechanism issues a notification based on correlating some actual key values from the inputs of a service with the key value that was set on the input of the WAIT construct.

TERMS AND DEFINITIONS

A software service, or service for short, including but not limited to a Web service, is a discrete software task that has a well-defined interface and may be accessible over the local and/or public computer networks or may be only available on a single machine. Web services can be published, discovered, described, and accessed using standard-based protocols such as UDDI, WSDL, and SOAP/HTTP.

Figure 1:
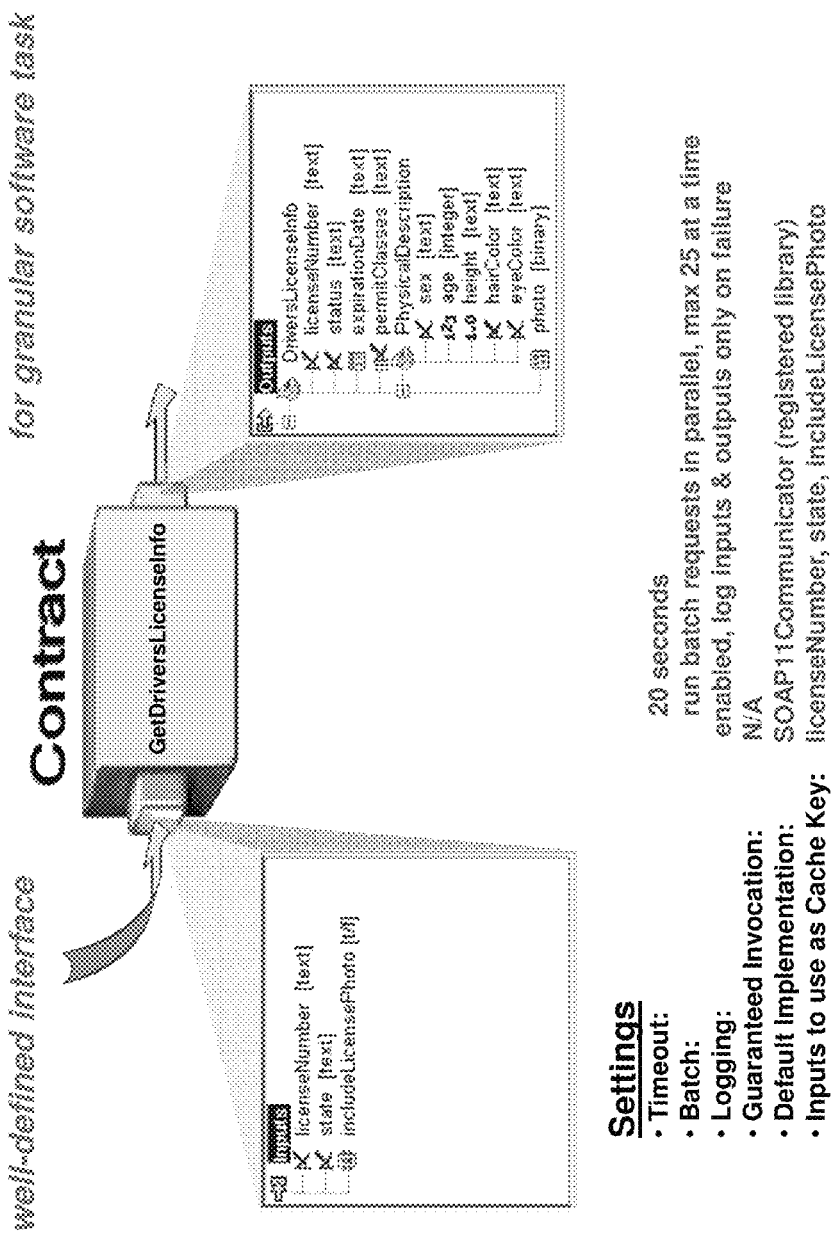
FIG. 1 is an exemplary illustration of a software service interface with described root containers, Inputs and Outputs, and Settings attributes according to one embodiment of the invention.

A software service interface, in concept, represents the inputs and outputs of a black-boxed software service as well as the properties of that service, such as name and location. Take, for example, the interface of a simple software service named GetStockQuote, which retrieves simple stock quote information [FIG. 1]. This service takes a ticker symbol input and returns the last trade price amount as well as some additional stock quote details, such as the day high and day low. Note that in order to use, or consume, a service, only knowledge of its interface is required. This means that as long as the interface of a service remains the same, different implementations of the service can be swapped in and out without affecting its consumers. This, as well as the fact that a service is a language- and platform-neutral concept, is one of the keys to the flexibility of service-oriented architectures.

An atomic service is a software service that is implemented directly by a segment of software code. In the existing NextAxiom™ HyperService™ Platform, atomic Web services are dispatched via a library. A library is a light, language- and platform-neutral wrapper that is linked to one or more atomic Web service implementations. Atomic Web services are logically indivisible Web services that represent "raw materials" to the HyperService™ platform.

A composite service is a software service that consumes any number of other atomic or composite services. In the HyperService™ platform, a composite Web service is implemented with a metadata-driven model that is automatically interpreted by a high-performance run time engine.

Figure 2:
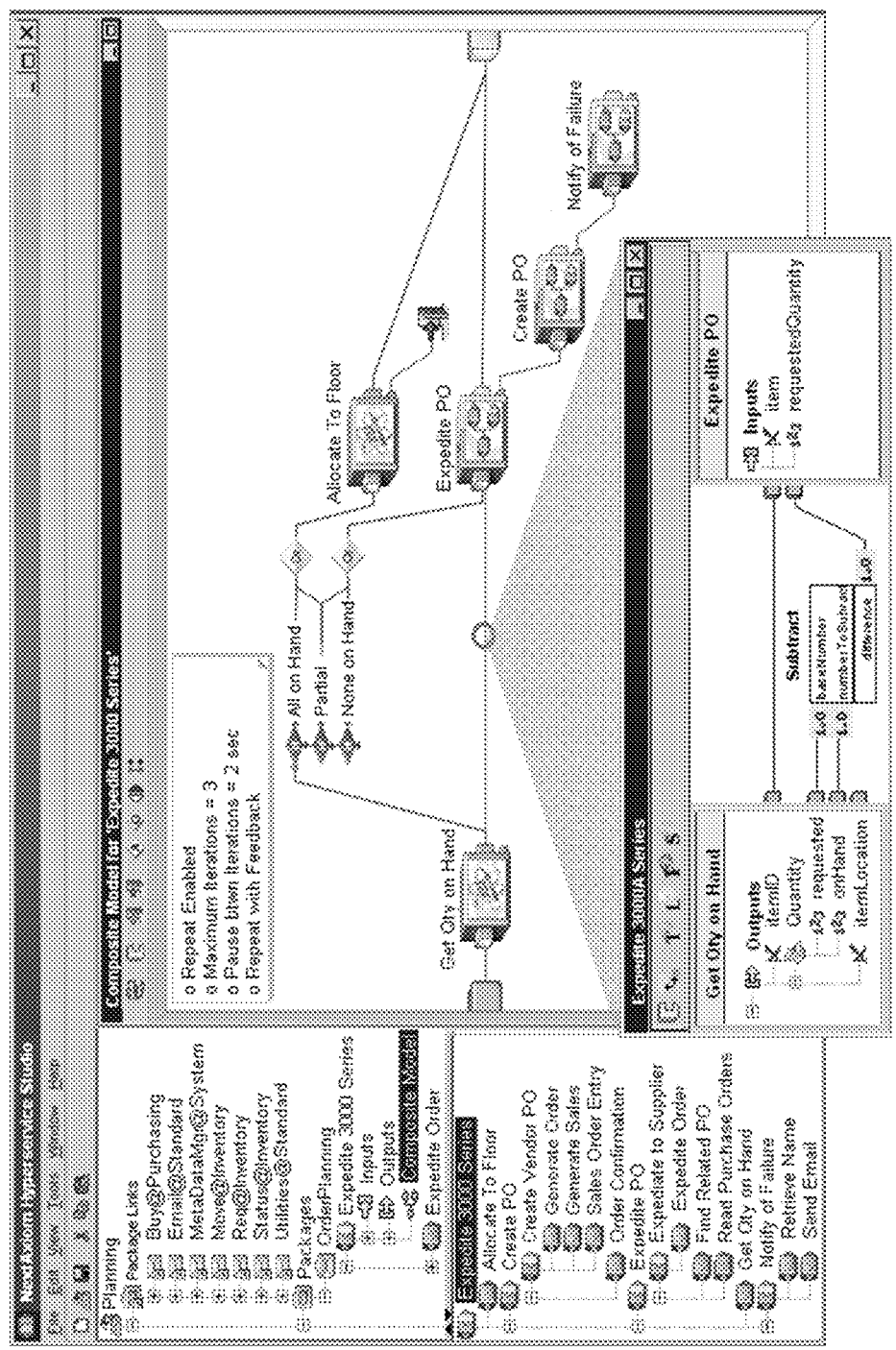
FIG. 2 is an exemplary illustration of a visual metadata model of a composite software service model named "Expedite 3000 Series" according to one embodiment of the invention.

Visual metadata models, which represent composite software services implementations to the HyperService™ system, are created in a graphical, design-time environment and stored as XML models. This environment offers a new and powerful visual modeling paradigm that can be leveraged to enable the visual modeling of transactional behavior. This environment was specifically designed to enable collaborative, on-the-fly creation of software services by business process analysts or functional experts, who understand the business logic and application required to implement real-world business processes and applications, but have no knowledge of programming paradigms or Web service protocols. FIG. 2 captures the implementation of a composite software service named "Expedite 3000 Series". This service is used by a master planner to expedite 3000-series inventory items when they fall short on the shop floor. This service was developed collaboratively and reuses services that were selectively exposed by the Inventory and Purchasing departments to the developers of this service.

Figure 3:
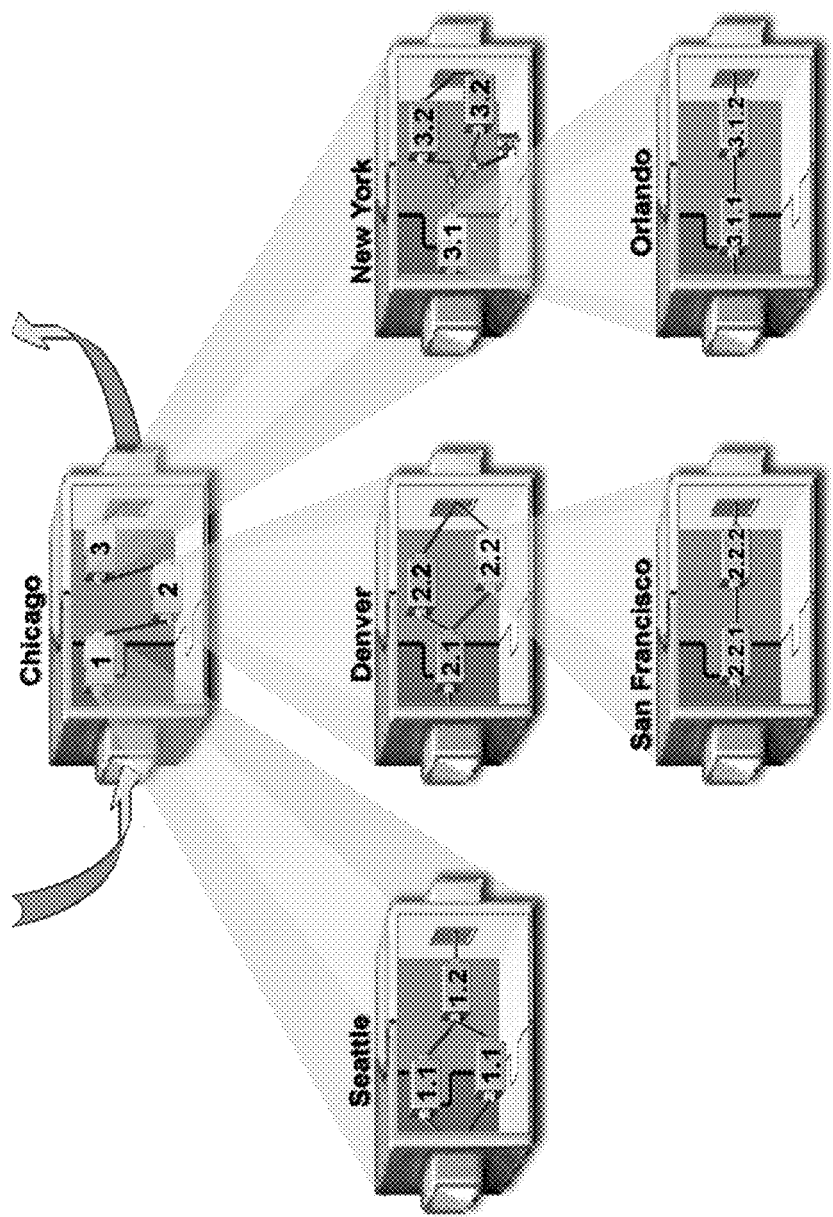
FIG. 3 is an exemplary illustration of a physical distribution of software services "nested" or "embedded" within other composite software services according to one embodiment of the invention.

Any software service that is consumed by a composite service model is said to be "nested" or "embedded" within that composite service. FIG. 3 depicts a hypothetical composite service that resides in Chicago. This software service is composed of other composite services that are distributed across the country.

What is claimed is:

1. A method for configuring input/output definition data structures used in a software function, comprising:
   generating by a processor a graphical representation of a composite service within a composite service model using a service oriented, semantic-based programming, the composite service comprising a configurable service having one or more user-defined data inputs and one or more user-defined data outputs;

providing the graphical representation of the composite service to a workspace displayed on a display device of a computing device;

receiving a user selection of at least one of the one or more user-defined data inputs and at least one of the one or more user-defined data outputs;

providing an extensible framework for automatic runtime implementation of the composite service; and configuring an input/output definition data based on at least one of inputs and outputs of other software services comprising:
  a) an association of a data element from one service to inputs of a configurable service,
  b) the inputs of the configurable service being resolved based on one of a duplicate and a link of the associated data element, and
  c) upon configuring the inputs of the configurable service through the extensible framework, the outputs of the configurable service can be automatically configured.

2. A system of configuring input/output definition data structures used within a software function, comprising:

a semantic-based programming structure using graphical representations of a plurality of configurable services, each configurable service having one or more user-defined data inputs and one or more user-defined data outputs, the semantic-based programming structure providing a configured software service;

an extensible framework stored in a memory for automatic runtime implementation on a processor of the configured software service; and a configuration of an input/output definition data based on the inputs/outputs of other software services comprising:
  a) an association of a data element from one service to inputs of a configurable service,
  b) the inputs of the configurable service being resolved based on one of a duplicate and a link of the associated data element, and
  c) upon configuring the inputs of the configurable service through the extensible framework, the outputs of the configurable service can be automatically configured.

3. A system having a processor and a memory, comprising:

a visual metadata model editor for forming a visual representation of a composite software service in a graphical environment, the visual representation of the composite software service being stored as an XML (Extensible Markup Language) model; and an extensible framework for implementation of the composite software service, the composite software service comprising one of at least one programming construct and at least one atomic service implemented with a metadata-driven model that is automatically interpreted by a run-time engine, the composite software service comprising a software task and an interface representing at least one input and at least one output;

wherein:

the system is language and platform neutral;

the system is accessible over a network;

the interface is swappable with a second interface;

the at least one atomic service is dispatched via a library, the library being a language-neutral and platform-neutral wrapper linked to one or more atomic Web service implementations; and a visual modeling paradigm enables visual modeling of transactional behavior.

4. The system of claim 3, further comprising a remote debugger for the composite software service.

5. The system of claim 3, wherein the system is implemented by a Web service.

6. The system of claim 3, wherein modeling constructs of the metadata-driven model comprise at least one of an exit/continue construct, a logical construct, a decision construct, and an extensible configurable construct.

* * * * *

UNITED STATES PATENT AND TRADEMARK OFFICE
CERTIFICATE OF CORRECTION

| | | |
|---|---|---|
| PATENT NO. | : 8,458,660 B1 | Page 1 of 1 |
| APPLICATION NO. | : 13/347651 | |
| DATED | : June 4, 2013 | |
| INVENTOR(S) | : Arash Massoudi and Sandra Irene Zylka | |

It is certified that error appears in the above-identified patent and that said Letters Patent is hereby corrected as shown below:

On the title page, Item 62, Related U.S. Application Data, after: "Division of application No. 10/904,744, filed on Nov. 24, 2004, now Pat. No. 8,225,282.", please insert:

-- Provisional application No. 60/481,702, filed on Nov. 25, 2003. --

Signed and Sealed this
Thirtieth Day of July, 2013

Teresa Stanek Rea
*Acting Director of the United States Patent and Trademark Office*